United States Patent
Yu et al.

(10) Patent No.: US 12,531,996 B2
(45) Date of Patent: Jan. 20, 2026

(54) ENHANCED MULTI-HYPOTHESIS PREDICTION

(71) Applicant: Telefonaktiebolaget LM Ericsson (publ), Stockholm (SE)

(72) Inventors: Ruoyang Yu, Täby (SE); Kenneth Andersson, Gävle (SE); Jacob Ström, Stockholm (SE); Jack Enhorn, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/854,326

(22) PCT Filed: Apr. 5, 2023

(86) PCT No.: PCT/SE2023/050312
§ 371 (c)(1),
(2) Date: Oct. 4, 2024

(87) PCT Pub. No.: WO2023/200382
PCT Pub. Date: Oct. 19, 2023

(65) Prior Publication Data
US 2025/0337911 A1 Oct. 30, 2025

Related U.S. Application Data

(60) Provisional application No. 63/329,939, filed on Apr. 12, 2022.

(51) Int. Cl.
*H04N 19/597* (2014.01)
*H04N 19/137* (2014.01)
(Continued)

(52) U.S. Cl.
CPC ......... *H04N 19/137* (2014.11); *H04N 19/176* (2014.11); *H04N 19/70* (2014.11)

(58) Field of Classification Search
CPC ..... H04N 19/137; H04N 19/176; H04N 19/70
See application file for complete search history.

(56) References Cited

U.S. PATENT DOCUMENTS

| 10,917,645 B2 | 2/2021 | Kim et al. |
| 2012/0063514 A1 | 3/2012 | Lin et al. |

(Continued)

FOREIGN PATENT DOCUMENTS

| KR | 2020-0095982 A | 8/2020 |
| WO | 2019/194462 A1 | 10/2019 |

OTHER PUBLICATIONS

International Search Report and Written Opinion issued in International Application No. PCT/SE2023/050312, dated Jun. 19, 2023 (14 pages).

(Continued)

*Primary Examiner* — Jonathan R Messmore
(74) *Attorney, Agent, or Firm* — Rothwell, Figg, Ernst & Manbeck, P.C.

(57) ABSTRACT

Methods and apparatuses for processing a current block within a current picture. The processing may include determining whether a second syntax element S1 is present in a coded video bitstream. The processing may include, if the S1 is not present, inferring which one of implicit signaling and explicit signaling is used to signal a second piece of motion information M1, or, if the S1 is present, determining which one of implicit signaling and explicit signaling is used to signal the M1 based on a decoded value of the S1. The processing may include, if implicit signaling is inferred or determined, deriving the M1, or, if explicit signaling is inferred or determined, determining the M1. The processing may include generating a prediction block Pb01 for the current block based on a first piece of motion information M0, the M1, and a weight factor W1. The second syntax (Continued)

element S1 may be a multi-hypothesis prediction, MHP, merge flag and the third syntax element S2 may be a motion information index.

20 Claims, 23 Drawing Sheets

(51) Int. Cl.
 *H04N 19/176* (2014.01)
 *H04N 19/70* (2014.01)

(56) References Cited

U.S. PATENT DOCUMENTS

| | | |
|---|---|---|
| 2014/0044179 A1 | 2/2014 | Li et al. |
| 2015/0131724 A1* | 5/2015 | Lin .................. H04N 19/58 |
| | | 375/240.14 |
| 2015/0139329 A1 | 5/2015 | Nakamura et al. |
| 2020/0195948 A1 | 6/2020 | Li et al. |
| 2021/0195227 A1 | 6/2021 | Lee et al. |
| 2022/0086429 A1 | 3/2022 | Ko et al. |
| 2022/0109850 A1 | 4/2022 | Jang et al. |
| 2024/0275944 A1* | 8/2024 | Deng .................. H04N 19/513 |

OTHER PUBLICATIONS

Coban, Muhammed, et al., "Algorithm description of Enhanced Compression Model 3 (ECM 3)", Joint Video Experts Team (JVET) of ITU-T SG 16 WP 3 and ISO/IEC JTC 1/SC 29—23rd Meeting, by teleconference, Jul. 7-16, 2021, Document No. JVET-X2025-v2 (28 pages).

Extended European Search Report issued in European Patent Application No. 23788690.8, dated Jul. 9, 2025, 12 pages.

* cited by examiner

ENHANCED MULTI-HYPOTHESIS PREDICTION

CROSS REFERENCE TO RELATED APPLICATION

This application is a 35 U.S.C. § 371 National Phase Entry Application from PCT/SE2023/050312, filed Apr. 5, 2023, designating the United States which claims priority to U.S. provisional patent application No. 63/329,939, filed Apr. 12, 2022, the disclosures of which are incorporated herein by reference in their entirety.

TECHNICAL FIELD

This disclosure relates to video encoding and/or decoding of a picture or a video sequence.

BACKGROUND

Video and Picture

A video sequence consists of a series of pictures (also referred to as "images" herein). In the Versatile Video Coding (VVC) standard, each picture is identified with a picture order count (POC) value. The POC value also represents a display order of the picture. A picture with a smaller POC value is displayed before another picture with a larger POC value.

Components

Each component can be described as a two-dimensional rectangular array of sample (also referred to as "pixel" herein) values. It is common that each picture consists of three components: one luma component Y where the sample values are luma values and two chroma components Cb and Cr where the sample values are chroma values.

It is also common that the dimensions of the chroma components are smaller than the luma components by a factor of two in each dimension. For example, the size of the luma component of an HD picture would be 1920×1080 and the chroma components would each have the dimension of 960×540. Components are sometimes referred to as color components.

Coding Unit and Coding Block

A block is one two-dimensional array of samples. In video coding, each component is split into blocks, and the coded video bitstream consists of a series of coded blocks. It is common in video coding that pictures are split into units that cover a specific area of the picture.

Each unit consists of all blocks from all components that make up that specific area and each block belongs fully to one unit. The coding unit (CU) in VVC is an example of units. In VVC, the CUs may be split recursively to smaller CUs. The CU at the top level is referred to as the coding tree unit (CTU).

A CU usually contains three coding blocks, e.g., one coding block for luma and two coding blocks for chroma. The size of luma coding block is the same as the CU.

In the current VVC (i.e., version 1), the CUs can have size of 4×4 up to 128×128.

Parameter Sets, Slice Headers, and Picture Headers

VVC specifies three types of parameter sets: the picture parameter set (PPS), the sequence parameter set (SPS), and the video parameter set (VPS). The PPS contains data that is common for a whole picture, the SPS contains data that is common for a coded layer video sequence (CLVS), and the VPS contains data that is common for multiple CLVSs (e.g., data for multiple layers in the bitstream).

The concept of slices divides the picture into independently coded slices, where decoding of one slice in a picture is independent of other slices of the same picture. Each slice has a slice header comprising syntax elements. Decoded slice header values from these syntax elements are used when decoding the slice.

In VVC, a coded picture contains a picture header. The picture header contains parameters that are common for all slices of the coded picture.

Intra Prediction

In intra prediction, also known as spatial prediction, a block is predicted using the previous decoded blocks within the same picture. The samples from the previously decoded blocks within the same picture are used to predict the samples inside the current block.

A picture consisting of only intra-predicted blocks is referred to as an intra picture.

Inter Prediction

In inter prediction, also known as temporal prediction, blocks of the current picture are predicted using blocks from previously decoded pictures. The samples from blocks in the previously decoded pictures are used to predict the samples of the current block.

A picture that allows inter-predicted block is referred to as an inter picture. The previous decoded pictures used for inter prediction are referred to as reference pictures.

The location of the referenced block inside the reference picture is indicated using a motion vector (MV). Each MV consists of x and y components, which represent the displacements between current block and the referenced block in x or y dimension. The value of a component may have a resolution finer than an integer position. When that is the case, a filtering (typically interpolation) is done to calculate values used for prediction. FIG. 1 shows an example of a MV for the current block C. In the example, the MV=(2,1) indicates that the referenced block can be found two steps to the right and one step down compared to the position of the current block.

An inter picture may use several reference pictures. The reference pictures are usually put into two reference picture lists, L0 and L1. The reference pictures that are output before the current picture are typically the first pictures in L0. The reference pictures that are output after the current picture are typically the first pictures in L1.

Inter predicted blocks can use one of two prediction types, uni- and bi-prediction. Uni-predicted block predicts from one reference picture, either using L0 or L1. Bi-prediction predicts from two reference pictures, one from L0 and the other from L1. FIG. 2 shows an example of the prediction types.

Low Delay Picture and Non-Low Delay Picture

A low delay picture is a picture that has all its reference pictures displayed before the picture. In other words, for a low delay picture, all its reference pictures have smaller POC values than the current POC value.

A non-low delay picture is a picture that has at least one of its reference pictures displayed after the picture. In other words, a non-low delay picture has at least one reference picture with a larger POC value than the current POC.

Fractional MVs, Interpolation Filter, and MV Rounding

The value of the MV's x or y component may correspond to a sample position that has a finer granularity than an integer (sample) position. Those positions are also referred to as fractional (sample) positions.

In VVC, the MV can be at $1/16$ sample position. FIG. 3 depicts several fractional positions in the horizontal (x-) dimension. The solid-square blocks represent integer positions. The circles represent 1/16-position. For example, MV= (4, 10) means the x component is at 4/16 position, the y component is at 10/16 position.

In video coding, a MV rounding process is sometimes used to convert a MV at one position to another target position. One example of rounding is to round a fractional MV position to the nearest integer position.

When a MV is at a fractional position, filtering (typically interpolation) is done to calculate the sample values at those positions. In VVC, the length (number of filter taps) of the interpolation filter for luma component is 8, as shown in Table 1 below.

TABLE 1

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

Residual, Transform, and Quantization

The difference between samples of a source block (which contains original samples) and samples of the prediction block, is often called 'residual block'. This residual block is typically transformed by a spatial transform, such as a discrete sine transform (DST) or a discrete cosine transform (DCT), to remove further redundancy. The transform coefficients are then quantized by a quantization parameter (QP) to control the fidelity of the residual block and thus also the bitrate required to compress the block. A coded block flag (CBF) is used to indicate if there are any non-zero quantized transform coefficients. All coding parameters are then entropy coded at the encoder and decoded at the decoder. If the coded block flag is one, a reconstructed block can then be derived by inverse quantization and inverse transformation of the quantized transform coefficients and then adding that to the prediction block. If the coded block flag is zero, the reconstructed block is identical to the prediction block.

Hierarchical Picture Coding Structure

In a random access configuration, intra coded pictures (or intra pictures for short) are typically positioned with a fixed interval (e.g., every second). Pictures between the intra pictures are typically coded with a bi-directional group of pictures (B-GOP) structure as shown in FIG. 4. In the example shown in FIG. 4, picture 0 is coded first and then picture 8 is coded using picture 0 as its reference picture. Then, picture 8 and picture 0 are used as reference pictures to code picture 4. Then, similarly, picture 2 and picture 6 are coded. Finally, pictures 1, 3, 5, and 7 are coded.

Pictures 1, 3, 5, and 7 are referred to as belonging to the highest hierarchical layer, pictures 2 and 6 are referred to as belonging to the second-highest hierarchical layer, picture 4 is referred to as belonging to the second-lowest layer, and pictures 0 and 8 are referred to as belonging to the lowest layer. Typically, pictures 1, 3, 5, and 7 are not used as reference pictures for any other pictures. They are called non-reference pictures.

The assigned slice QP for each picture are usually different and are set according to the hierarchy level. Higher slice QPs are assigned to pictures that belong to higher hierarchy layers.

Inter Prediction/Motion Information

For an inter block in an inter picture in VVC, the inter prediction information of the inter block consists of the following three elements: (1) a reference picture list flag (RefPicListFlag), (2) a reference picture index (RefPicIdx) per reference picture list used, and (3) a motion vector (MV) per reference picture used. A reference picture list flag (RefPicListFlag) signals which reference picture list is used. When the value of RefPicListFlag is equal to 0, L0 is used. When the value of RefPicListFlag is equal to 1, L1 is used. When the value of RefPicListFlag is equal to 2, both L0 and L1 are used. The reference picture index (RefPicIdx) signals which reference picture inside the reference list is to be used for predicting the current block. The motion vector (MV) signals the position inside the reference picture that is used for predicting the current block.

The inter prediction information is also referred to as motion information. The decoder stores the motion information for each inter block. In other words, an inter block maintains its own motion information.

Encoder Decision and Rate Distortion (RD) Cost

In practice, for an encoder to decide the best prediction mode for a current block, the encoder will evaluate many or all of the possible prediction modes for the current block and select the prediction mode that yields the smallest Rate-Distortion (RD) cost.

The RD cost is calculated as D+λ*R. The D (Distortion) measures the difference between the reconstructed block and the corresponding source block. One commonly used metric for calculating D is the sum of squared errors $SSE=\Sigma_{x,y}(P_A(x, y)-P_B(x, y))^2$, where the $P_A$ and $P_B$ are the sample values in the two blocks A and B respectively. The R (Rate) is usually an estimation of the number of bits to be spent on encoding the mode. The λ is a trade-off parameter between R and D.

Motion Information Signaling

VVC includes several methods for implicit signaling of motion information for each block, including the merge method and the subblock merge method. A common motivation behind the implicit methods is to inherit motion information from neighboring coded blocks. This often works in practice due to spatial correlation of close-by blocks (e.g., because nearby blocks often behave similarly).

Merge (Block Merge) Method and Merge Mode

The merge method is similar to the one in the High Efficiency Video Coding (HEVC) standard. The method is sometimes referred to as the block merge method because the derived motion information is used for generating the samples of the entire block.

The method first generates a list of motion information candidates. This list is also referred to as the merge list. The candidates are derived from previously coded blocks. These previously coded blocks can be spatially adjacent neighboring blocks or temporally collocated blocks relative to the current block. FIG. 5 shows the spatial neighboring blocks: left (L), top (T), top-right (TR), left-bottom (LB), and top-left (TL).

The merge list construction process usually checks the previously coded blocks in a predefined order (e.g., T-L-TR-LB-TL). For each previously coded block being checked, if this previously coded block is inter coded and its motion information has no duplicates in the list, then the motion information of this previously coded block is added to the merge list.

After the merge list is generated, one of the candidates inside the list is used to derive the motion information of the current block. The candidate selection process is done on the encoder side. An encoder would select a best candidate from the list and encode an index (merge_index) in the bitstream to signal to a decoder. The decoder receives the index, follows the same merge list derivation process as the encoder, and uses the index to retrieve the correct candidate.

The blocks that use the block merge method are sometimes referred to as blocks in merge mode.

In the current development of ECM (an enhanced compression model studied in JVET with compression capabilities beyond VVC), non-adjacent spatial blocks are also considered as sources of motion information during the merge list construction. FIG. 6 shows some of the non-adjacent spatial blocks (marked with NA1, NA2 and NA3) considered as sources of motion information during the merge list construction.

Subblock Merge Method and Subblock Motion Refinement

VVC also includes a subblock merge method and also a method of subblock-based motion refinement. VVC splits a current block into a number of subblocks and allows each subblock to have its own motion information. FIG. 7 shows an example of a current block and its subblocks. Each subblock maintains its own motion information.

Explicit Motion Information Signaling

VVC also includes an explicit motion information signaling method, such as alternative motion vector prediction (AMVP). For a current inter block that is coded with AMVP, the number of reference pictures, reference picture indices, and motion vectors for the current inter block are explicitly signaled and encoded into the bitstream.

The explicit motion information signaling is usually chosen by an encoder when directly inheriting or reusing motion information from previously coded inter blocks do not fit well for a current block. For example, when the previously coded blocks and the current block belong to different objects, it is likely that the motion of the previously coded blocks and that of the current block do not correlate well.

When an encoder decides to use explicit signaling for the current block's MV, the process usually involves deriving of a motion vector predictor (MVP). The MVP is derived from MVs of previously coded blocks. After the MVP is derived, a motion vector difference (MVD) between the MVP and the current MV is calculated as MVD=MV−MVP. FIG. 8 shows an example of the MVD derivation.

As shown in FIG. 8, the MVD also has two components: an x-component and a y-component. Each component has information of two types: magnitude and sign. Both the magnitude and sign information (if the magnitude is non-zero) of the x- and y-components are signaled in a bitstream. For example, if the current block's MV is (+10, −5), and the derived MVP is (+7, +3), then the MVD would be (+3, −8), where 3=10−7 and −8=−5−3. The magnitudes 3 and 8, as well as the signs + and −, are all signaled in the bitstream.

For a decoder to reconstruct the MV of the current block, the decoder decodes the magnitude and sign information of both the x- and the y-component of the MVD from the bitstream. Then, the decoder follows the same predictor derivation process as the encoder to derive the MVP from MVs of previously coded blocks, and the MV is reconstructed by using the MVP and MVD. Using the example above, the decoder decodes the magnitudes 3 and 8 as well as the signs + and − from the bitstream to get the MVD (+3, −8). The decoder then uses the same predictor derivation process to get MVP which is (+7, +3). The decoder then derives the MV as (+10, −5), where 10=3+7 and −5=−8+3.

Multi-Hypothesis Prediction (MHP)

Multi-hypothesis prediction (MHP) is a tool included in ECM. MHP allows the signaling of additional motion information in addition to conventional bi-predictive motion information when AMVP is used for a current block. MHP also allows the signaling of additional motion information when the current block is in merge mode. Each type of motion information constitutes a prediction hypothesis for the samples of the current block.

In the current ECM common test configuration (an encoding configuration that is suggested to be used for testing), up to two pieces of additional motion information can be signaled for a current block. It is possible to allow the signaling of more than two pieces of additional motion information for the current block by changing the encoding configuration.

In a first example, let's assume that one piece of additional motion information is signaled in addition to the conventional bi-predictive motion information. Pbi denotes the prediction block generated using the conventional bi-predictive motion information, Ph0 denotes the prediction block generated using the additional motion information. The final prediction block Pf0 would be a weighted combination of the Pbi and Ph0:

$$Pf0 = (1 - \alpha 0) * Pbi + \alpha 0 * Ph0$$

where the α0 is a weighting factor and has a value of ¼ or −⅛ in the existing ECM.

When there is more than one piece of additional motion information signaled, the final prediction block is derived by iteratively accumulating each prediction block that is generated using the additional motion information. For example, assuming there are two pieces of additional motion information signaled, using the same notation as above, Pf0 is generated first based on the conventional motion information and the first piece of additional motion information. Ph1 denotes the prediction block generated using the second piece of additional motion information. The final prediction block Pf1 would be a weighted combination of the Pf0 and Ph1:

$$Pf0 = (1 - \alpha 0) * Pbi + \alpha 0 * Ph0$$

$$Pf1 = (1 - \alpha 1) * Pf0 + \alpha 1 * Ph1$$

where each piece of additional motion information is associated with a weighting factor. The first piece of additional motion information is associated with a weighting factor $\alpha 0$. The second piece of additional motion information is associated with another weighting factor $\alpha 1$.

FIG. 9 gives a general illustration of the parsing steps of the existing MHP design in ECM. As can be seen in FIG. 9, the weighting factor that is associated with each additional piece of motion information is explicitly signaled and present in the bitstream. The associated weighting factor with each additional motion information indicates how to combine the prediction samples from this additional motion information with the existing prediction samples from the already decoded motion information of the current block.

Each additional piece of motion information (which contains a reference picture list flag, a reference picture index per reference picture list, and motion vector information per reference picture list), can either be explicitly or implicitly signaled. In the existing MHP design, a multi-hypothesis merge flag (also referred to as MHP merge flag in the text below) is always signaled for each additional motion information to indicate whether explicit or implicit signaling is used.

When the implicit signaling is used, a motion information index is signaled. In this case, a construction of a motion information list based on the motion information from previously coded blocks is done first. The decoder then uses the decoded index to fetch the corresponding motion information from the list. The motion information list construction process is similar to the merge list construction process. A number of previously decoded blocks are selected as candidates for having their motion information being included in the motion information list. The construction process checks those previously decoded blocks in a predefined order and derives whether the motion information should be added (to the list) based on the motion information from the previously decoded blocks.

The motion information list used in the existing MHP design is a list of uni-motion pieces of information (where each motion information entry only uses L0 or L1). Table 2 below shows an example of a motion information list with uni-motion information entries, where BLK_A, BLK_B, and BLK_C are some of the previously decoded blocks.

TABLE 2

| Index | Motion information | |
|---|---|---|
| 0 (Derived from the L0 of BLK_A) | RefPicListFlag = 1 (only L0 is used) RefPicIdx L0: 1  RefPicIdx L1: — MV L0: (−1, 2)  MV L1: — | |
| 1 (Derived from the L1 of BLK_B) | RefPicListFlag = 2 (only L1 is used) RefPicIdx L0: —  RefPicIdx L1: 0 MV L0: —  MV L1: (0, 0) | |
| 2 (Derived from the L0 of BLK_C) | RefPicListFlag = 1 (only L0 is used) RefPicIdx L0: 0  RefPicIdx L1: — MV L0: (3, 1)  MV L1: — | |

When the explicit signaling is used, a reference picture index, a motion vector predictor flag, and a motion vector difference are signaled. In other words, the additional motion information is explicitly signaled in the bitstream.

SUMMARY

There are several drawbacks with the existing multi-hypothesis prediction (MHP) design. One drawback is that, for each additional signaled motion information, an MHP merge flag is always signaled. It would be beneficial to make the presence of the flag conditioned under a certain criterion. For example, the MHP merge flag may not be present when it is desired to have all the additional pieces of motion information being signaled using implicit signaling method (e.g., to achieve better prediction accuracy). For another example, the MHP merge flag may not be present when the motion information list has zero entries (e.g., when there is no motion information that can be directly reused). In both examples, the MHP merge flag would be a constant, and there is no need to have the flag signaled and present in the bitstream. In other words, the MHP merge flag is redundantly signaled in the bitstream in these examples, and bits are wastefully spent.

Another drawback is that the construction of the motion information list (when implicit signaling is used) only considers one of the L0 or L1 motion vectors from the motion information of a first previously decoded block before checking the L0 or L1 motion vectors from a second previously decoded block. This is inefficient because both the L0 and L1 motion vectors from the motion information of the first previously decoded block may provide better fits than the motion vector from the second block. For example, when the second block has larger spatial distance to the current block than the first block, both L0 and L1 motion vectors of the first block may be more relevant than any of the motion vectors of the second block.

Still another drawback is that the construction of the motion information list only considers motion information from previously coded blocks, which may be inefficient, especially when the current block has different motion characteristics than the previously coded blocks.

Aspects of the invention may overcome one or more of the drawbacks of the existing MHP design by using (1) conditional signaling of the MHP merge flag to avoid redundancy and/or (2) a better motion information list construction process. Aspects of the invention may include one or more modifications to the existing MHP.

According to the first aspect of the present invention, there is provided a method for processing a current block within a current picture. The method comprises decoding a first syntax element S0 from a coded video bitstream. The method comprises determining a first piece of motion information M0 of the current block based on at least the decoded first syntax element S0. The method comprises determining that a second piece of motion information M1 for the current block is signaled in the coded video bitstream. The method comprises, if the second piece of motion information M1 for the current block is determined to be signaled in the coded video bitstream, determining whether a second syntax element S1 is present in the coded video bitstream. The method comprises, if the second syntax element S1 is determined to not be present in the coded video bitstream, inferring which one of implicit signaling and explicit signaling is used to signal the second piece of motion information M1. The method comprises, if the second syntax element S1 is determined to be present in the coded video bitstream, decoding a value for the second syntax element S1 and determining which one of implicit signaling and explicit signaling is used to signal the second piece of motion information M1 based on the decoded value of the second syntax element S1. The method comprises, if implicit signaling is inferred or determined to be used to signal the second piece of motion information M1, decoding a value of a third syntax element S2 from the coded video bitstream, determining a weight factor W1 associated with the second piece of motion information M1 from the coded video bitstream, and deriving the second piece of motion information M1 based on the decoded value of the third syntax element S2. The method comprises, if explicit signaling is inferred or determined to be used to signal the second piece of motion information M1, decoding a value of a fourth syntax element S3 from the coded video bitstream, determining the weight factor W1 associated with the second piece of motion information M1 from the coded video bitstream, and determining the second piece of motion information M1 based on the decoded value of the fourth syntax element S3. The method comprises generating a prediction block Pb01 for the current block based on the first piece of motion information M0, the second piece of motion information M1, and the weight factor W1. The second syntax element S1 may be a multi-hypothesis prediction (MHP) merge flag. The third syntax element S2 may be a motion information index.

According to the second aspect of the present invention, there is provided a decoder. configured to perform the method according to the first aspect.

According to the third aspect of the present invention, there is provided a computer program including instructions for adapting an apparatus to perform the method according to the first aspect.

According to the fourth aspect of the present invention, there is provided a carrier containing the computer program, and the carrier may be one of an electronic signal, optical signal, radio signal, or compute readable storage medium.

According to the fifth aspect of the present invention, there is provided an apparatus. The apparatus may include processing circuitry and a memory. The memory may contain instructions executable by said processing circuitry, and the apparatus may be operative to perform the method according to the first aspect.

Aspects of the modified/enhanced MHP may provide the advantage of improved compression efficiency. For example, Table 3 below shows the objective performance of the modified/enhanced MHP compared to ECM-4.0, which is the current ECM software, under the ECM random access common test configuration. The numbers in Table 3 show the relative bit-cost for the proposed method to achieve equivalent objective video quality (measured in peak signal-to-noise (PSNR)) as ECM-4.0. The Bjontegaard rate (BD-rate) number −0.X % means the proposed solution requires 0.X % less bits than ECM-4.0 for the same quality for different sequence classes.

TABLE 3

|  | Y | U | V |
| --- | --- | --- | --- |
| Class A1 |  |  |  |
| Class A2 |  |  |  |
| Class B | −0.11% | −0.12% | −0.08% |
| Class C | −0.06% | −0.15% | −0.01% |
| Class E |  |  |  |
| Overall |  |  |  |
| Class D | −0.08% | −0.11% | 0.02% |

BRIEF DESCRIPTION OF THE DRAWINGS

The accompanying drawings, which are incorporated herein and form part of the specification, illustrate various embodiments.

DETAILED DESCRIPTION

Figure 1:
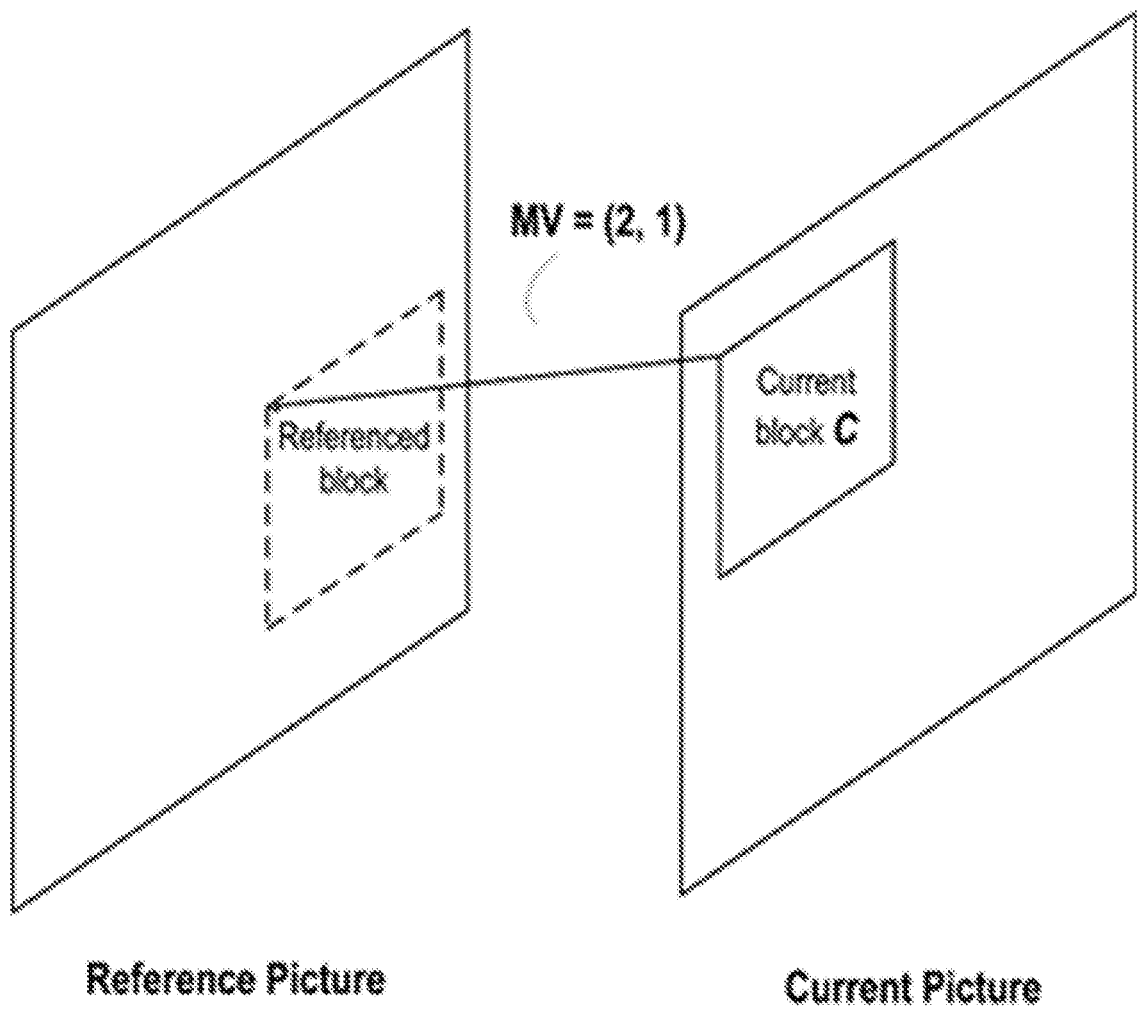
FIG. 1 shows an example of a motion vector (MV) for a current block C.
Figure 2:
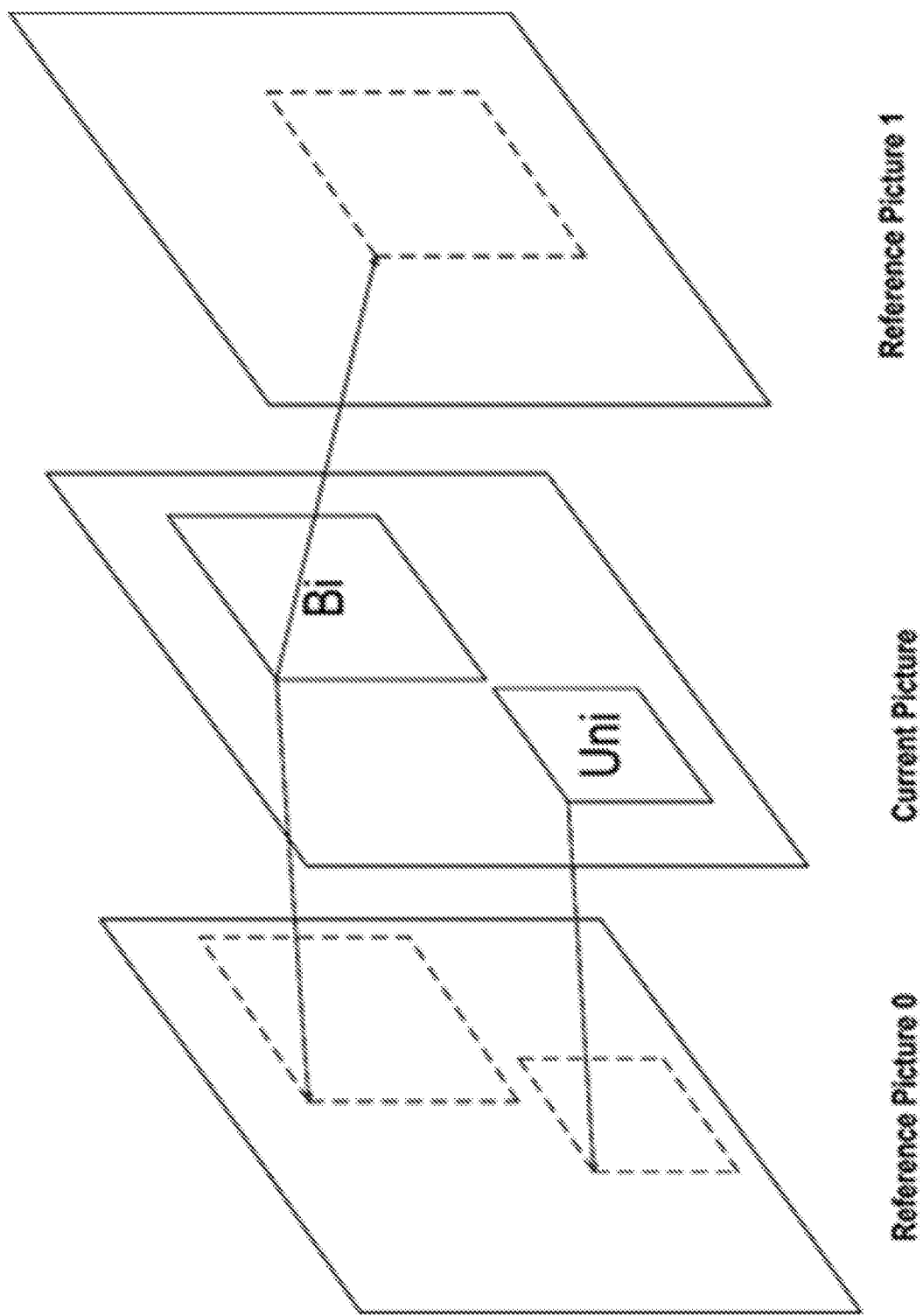
FIG. 2 shows an example of Uni- and Bi-inter prediction.
Figure 3:
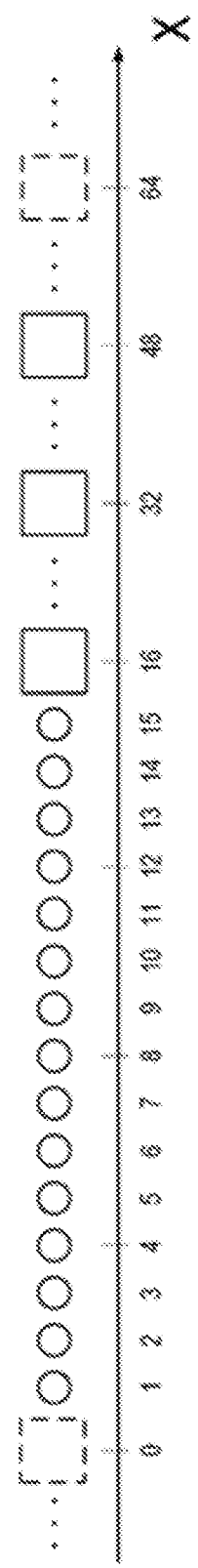
FIG. 3 shows motion vector sample positions in the horizontal (x) dimension.
Figure 4:
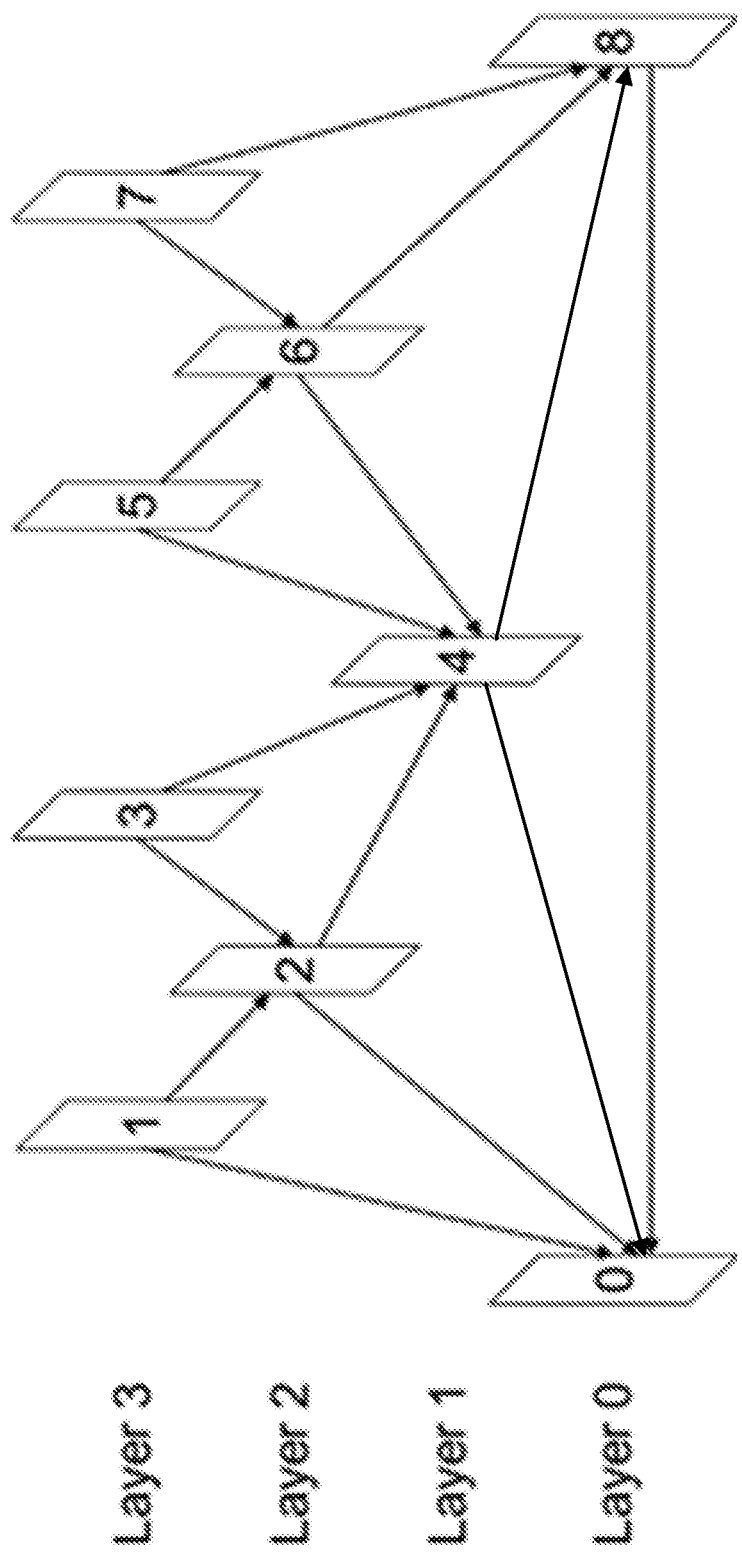
FIG. 4 shows an example of a four-layer bi-directional group of pictures (B-GOP) structure using two reference pictures per picture.
Figure 5:
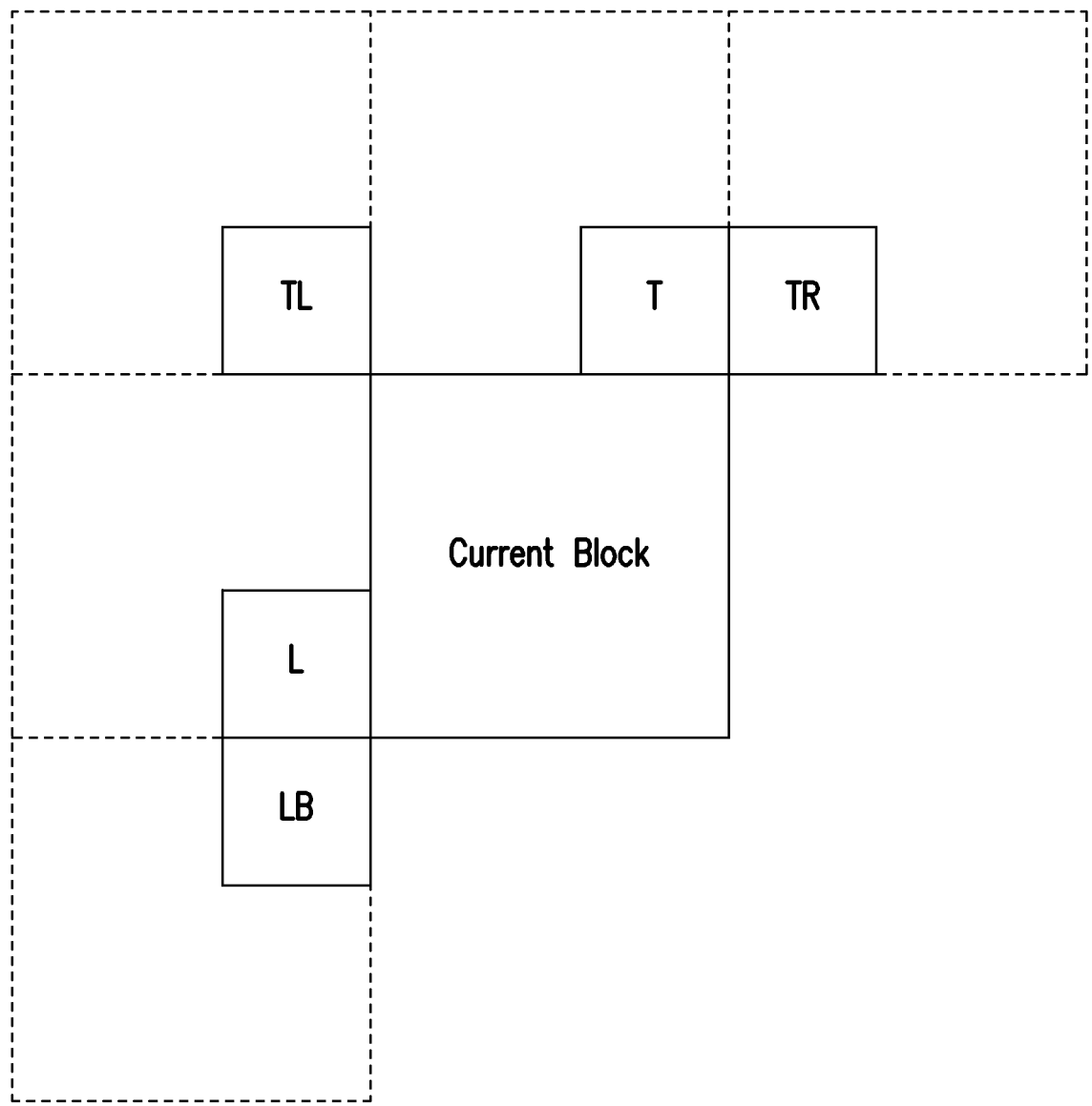
FIG. 5 shows possible spatial blocks for fetching neighboring motion information.
Figure 6:
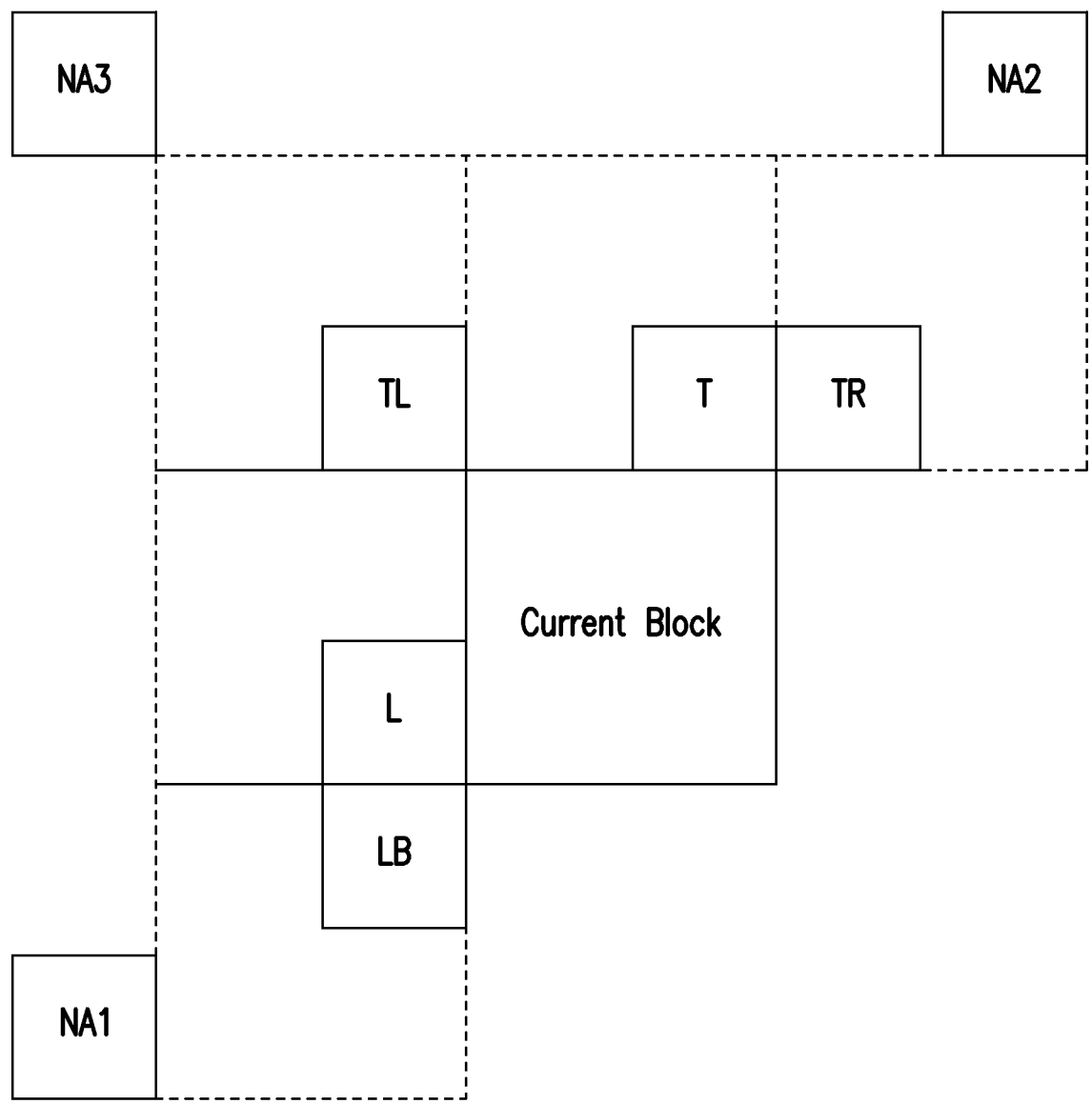
FIG. 6 shows possible adjacent spatial blocks and non-adjacent spatial blocks for fetching motion information.
Figure 7:
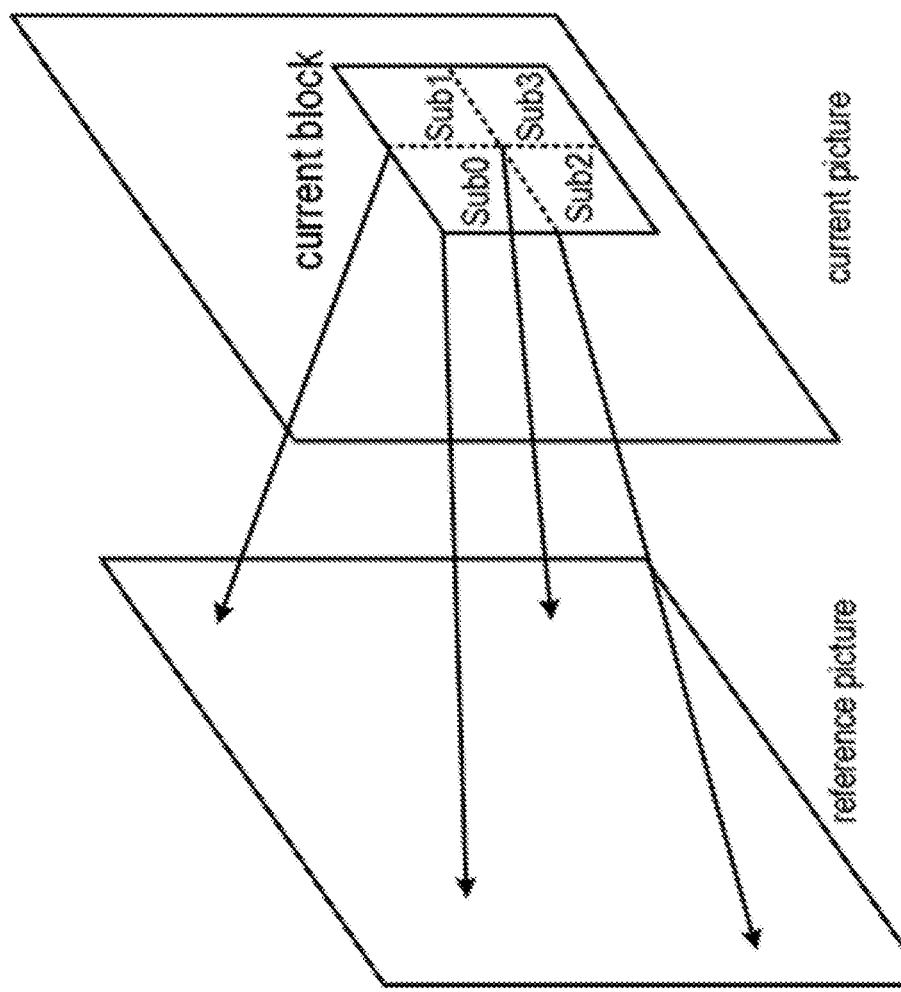
FIG. 7 shows an example of subblocks and their corresponding motion.
Figure 7:
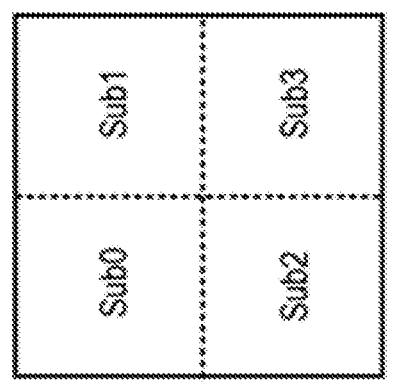
Figure 8:
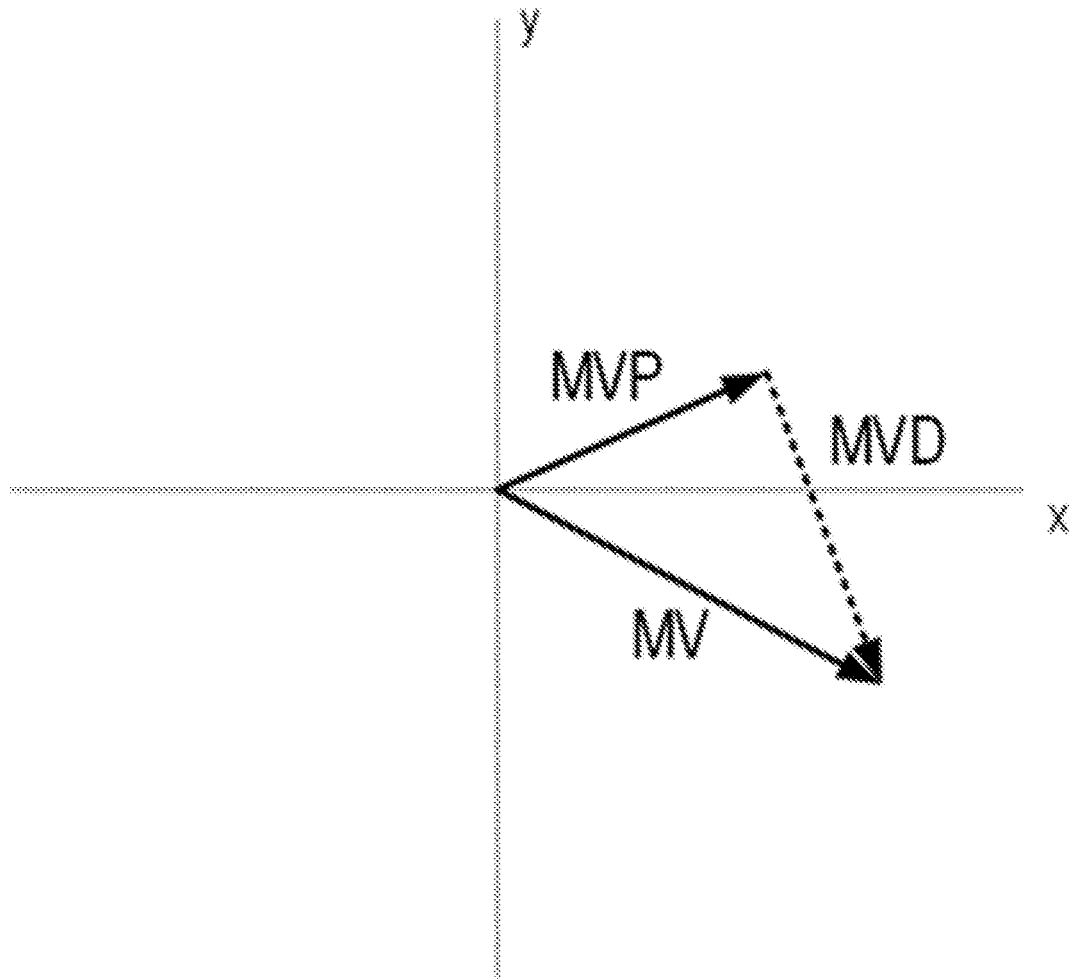
FIG. 8 shows an example of motion vector difference (MVD) derivation.
Figure 9:
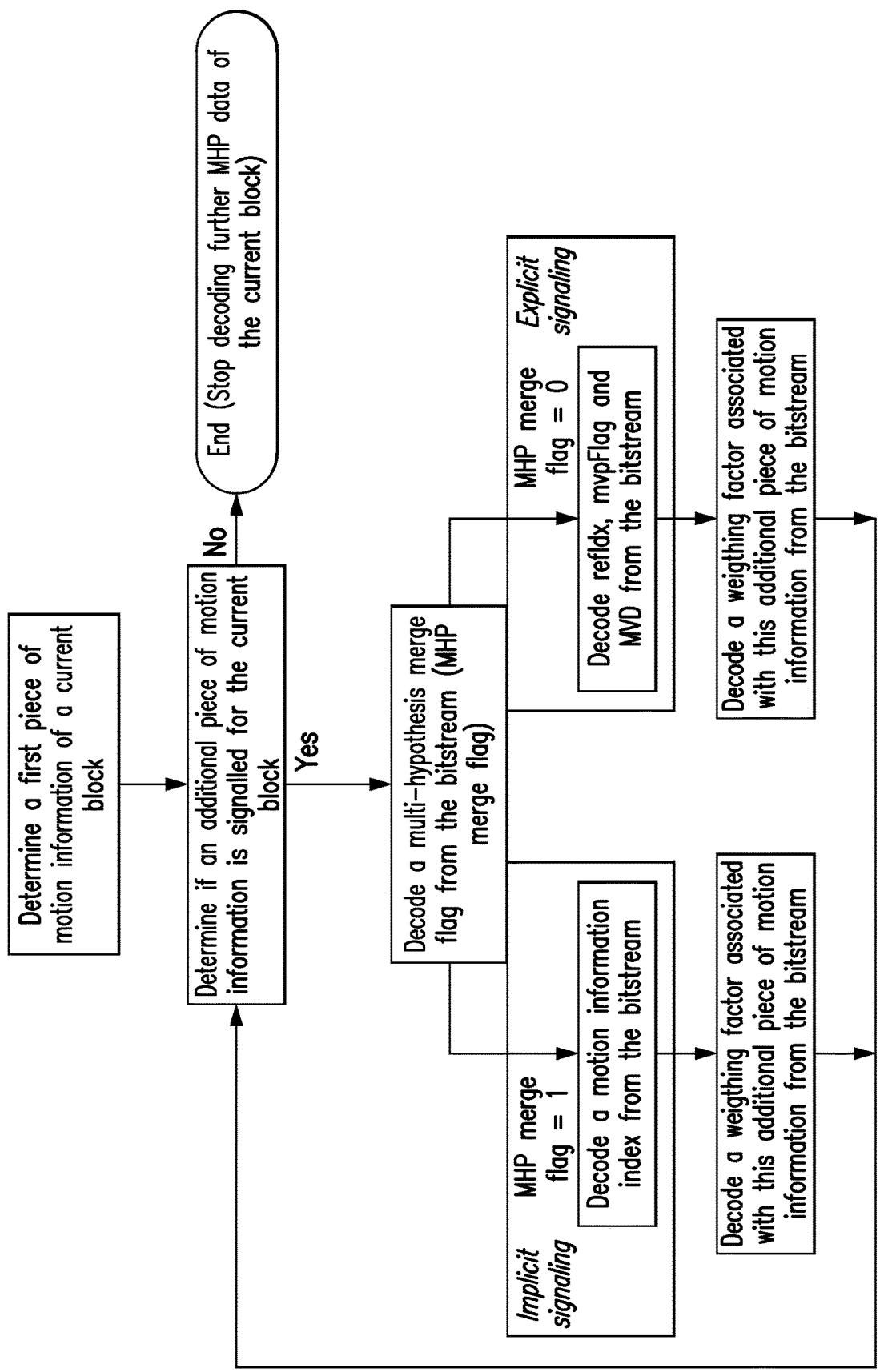
FIG. 9 shows a general illustration of the parsing steps of the existing multi-hypothesis prediction (MHP) in Enhanced Compression Model (ECM).
Figure 10:
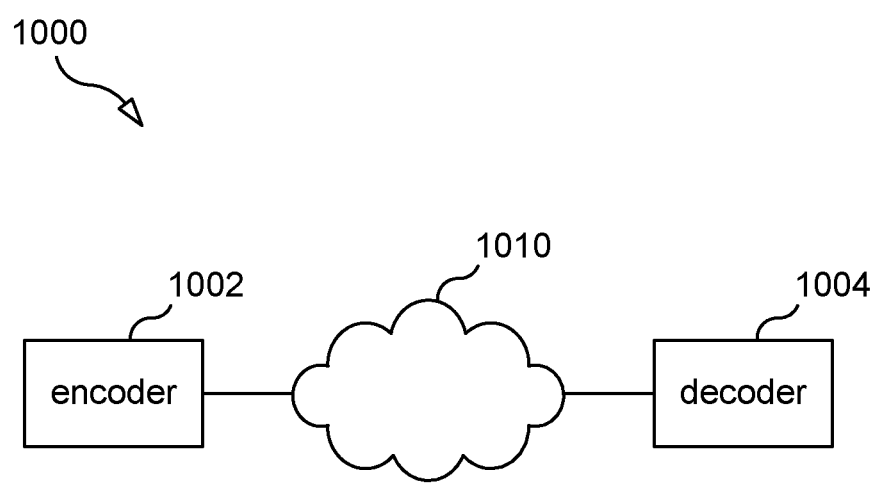
FIG. 10 illustrates a system comprising an encoder and a decoder according to some aspects.

FIG. 10 illustrates a system 1000 according to some aspects. System 1000 includes an encoder 1002 and a decoder 1004. In the example shown, decoder 1004 receives, via a network 1010 (e.g., the Internet or other network), encoded images produced by encoder 1002.

Figure 11:
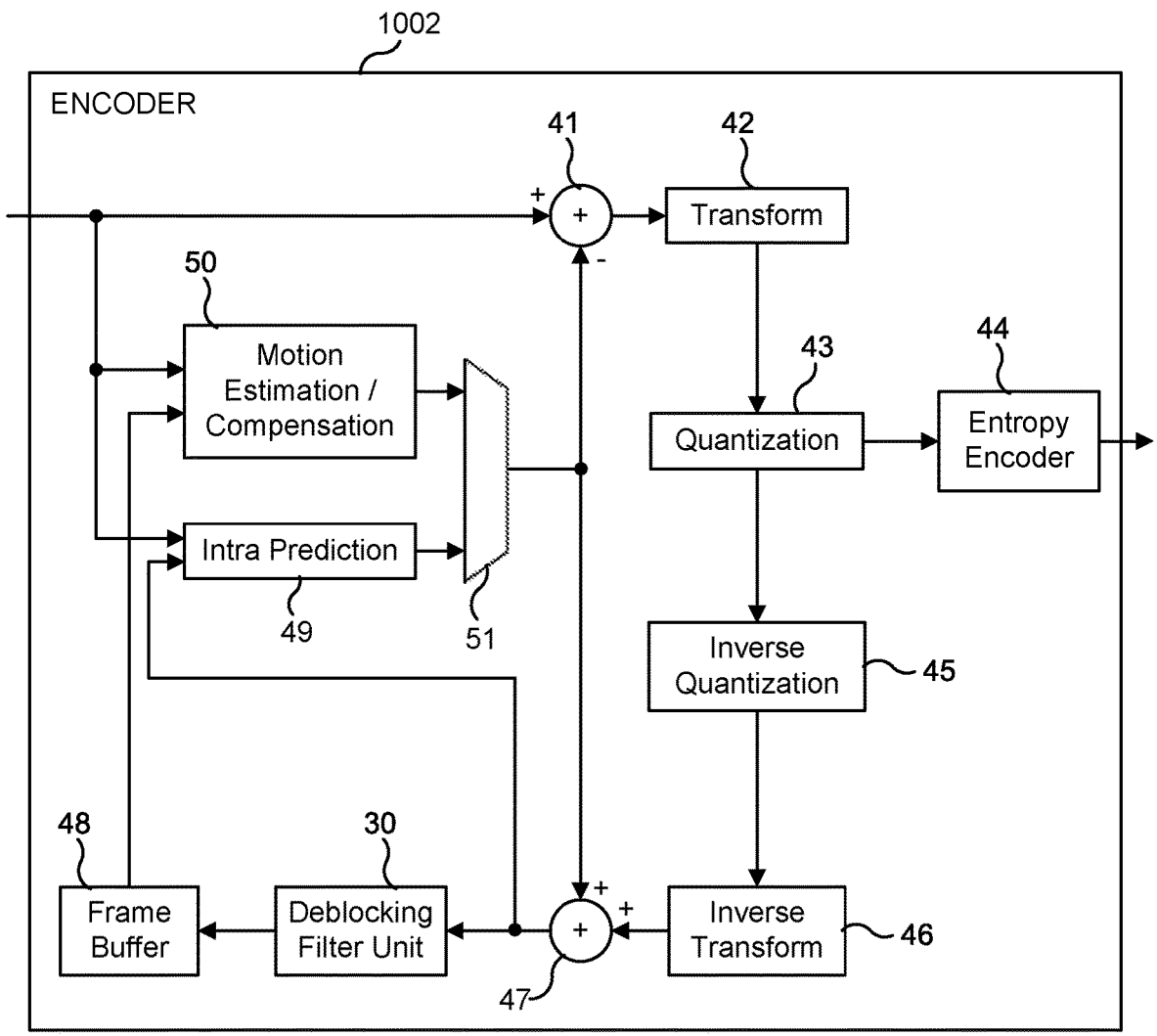
FIG. 11 illustrates an example encoder according to some aspects.

FIG. 11 is a schematic block diagram of the encoder 1002 according to some aspects. In some aspects, the encoder 1002 may be for encoding a block of pixel values in a video frame (e.g., picture) of a video sequence according to some embodiments. In some aspects, as shown in FIG. 11, the encoder 1002 may include a motion estimator 50 that predicts a current block by performing a motion estimation from an already provided block in the same frame or in a previous frame. The result of the motion estimation may be a motion or displacement vector associated with the reference block, in the case of inter prediction. In some aspects, the motion compensator 50 may utilize the motion vector for outputting an inter prediction of the block. In some aspects, the encoder 1002 may include an intra predictor 49 that computes an intra prediction of the current block. In some aspects, the encoder 1002 may include a selector 51 that receives outputs from the motion estimator/compensator 50 and the intra predictor 49 as inputs and either selects intra prediction or inter prediction for the current block. In some aspects, the output from the selector 51 may be input to an error calculator in the form of an adder 41 that also receives the pixel values of the current block. In some aspects, the adder 41 may calculate and output a residual error as the difference in pixel values between the block and its prediction. In some aspects, the encoder 1002 may include a transformer 42 that transforms the error, such as by a discrete cosine transform. In some aspects, the encoder 1002 may include a quantizer 43 that quantizes the transformed error. In some aspects, the encoder 1002 may include an encoder 44, such as an entropy encoder, that codes the quantized error. In inter coding, the estimated motion vector may also be brought to the encoder 44 for generating the coded representation of the current block. In some aspects, the encoder 1002 may include an inverse quantizer 45 and an inverse transformer 46 that receive the transformed and quantized residual error for the current block and retrieve the original residual error. In some aspects, the encoder may include an adder 47 that adds the original residual error to the block prediction output from the motion compensator 50 or the intra predictor 49 to create a reference block that can be used in the prediction and coding of a next block. In some aspects, the encoder 1002 may include a deblocking filter unit 30 that processes the new reference block in order to perform deblocking filtering to combat any blocking artifact. In some aspects, the encoder 1002 may include a frame buffer 48 that temporarily stores the processed new reference block, and it may be available to the intra predictor 49 and/or the motion estimator/compensator 50.

Figure 12:
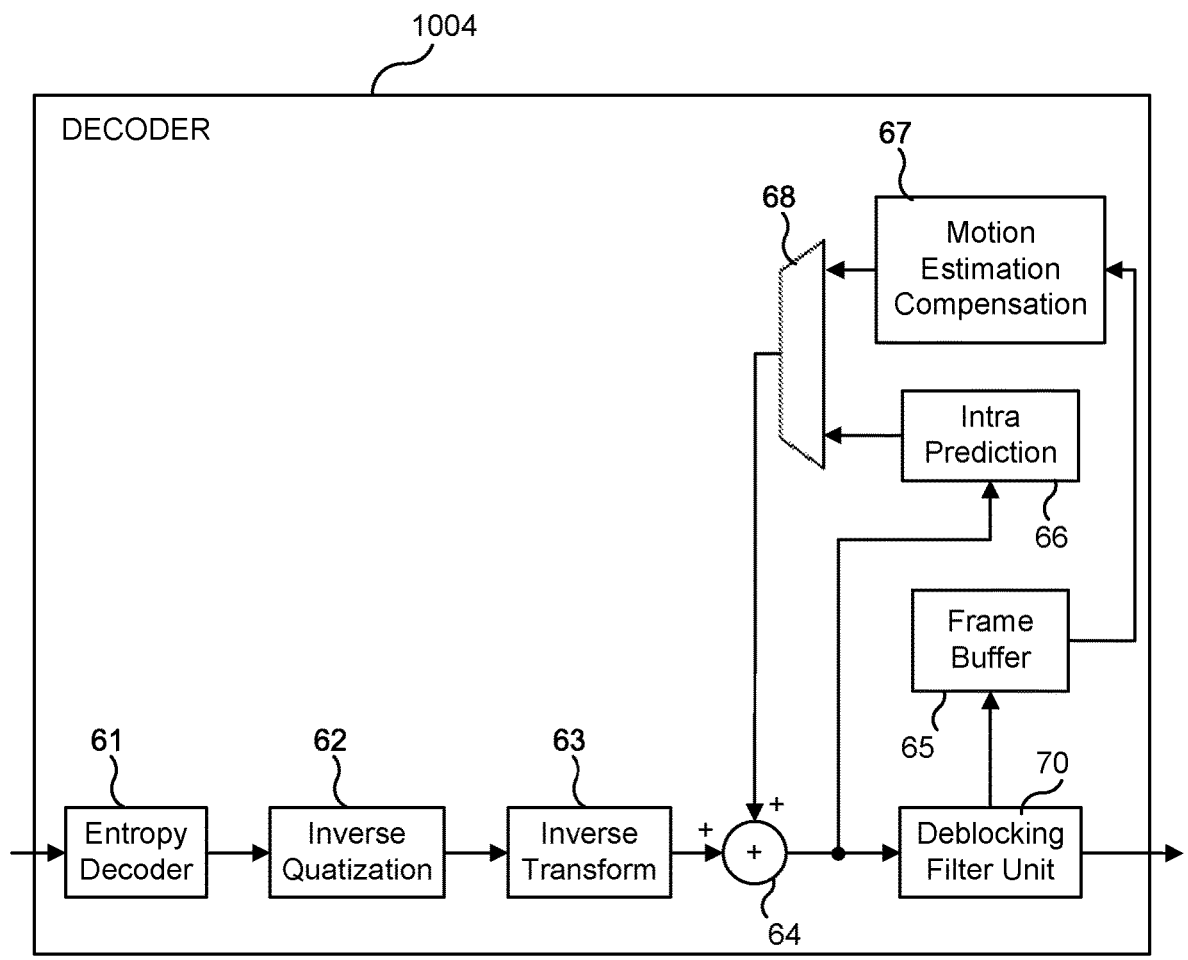
FIG. 12 illustrates an example decoder according to some aspects.

FIG. 12 is a schematic block diagram of the decoder 1004 according to some aspects. In some aspects, as shown in FIG. 12, the decoder 1004 may include a decoder 61, such as an entropy decoder, for decoding an encoded representation of a block to get a set of quantized and transformed residual errors. In some aspects, the decoder 1004 may include an inverse quantizer 62 that dequantizes the residual errors and an inverse transformer 63 and inverse transforms the residual errors to get a set of residual errors. In some aspects, the decoder 1004 may include an adder 64 that adds the residual errors to the pixel values of a reference block. In some aspects, the decoder 1004 may include a motion estimator/compensator 67 and intra predictor 66 that each determine a reference block, and a selector 48 selects one of the reference blocks depending on whether inter or intra prediction is performed. In some aspects, the selector 68 may be interconnected to the adder 64, the motion estimator/compensator 67, and the intra predictor 66. In some aspects, the resulting decoded block output form the adder 64 may be input to a deblocking filter unit 70 in order to deblocking filter any blocking artifacts. In some aspects, the filtered block may be output from the decoder 1004 and may be provided to a frame buffer 65 for temporary storage so that the filtered block may be used as a reference block for a subsequent block to be decoded. In some aspects, the frame buffer 65 may be connected to the motion estimator/compensator 67 to make the stored blocks of pixels available to the motion estimator/compensator 67. In some aspects, the output from the adder 64 may preferably be also input to the intra predictor 66 to be used as an unfiltered reference block.

In some aspects, the motion information of aspects of the invention may contain a reference picture list flag, a reference picture index, and/or a motion vector.

Aspects of the invention relate to an enhanced method for multi-hypothesis prediction (MHP). In some aspects, the enhanced MHP method may include one or more modifications to the existing MHP method. In some aspects, the enhanced MHP method may include: (1) adding a motion information list length check when parsing the MHP merge flag, (2) when constructing the motion information list, considering both the L0 motion vector and the L1 motion vector (if they are present) from a first previously decoded block before moving on to check motion vectors from a second previously decoded block, (3) when constructing the motion information list for predicting an additional piece of motion information of a current block, considering the already signaled or decoded motion information of the current block, and/or (4) introducing a refinement process after the derivation of the motion information list in which the entries in the motion information list are further refined and/or reordered.

In some aspects, checking the motion information list length may enable the encoder 1002 to not signal the MHP merge flag such that the MHP merge flag is not present in the bitstream when the motion information list length is 0, and, in that case, the decoder 1004 may directly infer or derive the MHP merge flag to be 0. The motion information list length check is described in detail, for example, with reference to the process 1300 below (e.g., around the steps 1308 and/or 1310 that determine the presence and value of the syntax element S1, which may correspond to the MHP merge flag).

When constructing the motion information list, the checking order in the existing MHP method is BLK_A_L0 then BLK_B_L1, where BLK_A is a first previously decode block and BLK_B is a second previously decoded block. In some aspects in which both the L0 motion vector and the L1 motion vector (if they are present) from a first previously decoded block are considered before moving on to check motion vectors from a second previously decoded block, the modified checking order may be BLK_A_L0, then BLK_A_L1, and then BLK_B_L1. In some aspects, if there is a third previously decoded block BLK_C, the modified checking order may be BLK_A_L0, BLK_A_L1 then BLK_B_L1, BLK_B_L0, and then BLK_C_L0 (instead of BLK_A_L0, BLK_B_L1, BLK_C_L0 as in the existing MHP method).

In some aspects, considering both the L0 motion vector and the L1 motion vector (if they are present) from a first previously decoded block before moving on to check motion vectors from a second previously decoded block may be activated or enabled only when the current picture is a non-low delay picture. In some aspects, both the L0 and L1 motion vectors may be considered when the current picture is a non-low delay picture because, when the current picture is a non-low delay picture, both the L0 and L1 motion vectors may give an equal amount of useful prediction information (e.g., because they are more likely to be referring to different directions). In some aspects, only one of the L0 and L1 motion vectors may be considered when the current picture is a low delay picture because, when the current picture is a low delay picture, the L0 and L1 motion vectors may give similar prediction information. This is described in further detail below.

In some alternative aspects, the decoder 1004 may check the time direction of each motion vector of the first block (e.g., to determine whether the motion vector points to a block forward or backward in time). In some aspects, the time direction of the L0 motion vector of the first block may be determined, for example, by comparing the POC of the L0 picture with the POC of the current picture. In some aspects, if L0_POC−POC<0, the time direction is negative, which indicates that the L0 motion vector is referring to a block in an earlier picture in the display order. In some aspects, if L0_POC−POC>0 the time direction is positive, which indicates that the L0 motion vector is referring to a block in a later picture in the display order. In some aspects, the decoder 1004 may determine whether the time direction for L1 is positive or negative in a similar fashion. In some aspects, if the time directions are different, then the decoder 104 may consider both L0 and L1 of the first block before any motion vector of the second block (e.g., the checking order BLK_A_L0, then BLK_A_L1, and then BLK_B_L1 in the example above). In some aspects, if the time directions are the same, then the decoder 1004 may consider only one of the L0 and L1 motions vectors from each block before moving on to check a motion vector of the next block (e.g., the checking order BLK_A_L0 then BLK_B_L1 would be used in the example above). This is described in further detail below.

In some aspects, the already signaled or decoded motion information of the current block may be considered when constructing the motion information list for predicting an additional piece of motion information of a current block because using already signaled motion information of the current block can provide a better fit compared to the motion information from previously decoded blocks. This is described in further detail below.

In some aspects, the refinement process after the derivation of the motion information list that refines and/or reorders the entries in the motion information list may adjust or refine the motion information entries in the list to achieve a better prediction of a corresponding additional piece of motion information. This is described in further detail below.

Figure 13:
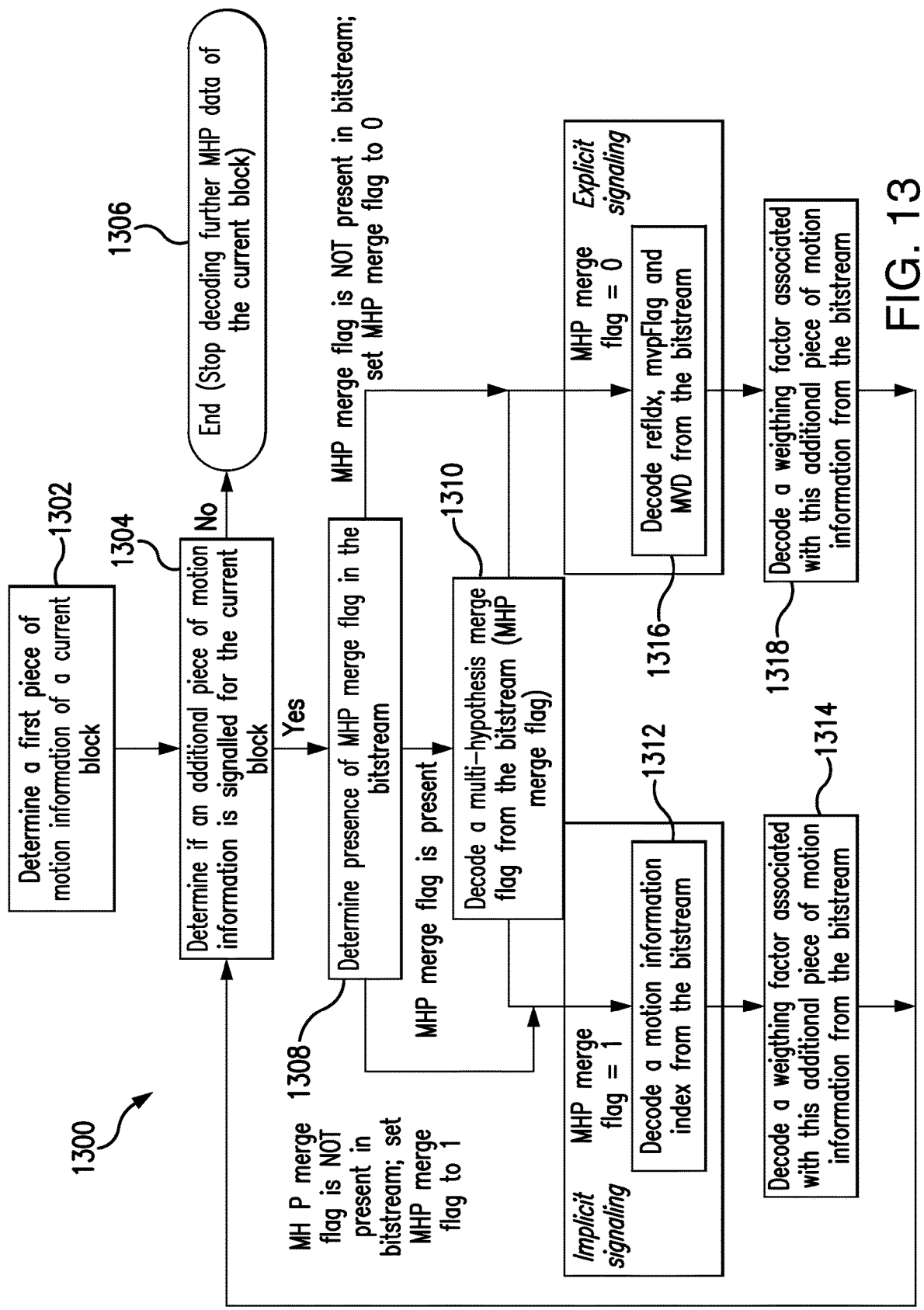
FIG. 13 illustrates the parsing steps of an enhanced multi-hypothesis prediction (MHP) according to some aspects.

FIG. 13 illustrates a process 1300 according to some aspects. In some aspects, the process 1300 may be for decoding a current block within a current picture inside a coded video bitstream. In some aspects, some or all of the steps of the process 1300 may be performed by a decoder 1004.

In some aspects, the process 1300 may include a step 1302 in which the decoder 1004 determines a first piece of motion information M0 of the current block based on at least a first syntax element S0 decoded from the bitstream.

In some aspects, the process 1300 may include a step 1304 in which the decoder 1004 determines whether there is at least a second piece of motion information M1 signaled for the current block in the bitstream. In some aspects, if the decoder 1004 determines in step 1304 that there is not at least a second piece of motion information M1 signaled for the current block in the bitstream, the process 1300 may proceed to a step 1306 in which the decoder 1004 stops decoding further MHP data of the current block.

In some aspects, if the decoder 1004 determines in step 1304 that there is not at least a second piece of motion information M1 signaled for the current block in the bitstream, the process 1300 may proceed to a step 1308 in which the decoder 1004 determines whether a second syntax element S1 is present in the bitstream. In some aspects, the second syntax element S1 may correspond to the MHP merge flag for the second piece of motion information M1. In some aspects, the syntax element S1 (if present) may have a value of A or B (e.g., 0 or 1).

In some aspects, determining in step 1308 whether a second syntax element S1 is present in the bitstream may include determining a value V1 based on a fifth syntax element S4 in a parameter set P. In some aspects, the parameter set P may be a sequence parameter set (SPS), a picture parameter set (PPS), a slice header, or a picture header. In some aspects, determining in step 1308 whether the second syntax element S1 is present in the bitstream may further include comparing the value V1 to a constant value C0. In some aspects, the syntax element S1 may be determined to be present when the value V1 is greater than the constant value C0. In some aspects, the constant value C0 may be equal to, for example, 0, 1, or 2. In some aspects, the value V1 may indicate a maximum length of the motion information list CANDLIST_M1. That is, in some aspects, the value V1 may represent the maximum number of motion information that can be present in the motion information list CANDLIST_M1.

In some alternative aspects, the value V1 based on the fifth syntax element S4 in the parameter set P may indicate whether the encoder 1004 has disabled implicit signaling (e.g., to ensure that all of the additional motion information is accurately signaled). In some aspects, the fifth syntax element S4 may be a high-level switchable option (e.g., the signaling may be done above or higher than the block level, such as, for example, in the sequence level, picture level, or slice level). In some aspects, the parameter set P may be, for example, an SPS or a PPS. In some aspects, determining in step 1308 whether a second syntax element S1 is present in the bitstream may include determining whether implicit signaling has been disabled (e.g., by decoding the value V1).

In some alternative aspects, the value V1 based on the fifth syntax element S4 in the parameter set P may indicate whether the encoder 1004 has disabled explicit signaling (e.g., so that all the additional motion information is cheaply signaled via implicit signaling). For example, the encoder 1004 may disable explicit signaling where the objects inside a picture have the same or similar content and have the same or similar motion characteristics because, in these instances, the implicit signaling method may provide good prediction of motion information M1. In some aspects, the fifth syntax element S4 may be a high-level switchable option (e.g., the signaling may be done above or higher than the block level, such as, for example, in the sequence level, picture level, or slice level). In some aspects, the parameter set P may be, for example, an SPS or a PPS. In some aspects, determining in step 1308 whether a second syntax element S1 is present in the bitstream may include determining whether explicit signaling has been disabled (e.g., by decoding the value V1).

In some aspects, if the decoder 1004 determines in step 1308 that the second syntax element S1 is not present in the bitstream (e.g., because the encoder 1002 did not signal a value for the second syntax element S1), the step 1308 may include the decoder 1004 inferring or deriving a value (e.g., A or B) for the second syntax element S1 and setting the second syntax element S1 to the inferred or derived value. In some aspects, the decoder 1004 may infer a value of B (e.g., 0) for the second syntax element S1 if the value V1 based on a fifth syntax element S4 indicates a maximum length of the motion information list CANDLIST_M1 that is equal to or less than the constant value C0 (e.g., 0, 1, or 2). In alternative aspects, the decoder 1004 may infer a value of B (e.g., 0) for the second syntax element S1 if the value V1 based on a fifth syntax element S4 indicates that implicit decoding is disabled. In some further alternative aspects, the decoder 1004 may infer a value of A (e.g., 1) for the second syntax element S1 if the value V1 based on the fifth syntax element S4 indicates that explicit decoding is disabled. Otherwise, if the decoder 1004 determines in step 1308 that the second syntax element S1 is present in the bitstream, the process 1300 may proceed to a step 1310 in which the decoder 1004 decodes and determines the value (e.g., A or B) for the second syntax element S1 from the bitstream.

In some aspects, if the value of the second syntax element S1 (either an inferred or derived value set by the decoder 1004 in step 1308 if the second syntax element S1 is not present in the bitstream or the value decoded and determined by the decoder 1004 in step 1310 if the second syntax element S1 is present in the bitstream) is equal to A (e.g., 1), the process 1300 may proceed from step 1308 or 1310 to steps 1312 and 1314. In some aspects, the step 1312 may include the decoder 1004 decoding at least a third syntax element S2 from the bitstream. In some aspects, the third syntax element S2 may correspond to the motion information index. In some aspects, the step 1314 may include the decoder 1004 determining (e.g., decoding) from the bitstream a weight factor W1 associated with the second piece of motion information M1. In some aspects, the steps 1312 and/or 1314 may include deriving the second piece of motion information M1 based on the value of the third syntax element S2. In some aspects, deriving the second piece of motion information M1 in steps 1312 and/or 1314 may include: (i) deriving a motion information list CANDLIST_M1 that is associated with the second piece of motion information M1, (ii) deriving an index value IDX based on the value of the third syntax element S2, and (iii) determining the second piece of motion information M1 of the current block based on the motion information list CANDLIST_M1 and the index IDX.

In some aspects, if the value of the second syntax element S1 (either an inferred or derived value set by the decoder 1004 in step 1308 if the second syntax element S1 is not present in the bitstream or the value decoded and determined by the decoder 1004 in step 1310 if the second syntax element S1 is present in the bitstream) is equal to B (e.g., 0), the process 1300 may proceed from step 1308 or 1310 to steps 1316 and 1318. In some aspects, the step 1316 may include the decoder 1004 decoding at least a fourth syntax element S3. In some aspects, the step 1318 may include the decoder 1004 determining (e.g., decoding) from the bitstream a weight factor W1 associated with the second piece of motion information M1. In some aspects, the steps 1316 and/or 1318 may include determining the second piece of motion information M1 of the current block based on the value of the fourth syntax element S3. In some aspects, determining the second piece of motion information M1 of the current block based on the value of the fourth syntax element S3 may include determining the value for one element (e.g., reference picture index) of the motion information M1 motion vector to be the value of the fourth syntax element S3.

In some aspects, the process 1300 may further include a step in which the decoder 1004 generates a prediction block Pb01 for the current block based on the first piece of motion information M0 (e.g., determined in step 1302), the second piece of motion information M1 (e.g., determined in step(s) 1312 and/or 1314 or determined in step(s) 1316 and/or 1318), and the weight W1 (e.g., determined in step 1314 or step 1318). In some aspects, generating the prediction block of the current block may include: (i) generating a first prediction block P0 for the current block based on the first piece of motion information M0, (ii) generating a second prediction block P1 for the current block (if the second piece motion information M1 is signaled) based on the second piece of motion information M1, and (iii) generating the prediction block Pb01 as a weighted combination of prediction block P0 and prediction block P1 based on the weight W1.

Entry of Motion Information List Associated with One Piece of Motion Information Derived Based on Another Piece of Motion Information In some aspects, at least one motion information entry in the motion information list CANDLIST_M1 (e.g., derived in steps 1312 and/or 1314 of the process 1300) associated with the second piece of motion information M1 may be derived based on the first piece of motion information M0 of the current block. That is, in some aspects, the first piece of motion information M0 may be considered during the construction of the motion information list CANDLIST_M1 for deriving the second piece of motion information M1.

In an example, the first piece of motion information M0 may have the following elements and corresponding values:

| RefPicListFlag = 1, which means only L0 is used | |
| --- | --- |
| RefPicIdx L0: 1 | RefPicIdx L1: — |
| MV L0: (−5, 6) | MV L1: — |

In some aspects, the motion information list CANDLIST_M1 may contain a motion information entry that is derived based on the M0. For instance, in the example of a motion information list CANDLIST_M1 shown below, the motion information with index 0 is derived based on the first piece of motion information M0 having the example elements and corresponding values shown above.

| Index | Motion Information | |
| --- | --- | --- |
| 0 | RefPicListFlag = 1 | |
| | RefPicIdx L0: 1 | RefPicIdx L1: — |
| | MV L0: (−5, 6) | MV L1: — |
| 1 | RefPicListFlag = 2 | |
| | RefPicIdx L0: — | RefPicIdx L1: 0 |
| | MV L0: — | MV L1: (4, 4) |
| 2 | RefPicListFlag = 1 | |
| | RefPicIdx L0: 0 | RefPicIdx L1: — |
| | MV L0: (1, 2) | MV L1: — |

Similarly, when it is determined that there is a third piece of motion information M2 of the current block being signaled and present in the bitstream, the first piece of motion information M0 and the second piece of motion information M1 may be considered during the construction of the list of motion information candidates CANDLIST_M2 associated with the third piece of motion information M2.

In an example, the first piece of motion information M0 of the current block may be the same as the example above, and the second piece of motion information M1 may have the following elements and corresponding values:

| RefPicListFlag = 2, which means only L1 is used | |
|---|---|
| RefPicIdx L0: — | RefPicIdx L1: 1 |
| MV L0: — | MV L1: (0, 1) |

The list of motion information candidates CANDLIST_M2 may contain one motion information entry that is derived based on the M0 and another motion information entry that is derived based on the M1. As shown in the below example list, the motion information entry with index 0 is derived based on the M0, the motion information entry with index 1 is derived based on the M1.

| Index | Motion Information | |
|---|---|---|
| 0 | RefPicListFlag = 1 | |
| | RefPicIdx L0: 1 | RefPicIdx L1: — |
| | MV L0: (−5, 6) | MV L1: — |
| 1 | RefPicListFlag = 2 | |
| | RefPicIdx L0: — | RefPicIdx L1: 1 |
| | MV L0: — | MV L1: (0, 1) |
| 2 | RefPicListFlag = 2 | |
| | RefPicIdx L0: — | RefPicIdx L1: 0 |
| | MV L0: — | MV L1: (4, 4) |

Using One or Both Motion Vectors of a Block for Motion Information List Entries

In some aspects, each motion information list (e.g., derived in steps 1312 and/or 1314 of the process 1300) associated with an additional piece of signaled motion information may be a list of uni-motion information. That is, in some aspects, each motion information entry in the motion information list may contain only one of the L0 and L1 motion vector information. In some uni-motion information aspects, the construction of the motion information list associated with an additional piece of signaled motion information may depend on picture type (e.g., whether the current picture is a low delay picture).

In an example, there are two previously coded blocks BLK_A and BLK_B, and the motion information list construction process checks the previously coded block in a predefined order: first BLK_A and then BLK_B. When the current picture type is determined to be a non-low delay picture, both motion vectors for L0 and L1 of BLK_A (if both L0 and L1 are available) may be checked before checking the motion vector from the next candidate block BLK_B. When the current picture type is determined to be a low delay picture (i.e., all the reference pictures of the current picture have POC values that are smaller than the current POC), at most one of the motion vectors for L0 and L1 of BLK_A may be checked before checking the motion vector from the next candidate block BLK_B.

In the example, the motion information from the first decoded block BLK_A may be as follows:

| RefPicListFlag = 2 (both L0 and L1 are used) | |
|---|---|
| RefPicIdx L0: 1 | RefPicIdx L1: 0 |
| MV L0: (−5, 6) | MV L1: (4, 4) |

In the example, the motion information from a second decoded block BLK_B may be as follows:

| RefPicListFlag = 1 (only L0 is used) | |
|---|---|
| RefPicIdx L0: 1 | RefPicIdx L1: — |
| MV L0: (4, 2) | MV L1: — |

In the example, when the current picture type is a non-low delay picture, the decoder 1004 may check both the L0 and L1 motion vectors of BLK_A before checking the motion vector from BLK_B, and a possible list of motion information candidates CANDLIST_M1 may be as follows:

| Index | Motion information | |
|---|---|---|
| 0 | RefPicListFlag = 1 | |
| (Derived from the L0 of BLK_A) | RefPicIdx L0: 1 | RefPicIdx L1: — |
| | MV L0: (−5, 6) | MV L1: — |
| 1 | RefPicListFlag = 2 | |
| (Derived from the L1 of BLK_A) | RefPicIdx L0: — | RefPicIdx L1: 0 |
| | MV L0: — | MV L1: (4, 4) |
| 2 | RefPicListFlag = 1 | |
| (Derived from BLK_B) | RefPicIdx L0: 0 | RefPicIdx L1: — |
| | MV L0: (4, 2) | MV L1: — |

As can be seen from above, the L0 information and L1 information of BLK_A constitute two motion information entries (one with index 0 and the other with index 1) before the motion information entry (with index 2) derived from BLK_B.

In the example, when the current picture is a low delay picture, the decoder 1004 may check only one of the motion vectors of L0 and L1 from BLK_A before checking the motion vector from BLK_B, and a possible list of motion information candidates CANDLIST_M1 may be as follows:

| Index | Motion information | |
|---|---|---|
| 0 | RefPicListFlag = 1 | |
| (Derived from the L0 of BLK_A) | RefPicIdx L0: 1 | RefPicIdx L1: — |
| | MV L0: (−5, 6) | MV L1: — |
| 1 | RefPicListFlag = 2 | |
| (Derived from the L0 of BLK_B) | RefPicIdx L0: 0 | RefPicIdx L1: — |
| | MV L0: (4, 2) | MV L1: — |
| 2 | RefPicListFlag = 1 | |
| (Derived from the L0 of BLK_C) | RefPicIdx L0: 0 | RefPicIdx L1: — |
| | MV L0: (3, 1) | MV L1: — |

As can be seen from above, the motion information of BLK_A constitutes only one information entry (e.g., one with index 0 derived from the L0 information of BLK_A) before the motion information entry (with index 1) derived from BLK_B.

In some alternative aspects, the construction of the motion information list associated with an additional piece of signaled motion information may depend on whether the time direction of the L0 and L1 motion vector from a previously coded block is the same. That is, in some time direction aspects, instead of checking whether the current picture is a non-low delay picture, the time direction of the L0 motion vector of the first block (BLK_A) may be compared with the time direction of the L1 motion vector of the first block (BLK_A).

In some time direction aspects, the time direction of the L0 motion vector of the first block may be determined by forming the difference between (a) the POC of the L0 picture of the first block, here denoted as POC_L0, and (b) the POC of the current picture, here denoted POC_curr, as time_dir_L0=sign(POC_L0−POC_curr), where sign(x)

returns 1 if x>0 and −1 if x<0. Similarly, in some time direction aspects, the time direction of the L1 motion vector of the first block may be determined by forming the difference between (a) the POC of the L1 picture of the first block, here denoted POC_L1, and (b) the POC of the current picture, POC_curr, as time_dir_L1=sign(POC_L1−POC_curr).

In some time direction aspects, when time_dir_L0 is not equal to time_dir_L1, both the L0 and L1 of BLK_A may be checked before checking the motion vector from BLK_B, and a possible list of motion information candidates CANDLIST_M1 may be as follows:

| Index | Motion information | |
|---|---|---|
| 0 (Derived from the L0 of BLK_A) | RefPicListFlag = 1 RefPicIdx L0: 1 MV L0: (−5, 6) | RefPicIdx L1: — MV L1: — |
| 1 (Derived from the L1 of BLK_A) | RefPicListFlag = 2 RefPicIdx L0: — MV L0: — | RefPicIdx L1: 0 MV L1: (4, 4) |
| 2 (Derived from BLK_B) | RefPicListFlag = 1 RefPicIdx L0: 0 MV L0: (4, 2) | RefPicIdx L1: — MV L1: — |

As can be seen from above, when time_dir_L0 is not equal to time_dir_L1, the L0 information and L1 information of BLK_A may constitute two motion information entries (one with index 0 and the other with index 1) before the motion information entry (with index 2) derived from BLK_B.

In some time direction aspects, when time_dir_L0 is equal to time_dir_L1, only one of the motion vectors of L0 and L1 from BLK_A may be checked before checking the motion vector from BLK_B, and a possible list of motion information candidates CANDLIST_M1 may be as follows:

| Index | Motion information | |
|---|---|---|
| 0 (Derived from the L0 of BLK_A) | RefPicListFlag = 1 RefPicIdx L0: 1 MV L0: (−5, 6) | RefPicIdx L1: — MV L1: — |
| 1 (Derived from the L0 of BLK_B) | RefPicListFlag = 2 RefPicIdx L0: 0 MV L0: (4, 2) | RefPicIdx L1: — MV L1: — |
| 2 (Derived from the L0 of BLK_C) | RefPicListFlag = 1 RefPicIdx L0: 0 MV L0: (3, 1) | RefPicIdx L1: — MV L1: — |

As can be seen from above, when time_dir_L0 is equal to time_dir_L1, the motion information of BLK_A may constitute only one information entry (one with index 0, derived from the L0 information of BLK_A) before the motion information entry (with index 1) derived from BLK_B.

List of Motion Information Candidates Derivation

In some aspects, the derivation of the list of motion information candidates CANDLIST_M1 (e.g., in steps 1312 and/or 1314 of the process 1300) associated with the second piece of motion information M1 may further include the decoder 1004 (1) determining a set RECON_SET of reconstruction samples from a group GROUP_P of previously decoded sample positions, (2) determining a set PRED_SET0 of prediction samples for the same group GROUP_P based on the first piece of motion information M0, (3) for each motion information entry cand_i in the list of motion information candidates CANDLIST_M1, determining an associated cost value COST_i, and (4) reordering the motion information entries in the list of motion information candidates CANDLIST_M1 based on the cost values. In some aspects, determining the associated cost value COST_i may include the decoder 1004 (3a) determining a set CANDPRED_i of prediction samples for the same group GROUP_P based on the motion information cand_i, (3b) determining a set COMBI_i of prediction samples where its prediction sample values are a combination of the prediction sample set PRED_SET0 and CANDPRED_i based on the weight W1, (3c) comparing the reconstruction set RECON_SET and the prediction set COMBI_i, and (3d) determining the cost value COST_i based on a comparison of the reconstruction set RECON_SET and the prediction set COMBI_i.

In some aspects, the entries of the second list of motion information candidates CANDLIST_M1 may be reordered in step (4) in ascending cost values. That is, in some aspects, motion information with smaller cost values may be placed in first positions (e.g., with smaller index values) and get prioritized over motion information that have larger cost values.

Similarly, if the decoder 1004 determines that there is a third piece of motion information M2 of the current block being signaled and present in the bitstream (e.g., in step 1304 of the process 1300), the derivation of the list of motion information candidates CANDLIST_M2 (e.g., in steps 1312 and/or 1314 of the process 1300) associated with the third piece of motion information M2 may further include the decoder 1004 (1) determining a set RECON_SET of reconstruction samples from a group GROUP_P of previously decoded sample positions, (2) determining a set PRED_SET1 of prediction samples for the same group GROUP_P based on the first piece of motion information M0, the second piece of motion information M1, and the first weighting factor W1 associated with the second piece of motion information M1, (3) for each motion information entry cand_i in the third list of motion information candidates CANDLIST_M2, determining an associated cost value COST_i, and (4) reordering the motion information entries in the third list of motion information candidates CANDLIST_M2 based on the cost values. In some aspects, determining the associated cost value COST_i may include the decoder 1004 (3a) determining a set CANDPRED_i of prediction samples for the same group GROUP_P based on the motion information cand_i, (3b) determining a set COMBI_i of prediction samples where its prediction sample values are a combination of the prediction sample set PRED_SET1 and CANDPRED_i based on the weighting factor W2 associated with the third piece of motion information M2, (3c) comparing the reconstruction set RECON_SET and the prediction set COMBI_i, and (3d) determining the cost value COST_i based on a comparison of the reconstruction set RECON_SET and the prediction set COMBI_i.

In some aspects, the derivation of RECON_SET may only be done once (e.g., during the derivation of CAND_LIST1 and not during the derivation of CAND_LIST2), and the decoder 1004 reuses the RECON_SET when deriving the possible additional piece of motion information of the current block (for example, M2, M3 if present).

Figure 14:
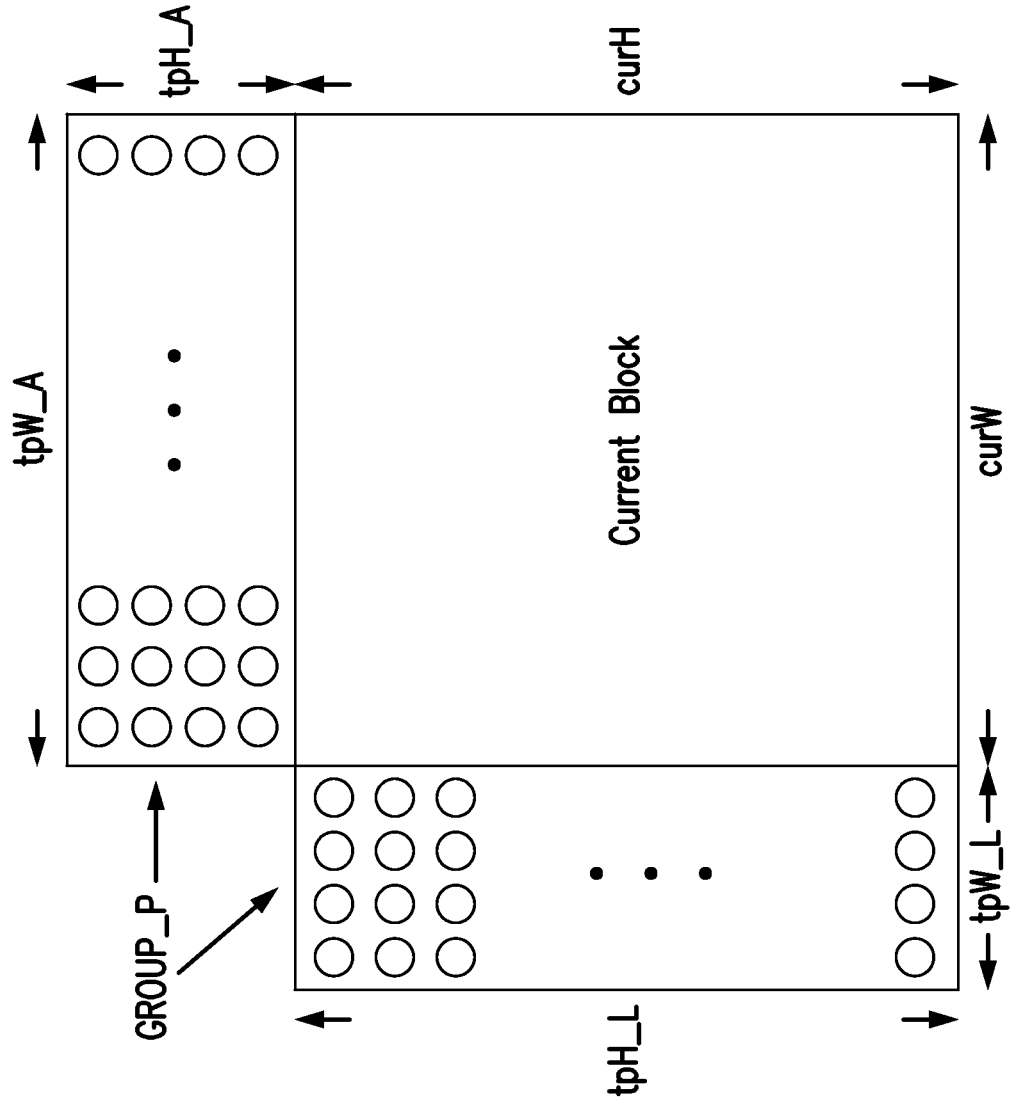
FIG. 14 illustrates an example of a group of previously decoded sample positions for use in determining a set of reconstruction samples in the derivation of a list of motion information candidates according to some aspects.
Figure 15:
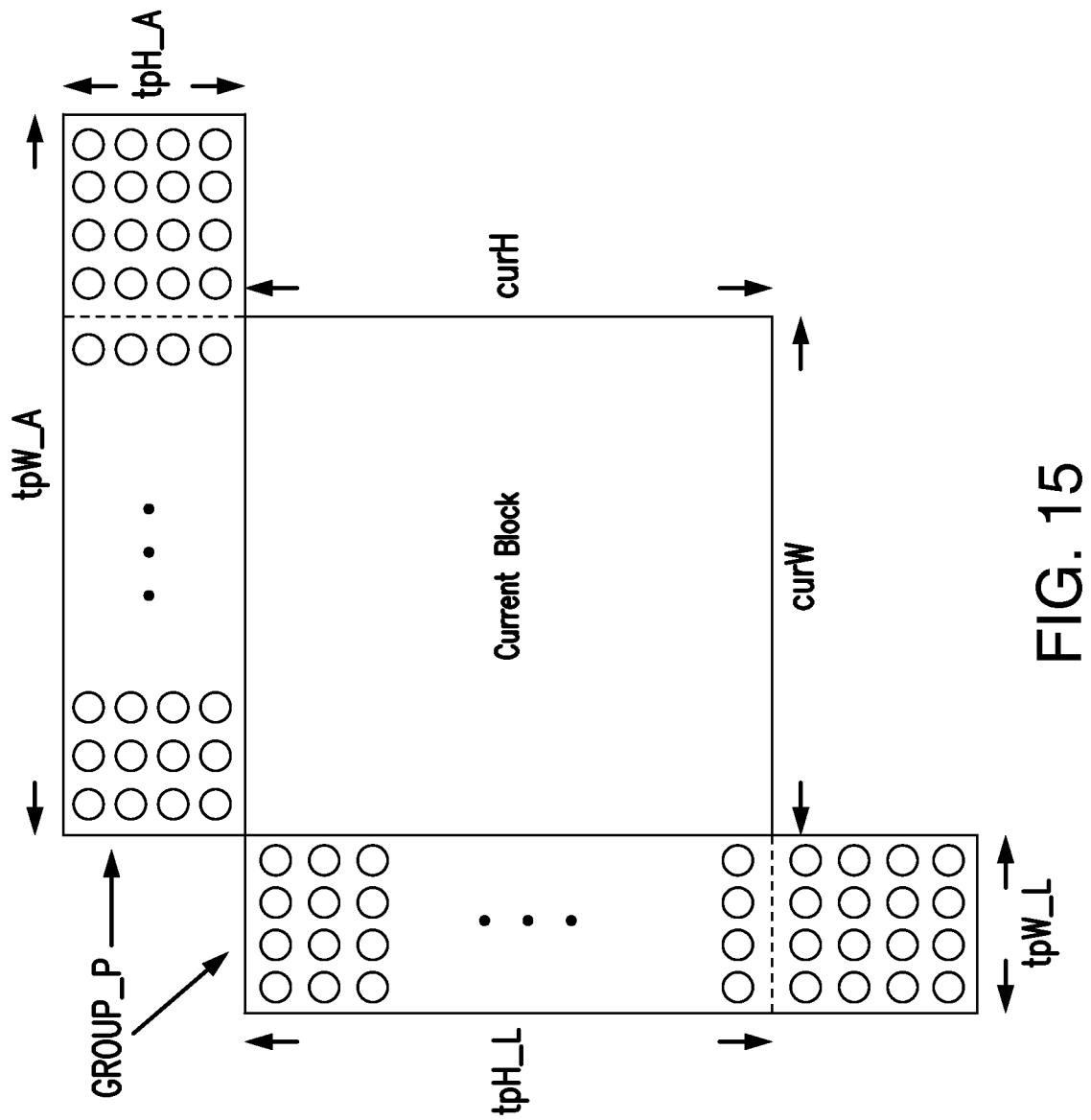
FIG. 15 illustrates an example of a group of previously decoded sample positions for use in determining a set of reconstruction samples in the derivation of a list of motion information candidates according to some aspects.

In some aspects, the group GROUP_P of previously decoded sample positions may be the positions that are in the current picture or previously decoded pictures. In some aspects, the positions of the group GROUP_P of previously decoded sample positions may be spatially neighboring to the current block. FIGS. 14 and 15 illustrate examples of the group GROUP_P of previously decoded sample positions according to some aspects. In some aspects, as shown in FIGS. 14 and 15, the GROUP_P may include the spatial neighboring sample positions (marked with circles) that are above and to the left of the current block. In FIGS. 14 and 15, the number of above samples in the horizontal direction is denoted as tpW_A, and the number of above samples in the vertical direction is denoted as tpH_A. In FIGS. 14 and 15, the number of left samples in the horizontal direction is denoted as tpW_L, and the number of left samples in the vertical direction is denoted as tpH_L.

In some aspects, as shown in FIG. 14, the number of above samples in horizontal direction tpW_A may equal the width curW of the current block, and/or the number of left samples in vertical direction tpH_L may equal the height curH of the current block. In some aspects, as shown in FIG. 14, the number of above samples in vertical direction tpH_A may be equal to, for example and without limitation, 4, and/or the number of left samples in the horizontal direction may be equal to, for example and without limitation, 4.

In some alternative aspects, as shown in FIG. 15, the number of above samples in the horizontal direction tpW_A may be greater than the width curW of the current block, and/or the number of left samples in the vertical direction tpH_L may be greater than the height curH of the current block. For example, in some alternative aspects, as shown in FIG. 15, tpW_A may be equal to curW+4, and/or tpH_L may be equal to curH+4. In some aspects, usage of more above and/or left samples may help to avoid prioritizing motion information that corresponds to a local minimum.

In some aspects, the determination of the set PRED_SET0 of prediction samples (based on the first piece of motion information M0) for the group GROUP_P may involve: (1) determining boundary subblocks' motion information of the current block based on the first piece of motion information M0, (2) dividing the sample position group GROUP_P into subgroups that are each associated with a boundary subblock's motion information, and (3) for each subgroup in GROUP_P, generating its corresponding prediction samples for the subgroup based on the associated boundary subblock's motion information. In some aspects, the set PRED_SET0 may include the prediction samples from all the subgroups. In some aspects, the subgroups may be associated with its closest (in terms of sample position distance) boundary subblock's motion information.

Figure 16:
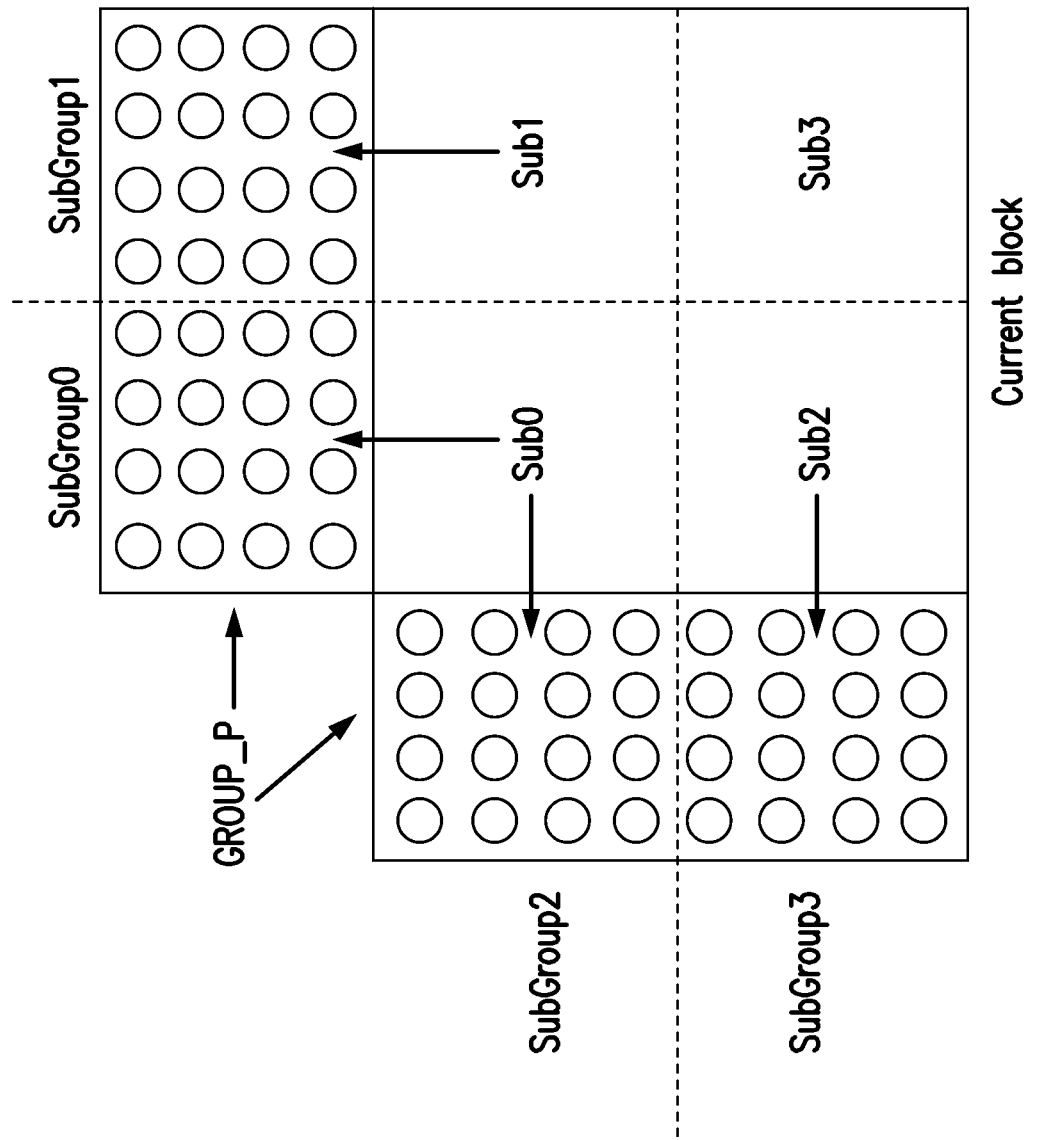
FIG. 16 shows an example of subblocks of a current block and subgroups of the group of previously decoded sample positions for determining a set of prediction samples in the derivation of a list of motion information candidates according to some aspects.

FIG. 16 shows an example in which a current block contains four subblocks (Sub0, Sub1, Sub2 and Sub3), and each subblock of the current block maintains its own motion information. As shown in FIG. 16, the subblocks Sub0, Sub1, and Sub2 are boundary subblocks that are adjacent to either the above boundary or the left boundary of the current block. In some aspects, as shown in FIG. 16, the sample position group GROUP_P may be divided into subgroups: SubGroup0, SubGroup1, SubGroup2 and SubGroup3. In some aspects, each subgroup may be associated with its closest boundary subblock's motion information. For example, as shown by the arrows in FIG. 16, the SubGroup0 and SubGroup2 may be associated with the motion information from the boundary subblock Sub0, the SubGroup1 may be associated with the motion information from the boundary subblock Sub1, and the SubGroup3 may be associated with the motion information from the boundary subblock Sub2.

In some aspects, the determination of the associated cost value COST_i for each motion information entry cand_i in the second list of motion information candidates CANDLIST_M1 may include the decoder 1004: (1) determining a set of alternative motion information ALTERMI_SET based on the entry cand_i, and (2) determining a cost value ALTERCOST_j for each alternative motion information AMI_j in the set ALTERMI_SET. In some aspects, determining the cost value ALTERCOST_j for each alternative motion information AMI_j in the set ALTERMI_SET may include the decoder 1004: (2A) determining a set ALTERPRED_j of prediction samples for the sample position group GROUP_P based on the alternative motion information AMI_j, (2B) determining a set ALTERCOMBI_j of prediction samples where its prediction sample values are a combination of the prediction sample set PRED_SET0 and ALTERPRED_j based on the weight W1, and (2C) determining the cost value ALTERCOST_j based on comparing the reconstruction set RECON_SET and the prediction set ALTERCOMBI_j. In some aspects, the determination of the associated cost value COST_i for each motion information entry cand_i in the CANDLIST_M1 may include the decoder 1004 (3) determining the motion information entry cand_i to be the alternative motion information that has the smallest cost value within the alternative motion information set ALTERMI_SET, and determine the associated cost value COST_i of the entry cand_i as the smallest cost value within the set ALTERMI_SET.

The table below an example in which second list of motion information candidates CANDLIST_M1 contains two motion information entries after the derivation process of motion information from previously decoded blocks.

| Index | Motion information | |
|---|---|---|
| 0 | RefPicListFlag = 1 | |
| | RefPicIdx L0: 1 | RefPicIdx L1: — |
| | MV L0: (0, 0) | MV L1: — |
| 1 | RefPicListFlag = 2 | |
| | RefPicIdx L0: — | RefPicIdx L1: 0 |
| | MV L0: — | MV L1: (4, 4) |

In some aspects, when determining the associated cost value COST_0 for the first motion information entry cand_0 (with index 0), the decoder 1004 may determine a set of alternative motion information ALTERMI_SET based on the cand_0. In some aspects, the alternative motion information set may include the cand_0 and some other motion information that have motion vector (MV) that are slightly different from the MV of cand_0.

Figure 17:
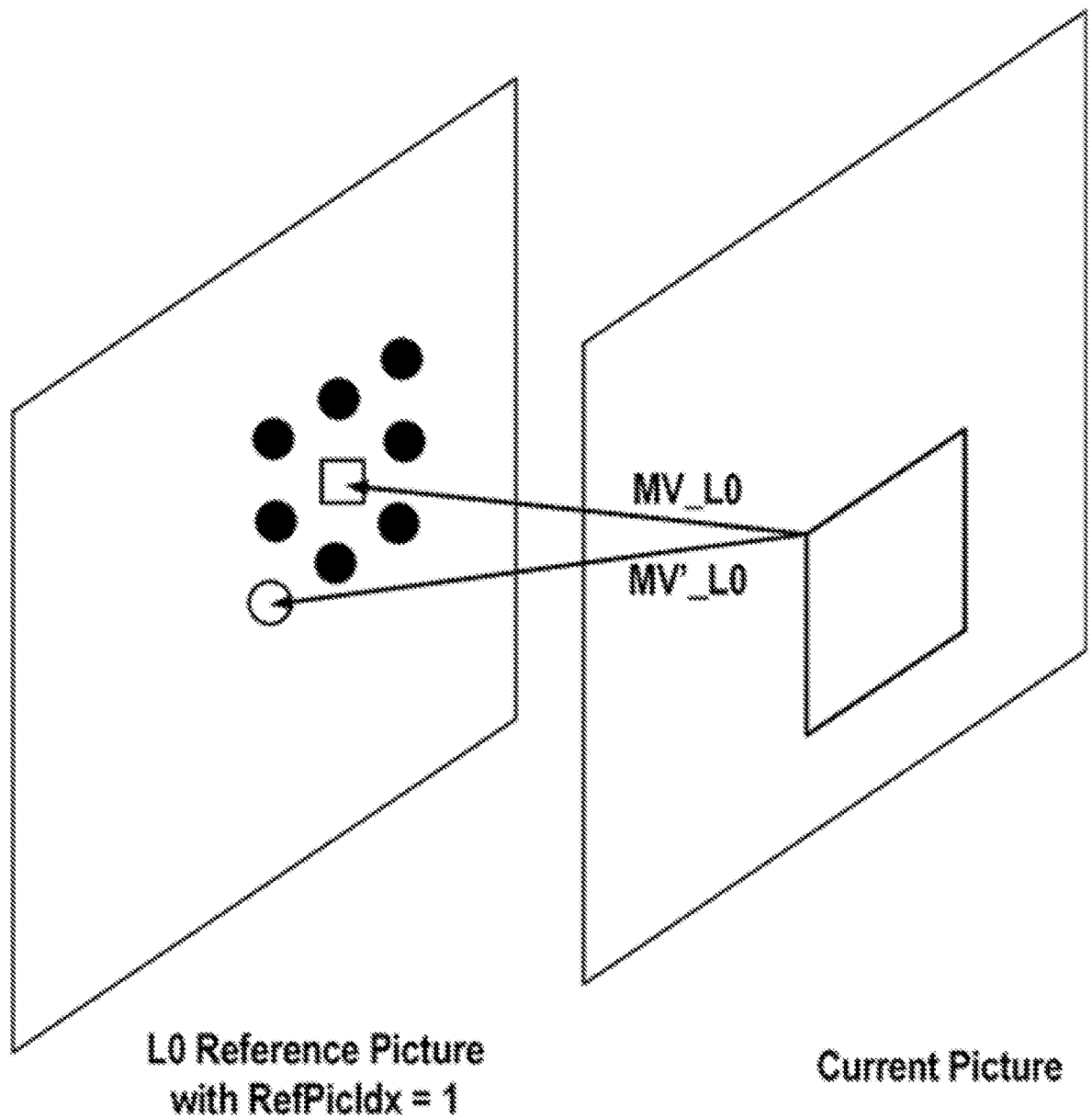
FIG. 17 shows an alternative motion information having a smallest cost value according to some aspects.

FIG. 17 illustrates the above example. In FIG. 17, MV_L0 corresponds to the L0 MV (0, 0) from cand_0, and the square corresponds to the sample where the MV_L0 is referring to. As shown in FIG. 17, the alternative motion information set may include motion information that contains motion vectors that correspond to the circles in the figure. The slightly different motion vectors may have values like (1, 0), (1, 1), (1, −1), (0, 1), (0, −1), (−1, 0), (−1, 1) and (−1, −1). That is, in some aspects, the alternative motion information set may include motion information that contains neighboring motion vectors to the motion vector from the initial motion information cand_0.

In some aspects, the decoder 1004 may calculate, for each motion information in the alternative motion set, a cost value. In FIG. 17, the motion information that contains motion vector (−1, 1) is indicated by the MV'_L0. In the example, the motion information that contains motion vector (−1, 1) is the one with smallest cost (e.g., 500) within the alternative set ALTERMI_SET. In some aspects, the decoder 1004 may (i) update the motion vector of the motion information entry cand_0 to (−1, 1), as shown below, and (ii) set the cost associated with the entry cand_0 to 500.

| Index | Motion information |
|---|---|
| 0 | RefPicListFlag = 1 |
| | RefPicIdx L0: 1    RefPicIdx L1: — |
| | MV L0: (0, 0) (−1, 1)    MV L1: — |
| 1 | RefPicListFlag = 2 |
| | RefPicIdx L0: —    RefPicIdx L1: 0 |
| | MV L0: —    MV L1: (4, 4) |

In some aspects, when determining the associated cost value COST_1 for the motion information entry cand_1 (with index 1), its corresponding alternative motion information ALTERMI_SET may similarly include motion information that have motion vectors like, for example, (4, 4), (5, 5), (5, 4), (5, 3), (4, 5), (4, 3), (3, 5), (3, 4) and (3, 3).

In some aspects, the determination of the cost value COST_i based on comparing the reconstruction set RECON_SET and the prediction set COMBI_i may include the decoder 1004: (1) determining a cost value Ci for each sample position in the GROUP_P, (2) determining a cost weighting factor cWi for the sample position, and (3) determining the cost value COST_i as a sum of Ci*cWi.

In some aspects, the decoder 1004 may assign some of the sample positions with different cost weighting factors than the other sample positions. In some aspects, the decoder 1004 may additionally or alternatively assign sample positions that are closer to the current block boundary with higher cost weighting factor than the sample positions that are further away from the current block boundary. For example, in some aspects, the sample positions that are closer to the current block boundary may be assigned with a cost weighting factor cWi=2, and the sample positions that are further away from the current block boundary may be assigned with a cost weighting factor cWi=1. In some aspects, for the sample positions that are closer to the current block, their corresponding sample values are likely to have higher correlation with the sample values of the current block. Therefore, prioritizing those sample positions may help prioritizing motion information that is more suitable for the current block.

Refined Candidate Motion Information

In some aspects (e.g., any of the aspects described above), the decoder 1004 may obtain a first prediction of the current block using a first motion information (e.g., bi-prediction or from a first MHP). In some aspects, the decoder 1004 may then refine a second motion information for a MHP based on motion estimation (ME) using a second motion information to derive a second prediction of the current block that minimizes the difference to the first prediction of the current block. In some aspects, the decoder 1004 may replace the candidate second motion information with the refined candidate motion information. In some alternative aspects, the refined candidate motion information may be an additional candidate of second motion information.

In some aspects, the motion estimation (e.g., motion search) may search for a motion vector that minimizes a difference between a first block and a second block. In some aspects, the search may be done within a window (or region). Traditionally, the first block is the current block, and the second block is a reference prediction block. However, in some aspects, the first block may be the prediction block generated from M0, and the second block may be a prediction block generated from a possible M1. That is, in some aspects, for a second piece of motion information M1, the decoder 1004 may do a search (e.g., in a window around the motion vector/information M1) to find another possible motion information M1_refined in the window that gives a more similar prediction block to the first prediction block. If so, the M1 may be determined to be (replaced) the M1_refined.

In some sub-block aspects, the decoder 1004 may obtain a first prediction of a sub-block of the current block using a first motion information (e.g. bi-prediction). In some aspects, the decoder 1004 may then refine a second motion information based on ME using a second motion information to derive a second prediction of the sub-block of the current block that minimizes the difference to the first prediction of the sub-block. In some aspects, the decoder 1004 may replace the second motion information for that sub-block with the refined candidate motion information. In some alternative aspects, the refined candidate motion information may be an additional candidate of second motion information for the sub-block.

Flowcharts

Figure 18:
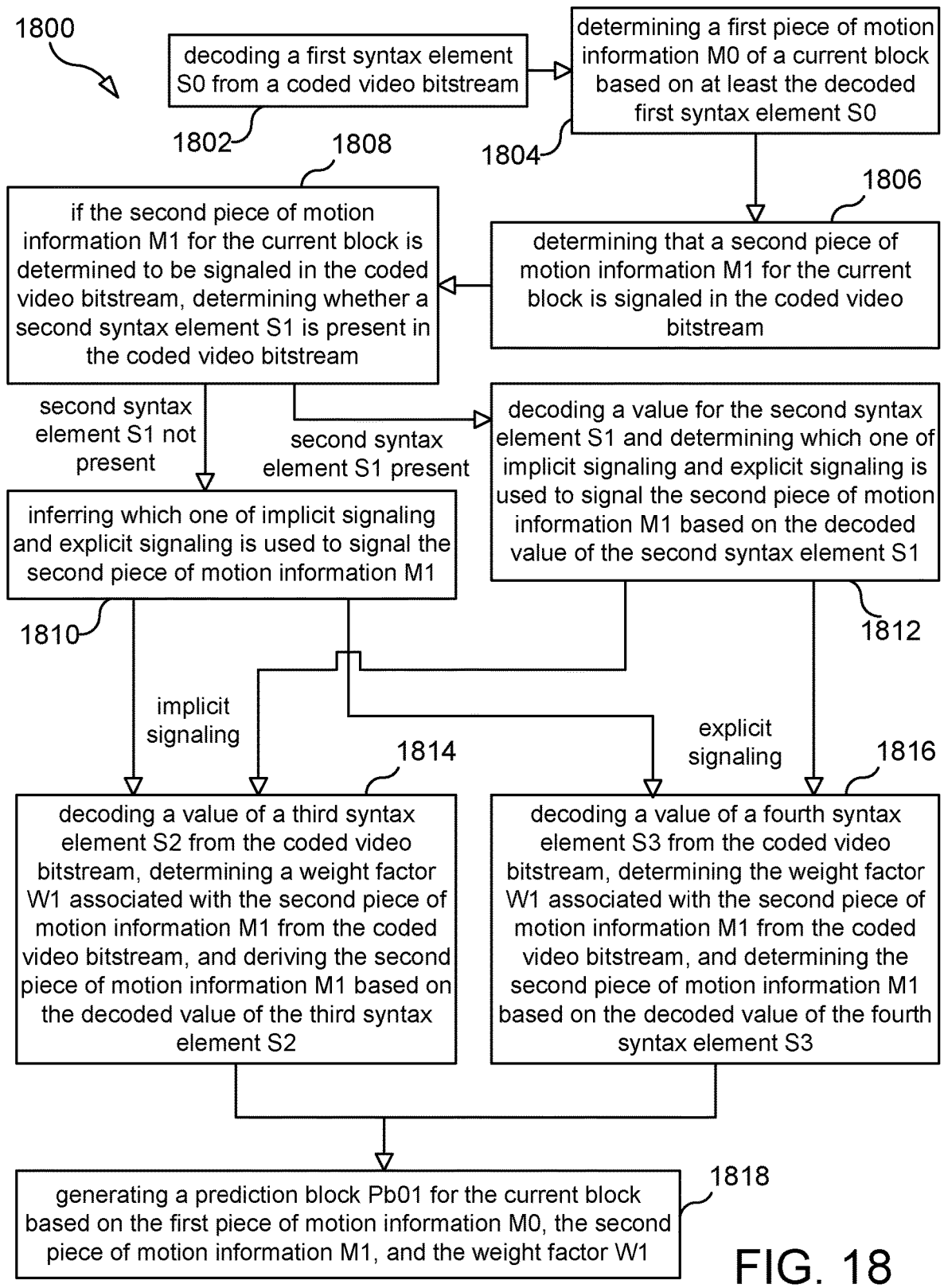
FIG. 18 is a flow chart illustrating a process according to some aspects.

FIG. 18 illustrates a process 1800 according to some aspects. In some aspects, the process 1800 may be for decoding a current block within a current picture inside a coded video bitstream. In some aspects, some or all of the steps of the process 1800 may be performed by a decoder 1004.

In some aspects, as shown in FIG. 18, the process 1800 may include a step 1802 in which the decoder 1004 decodes a first syntax element S0 from a coded video bitstream.

In some aspects, as shown in FIG. 18, the process 1800 may include a step 1804 in which the decoder 1004 determines a first piece of motion information M0 of the current block based on at least the decoded first syntax element S0.

In some aspects, as shown in FIG. 18, the process 1800 may include a step 1806 in which the decoder 1004 determines that a second piece of motion information M1 for the current block is signaled in the coded video bitstream.

In some aspects, as shown in FIG. 18, the process 1800 may include a step 1808 in which the decoder 1004, if the second piece of motion information M1 for the current block is determined to be signaled in the coded video bitstream, determines whether a second syntax element S1 is present in the coded video bitstream. In some aspects, the second syntax element S1 may be a multi-hypothesis prediction (MHP) merge flag.

In some aspects, determining whether the second syntax element S1 is present in the coded video bitstream in step 1808 may include determining a value V1 based on a fifth syntax element S4 in a parameter set P and comparing the value V1 to a constant value C0 (e.g., 0, 1, or 2). In some aspects, the parameter set P may be a sequence parameter set (SPS), a picture parameter set (PPS), a slice header, or a picture header. In some aspects, the second syntax element S1 may be determined to be present in the coded video bitstream if the value V1 is greater than the constant value C0, and the second syntax element S1 may be determined to be not present in the coded video bitstream if the value V1 is not greater than the constant value C0. In some aspects, the value V1 may indicate a maximum length of a motion information list CANDLIST_M1 associated with the second piece of motion information M1.

In some aspects, as shown in FIG. 18, the process 1800 may include a step 1810 in which the decoder 1004, if the second syntax element S1 is determined to not be present in the coded video bitstream, infers which one of implicit signaling and explicit signaling is used to signal the second piece of motion information M1.

In some aspects, if the value V1 indicates a maximum length for the motion information list CANDLIST_M1 associated with the second piece of motion information M1 that is less than or equal to the constant value C0 (e.g., 0, 1, or 2), the second syntax element S1 may be determined to not be present in the coded video bitstream in step 1808, and explicit signaling may be inferred to be used to signal the second piece of motion information M1 associated with the second piece of motion information M1 in step 1810. In some alternative aspects, the fifth syntax element S4 may indicate whether implicit signaling is disabled, and, if the value V1 indicates that implicit signaling is disabled, the second syntax element S1 may be determined to not be present in the coded video bitstream in step 1808, and explicit signaling may be inferred to be used to signal the second piece of motion information M1 associated with the second piece of motion information M1 in step 1810. In some further alternative aspects, the fifth syntax element S4 may indicate whether explicit signaling is disabled, and, if the value V1 indicates that explicit signaling is disabled, the second syntax element S1 may be determined to not be present in the coded video bitstream in step 1808, and implicit signaling may be inferred to be used to signal the second piece of motion information M1 associated with the second piece of motion information M1 in step 1810.

In some aspects, as shown in FIG. 18, the process 1800 may include a step 1812 in which the decoder 1004, if the second syntax element S1 is determined to be present in the coded video bitstream, decodes a value for the second syntax element S1 and determines which one of implicit signaling and explicit signaling is used to signal the second piece of motion information M1 based on the decoded value of the second syntax element S1.

In some aspects, as shown in FIG. 18, the process 1800 may include a step 1814 in which the decoder 1004, if implicit signaling is inferred or determined to be used to signal the second piece of motion information M1, decodes a value of a third syntax element S2 from the coded video bitstream, determines a weight factor W1 associated with the second piece of motion information M1 from the coded video bitstream, and derives the second piece of motion information M1 based on the decoded value of the third syntax element S2. In some aspects, the third syntax element S2 may be a motion information index. In some aspects, deriving the second piece of motion information M1 based on the decoded value of the third syntax element S2 in step 1814 may include: deriving a motion information list CANDLIST_M1 associated with the second piece of motion information M1, deriving an index value IDX based on the value of the third syntax element S2, and determining the second piece of motion information M1 of the current block based on the motion information list CANDLIST_M1 and the index value IDX.

In some aspects, the process 1800 may further include determining whether the current picture is a low delay picture, and deriving the motion information list CANDLIST_M1 in step 1814 may be based on whether the current picture is determined to be a low delay picture. In some aspects, the motion information list CANDLIST_M1 may include only one entry derived from an L0 or L1 motion vector of a first previously coded block BLK_A before an entry derived from a motion vector of a second previously coded block BLK_B if the current picture is determined to be a low delay picture, and the motion information list CANDLIST_M1 may include both a first entry derived from an L0 motion vector of the first previously coded block BLK_A and a second entry derived from the L1 motion vector of the first previously coded block BLK_A before an entry derived from an L0 or L1 motion vector of a second previously coded block BLK_B if the current picture is determined to not be a low delay picture.

In some aspects, the process 1800 may further include determining whether L0 and L1 motion vectors of a previously coded block are in the same time direction, and deriving the motion information list CANDLIST_M1 in step 1814 may be based on whether the L0 and L1 motion vectors of the previously coded block are in the same time direction. In some aspects, the motion information list CANDLIST_M1 may include only one entry derived from an L0 or L1 motion vector of a first previously coded block BLK_A before an entry derived from a motion vector of a second previously coded block BLK_B if the L0 and L1 motion vectors of the first previously coded block BLK_A are determined to be in the same time direction, and the motion information list CANDLIST_M1 may include both a first entry derived from an L0 motion vector of the first previously coded block BLK_A and a second entry derived from the L1 motion vector of the first previously coded block BLK_A before an entry derived from an L0 or L1 motion vector of a second previously coded block BLK_B if the L0 and L1 motion vectors of the first previously coded block BLK_A are determined to not be in the same time direction. In some aspects, determining whether the L0 and L1 motion vectors of the previously coded block are in the same time direction may include: determining the time direction of the L0 motion vector of the previously coded block, determining the time direction of the L1 motion vector of the previously coded block, and determining whether the time directions of the L0 and L1 motion vectors of the previously coded block are the same. In some aspects, determining the time direction of the L0 motion vector of the previously coded block may include comparing a picture order count (POC) value of an L0 picture of the previously coded block with a POC value of the current picture (e.g., time_dir_L0=sign(POC_L0−POC_curr) where POC_L0 is the POC of the L0 picture of the previously coded block, POC_curr is the POC of the current picture, and sign(x) returns 1 if x>0 and −1 if x<0), and determining the time direction of the L1 motion vector of the previously coded block may include comparing a POC value of an L1 picture of the previously coded block with the POC value of the current picture (e.g., time_dir_L1=sign(POC_L1−POC_curr) where POC_L1 is the POC of the L0 picture of the previously coded block).

In some aspects, deriving the list of motion information candidates CANDLIST_M1 associated with the second piece of motion information M1 in step 1814 may include: (i) determining a set RECON_SET of reconstruction samples from a group GROUP_P of previously decoded sample positions; (ii) determining a set PRED_SET0 of prediction samples for the group GROUP_P based on the first piece of motion information M0; (iii) for each motion information entry cand_i in the list of motion information candidates CANDLIST_M1, determining an associated cost value COST_i; and (iv) reordering the motion information entries in the list of motion information candidates CANDLIST_M1 based on the cost values. In some aspects, determining the associated cost value COST_i for the motion information entry cand_i may include: (i) determining a set CANDPRED_i of prediction samples for the group GROUP_P based on the motion information cand_i; (ii) determining a set COMBI_i of prediction samples including prediction sample values that are a combination of the prediction sample set PRED_SET0 and the prediction sample set CANDPRED_i based on the weight W1; (iii) comparing the reconstruction set RECON_SET and the prediction sample set COMBI_i; and (iv) determining the cost value COST_i based on a comparison of the reconstruction set RECON_SET and the prediction set COMBI_i. In some aspects, reordering the motion information entries in the list of motion information candidates CANDLIST_M1 based on the cost values may include reordering the motion information entries in the list of motion information candidates CANDLIST_M1 to have ascending cost values.

In some aspects, the group GROUP_P of previously decoded sample positions may be sample positions in the current picture and/or one or more previously decoded pictures. In some aspects, as shown in FIGS. 14 and 15, the GROUP_P of previously decoded sample positions may be sample positions that are spatially neighboring to the current block. In some aspects, as shown in FIGS. 14 and 15, the GROUP_P of previously decoded sample positions may be sample positions that are above the current block and/or to the left of the current block. In some aspects, as shown in FIGS. 14 and 15, a width tpW_A of the sample positions of the GROUP_P of previously decoded sample positions that are above the current block in a horizontal direction may equal or be greater than a width curW of the current block, and a height tpH_L of the sample positions of the GROUP_P of previously decoded sample positions that are to the left of the current block in a vertical direction may equal or be greater than a height curH of the current block.

In some aspects, as shown in FIG. 16, determining the set PRED_SET0 of prediction samples for the group GROUP_P may include: (i) determining motion information of boundary subblocks of the current block based on the first piece of motion information M0; (ii) dividing the sample position group GROUP_P into subgroups that are each associated with motion information of a boundary subblock; and (iii) for each subgroup in GROUP_P, generating corresponding prediction samples for the subgroup based on the associated motion information of the boundary subblock. In some aspects, the determined set PRED_SET0 includes the prediction samples from all the subgroups.

In some aspects, determining an associated cost value COST_i for a motion information entry cand_i in the list of motion information candidates CANDLIST_M1 in step 1814 may include: (i) determining a set of alternative motion information ALTERMI_SET based on the entry cand_i; (ii) determining a cost value ALTERCOST_j for each alternative motion information AMI_j in the set ALTERMI_SET; (iii) determining the motion information entry cand_i to be the alternative motion information that has the smallest cost value within the alternative motion information set ALTERMI_SET; and (iv) determining the associated cost value COST_i of the entry cand_i as the smallest cost value within the set ALTERMI_SET. In some aspects, determining the cost value ALTERCOST_j for an alternative motion information AMI_j in the set ALTERMI_SET may include: (i) determining a set ALTERPRED_j of prediction samples for the sample position group GROUP_P based on the alternative motion information AMI_j; (ii) determining a set ALTERCOMBI_j of prediction samples that is a combination of the prediction sample set PRED_SET0 and ALTERPRED_j based on the weight W1; and (iii) determining the cost value ALTERCOST_j based on comparing the reconstruction set RECON_SET and the prediction set ALTERCOMBI_j.

In some aspects, determining the associated cost value COST_i for the motion information entry cand_i in step 1814 may include: (i) for each sample position in the group GROUP_P, determining a cost value Ci for the sample position and a cost weighting factor cWi for the sample position; and (ii) determining the cost value COST_i as a sum of Ci*cWi for the sample positions in the group GROUP_P. In some aspects, a cost weighting factor (e.g., cWi=2) determined for sample positions that are closer to a boundary of the current block may be higher than a cost weighting factor (e.g., cWi=1) determined for sample positions that are further away from a boundary of the current block.

In some aspects, deriving the motion information list CANDLIST_M1 associated with the second piece of motion information M1 in step 1814 may include: (i) for each motion information entry cand_i in the motion information list CANDLIST_M1, finding a refined motion information refinedCand_i based on motion estimation that generates a prediction block that minimizes a difference with the first prediction block P0 for the current block; and (ii) determining the motion information entry cand_i to be the refined motion information refinedCand_i.

In some aspects, as shown in FIG. 18, the process 1800 may include a step 1816 in which the decoder 1004, if explicit signaling is inferred or determined to be used to signal the second piece of motion information M1, decodes a value of a fourth syntax element S3 from the coded video bitstream, determines the weight factor W1 associated with the second piece of motion information M1 from the coded video bitstream, and determines the second piece of motion information M1 based on the decoded value of the fourth syntax element S3. In some aspects, determining the second piece of motion information M1 based on the value of the fourth syntax element S3 in step 1816 may include determining the value for one element (e.g., reference picture index) of the motion information M1 motion vector to be the value of the fourth syntax element S3.

In some aspects, at least one motion information entry in the motion information list CANDLIST_M1 associated with the second piece of motion information M1 may be derived in step 1814 or 1816 based on the first piece of motion information M0 of the current block.

In some aspects, as shown in FIG. 18, the process 1800 may include a step 1818 in which the decoder 1004 generates a prediction block Pb01 for the current block based on the first piece of motion information M0, the second piece of motion information M1, and the weight factor W1. In some aspects, generating the prediction block Pb01 for the current block in step 1818 may include: (i) generating a first prediction block P0 for the current block based on the first piece of motion information M0; (ii) generating a second prediction block P1 for the current block based on the second piece of motion information M1; and (iii) generating the prediction block Pb01 as a weighted combination of the first and second prediction blocks P0 and P1 based on the weight factor W1. In some aspects, generating the second prediction block P1 for the current block based on the second piece of motion information M1 may include: (i) refining the second piece of motion information M1 based on motion estimation such that the refined second piece of motion information M1 generates a prediction block for the current block that minimizes a difference with the first prediction block P0 for the current block; and (ii) using the refined second piece of motion information M1 to generate the second prediction block P1 for the current block.

Figure 19:
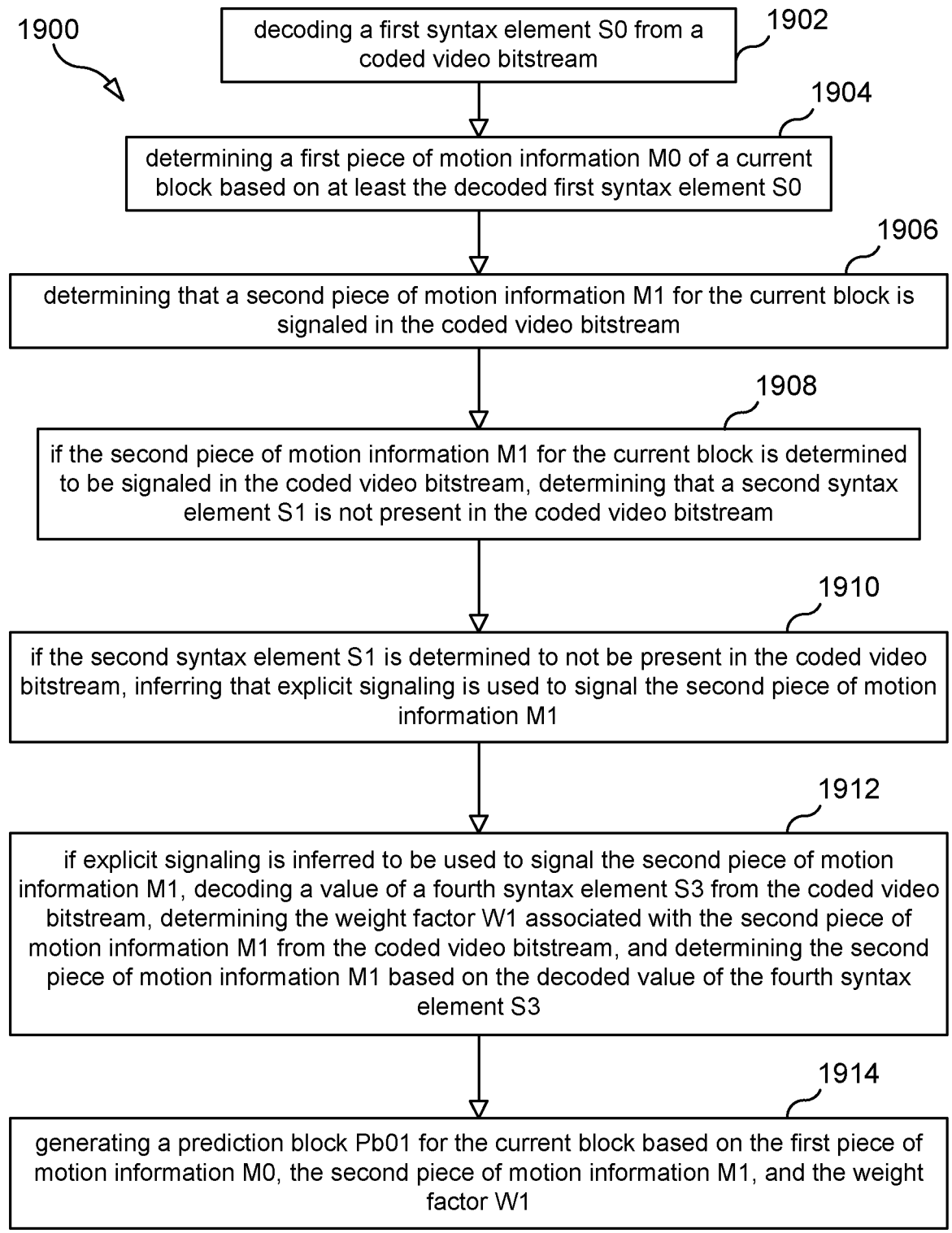
FIG. 19 is a flow chart illustrating a process according to some aspects.

FIG. 19 illustrates a process 1900 according to some aspects. In some aspects, the process 1900 may be for decoding a current block within a current picture inside a coded video bitstream. In some aspects, some or all of the steps of the process 1900 may be performed by a decoder 1004.

In some aspects, as shown in FIG. 19, the process 1900 may include a step 1902 in which the decoder 1004 decodes a first syntax element S0 from a coded video bitstream.

In some aspects, as shown in FIG. 19, the process 1900 may include a step 1904 in which the decoder 1004 determines a first piece of motion information M0 of the current block based on at least the decoded first syntax element S0.

In some aspects, as shown in FIG. 19, the process 1900 may include a step 1906 in which the decoder 1004 determines that a second piece of motion information M1 for the current block is signaled in the coded video bitstream.

In some aspects, as shown in FIG. 19, the process 1900 may include a step 1908 in which the decoder 1004, if the second piece of motion information M1 for the current block is determined to be signaled in the coded video bitstream, determines that a second syntax element S1 is not present in the coded video bitstream. In some aspects, the second syntax element S1 may be a multi-hypothesis prediction (MHP) merge flag.

In some aspects, determining that the second syntax element S1 is not present in the coded video bitstream in step 1908 may include determining a value V1 based on a fifth syntax element S4 in a parameter set P and comparing the value V1 to a constant value C0 (e.g., 0, 1, or 2). In some aspects, the parameter set P may be a sequence parameter set (SPS), a picture parameter set (PPS), a slice header, or a picture header. In some aspects, the second syntax element S1 may be determined to be not present in the coded video bitstream if the value V1 is not greater than the constant value C0. In some aspects, the value V1 may indicate a maximum length of a motion information list CANDLIST_M1 associated with the second piece of motion information M1. In some aspects, the value V1 may indicate a maximum length for the motion information list CANDLIST_M1 associated with the second piece of motion information M1 that is less than or equal to the constant value C0 (e.g., 0, 1, or 2). In some alternative aspects, the fifth syntax element S4 may indicate whether implicit signaling is disabled, and, if the value V1 based on the fifth syntax element S4 indicates that implicit signaling is disabled, the second syntax element S1 may be determined to not be present in the coded video bitstream.

In some aspects, as shown in FIG. 19, the process 1900 may include a step 1910 in which the decoder 1004, if the second syntax element S1 is determined to not be present in the coded video bitstream, infers that explicit signaling is used to signal the second piece of motion information M1.

In some aspects, as shown in FIG. 19, the process 1900 may include a step 1912 in which the decoder 1004, if explicit signaling is inferred to be used to signal the second piece of motion information M1, decodes a value of a fourth syntax element S3 from the coded video bitstream, determines the weight factor W1 associated with the second piece of motion information M1 from the coded video bitstream, and determines the second piece of motion information M1 based on the decoded value of the fourth syntax element S3. In some aspects, determining the second piece of motion information M1 based on the value of the fourth syntax element S3 in step 1912 may include determining the value for one element (e.g., reference picture index) of the motion information M1 motion vector to be the value of the fourth syntax element S3.

In some aspects, as shown in FIG. 19, the process 1900 may include a step 1914 in which the decoder 1004 generates a prediction block Pb01 for the current block based on the first piece of motion information M0, the second piece of motion information M1, and the weight factor W1.

Figure 20:
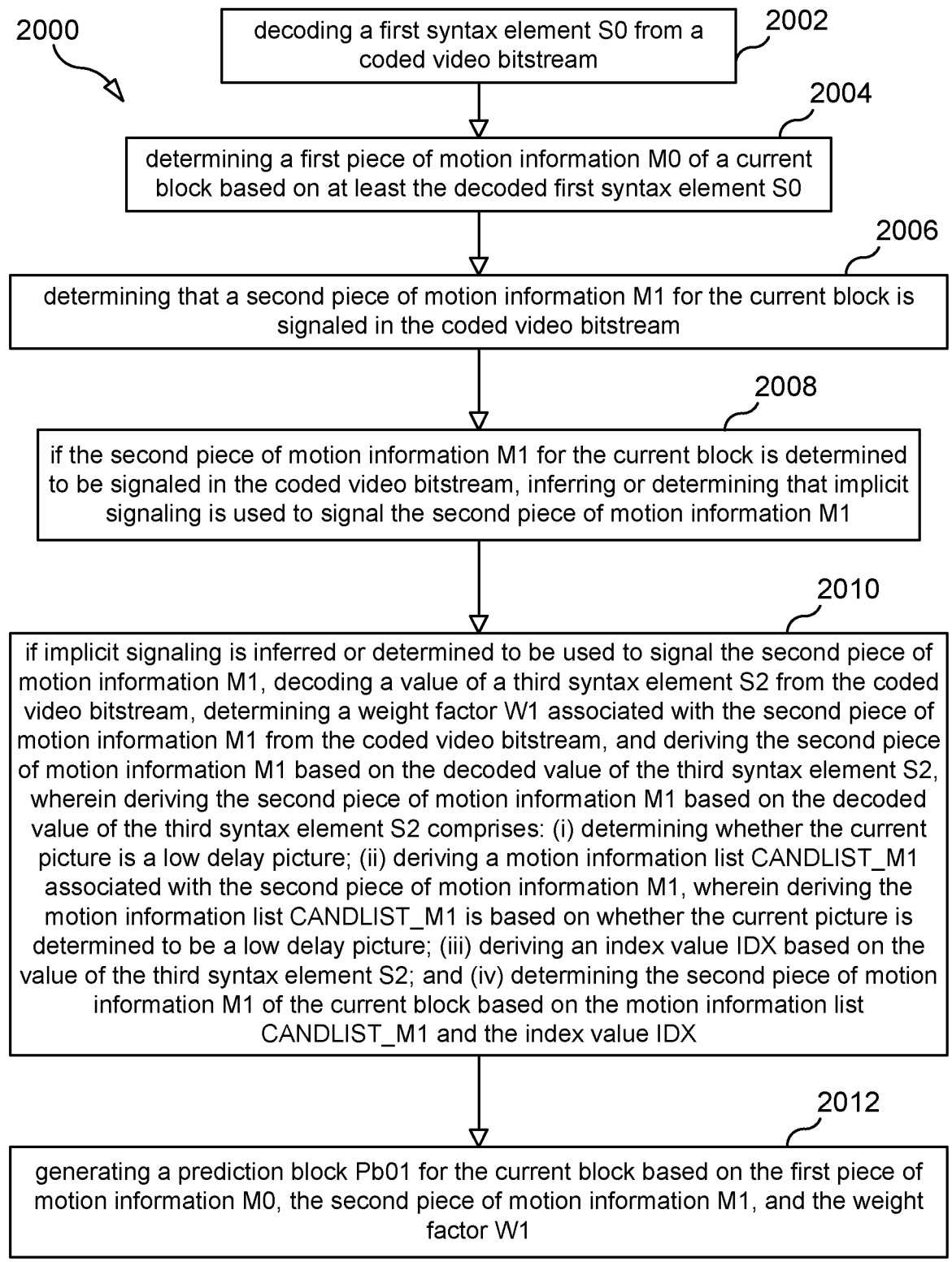
FIG. 20 is a flow chart illustrating a process according to some aspects.

FIG. 20 illustrates a process 2000 according to some aspects. In some aspects, the process 2000 may be for decoding a current block within a current picture inside a coded video bitstream. In some aspects, some or all of the steps of the process 2000 may be performed by a decoder 1004.

In some aspects, as shown in FIG. 20, the process 2000 may include a step 2002 in which the decoder 1004 decodes a first syntax element S0 from a coded video bitstream.

In some aspects, as shown in FIG. 20, the process 2000 may include a step 2004 in which the decoder 1004 determines a first piece of motion information M0 of the current block based on at least the decoded first syntax element S0.

In some aspects, as shown in FIG. 20, the process 2000 may include a step 2006 in which the decoder 1004 determines that a second piece of motion information M1 for the current block is signaled in the coded video bitstream.

In some aspects, as shown in FIG. 20, the process 2000 may include a step 2008 in which the decoder 1004, if the second piece of motion information M1 for the current block is determined to be signaled in the coded video bitstream, infers (e.g., if the second syntax element S1 is not present in the coded video bitstream) or determines (e.g., if the second syntax element S1 is present in the coded video bitstream) that implicit signaling is used to signal the second piece of motion information M1.

In some aspects, as shown in FIG. 20, the process 2000 may include a step 2010 in which the decoder 1004, if implicit signaling is inferred or determined to be used to signal the second piece of motion information M1, decodes a value of a third syntax element S2 from the coded video bitstream, determines a weight factor W1 associated with the second piece of motion information M1 from the coded video bitstream, and derives the second piece of motion information M1 based on the decoded value of the third syntax element S2. In some aspects, deriving the second piece of motion information M1 based on the decoded value of the third syntax element S2 may include: (i) determining whether the current picture is a low delay picture, (ii) deriving a motion information list CANDLIST_M1 associated with the second piece of motion information M1, (iii) deriving an index value IDX based on the value of the third syntax element S2, and (iv) determining the second piece of motion information M1 of the current block based on the motion information list CANDLIST_M1 and the index value IDX. Deriving the motion information list CANDLIST_M1 may be based on whether the current picture is determined to be a low delay picture.

In some aspects, the motion information list CANDLIST_M1 derived in step 2010 may include only one entry derived from an L0 or L1 motion vector of a first previously coded block BLK_A before an entry derived from a motion vector of a second previously coded block BLK_B if the current picture is determined to be a low delay picture, and the motion information list CANDLIST_M1 may include both a first entry derived from an L0 motion vector of the first previously coded block BLK_A and a second entry derived from the L1 motion vector of the first previously coded block BLK_A before an entry derived from an L0 or L1 motion vector of a second previously coded block BLK_B if the current picture is determined to not be a low delay picture.

In some aspects, as shown in FIG. 20, the process 2000 may include a step 2012 in which the decoder 1004 generates a prediction block Pb01 for the current block based on the first piece of motion information M0, the second piece of motion information M1, and the weight factor W1.

Figure 21:
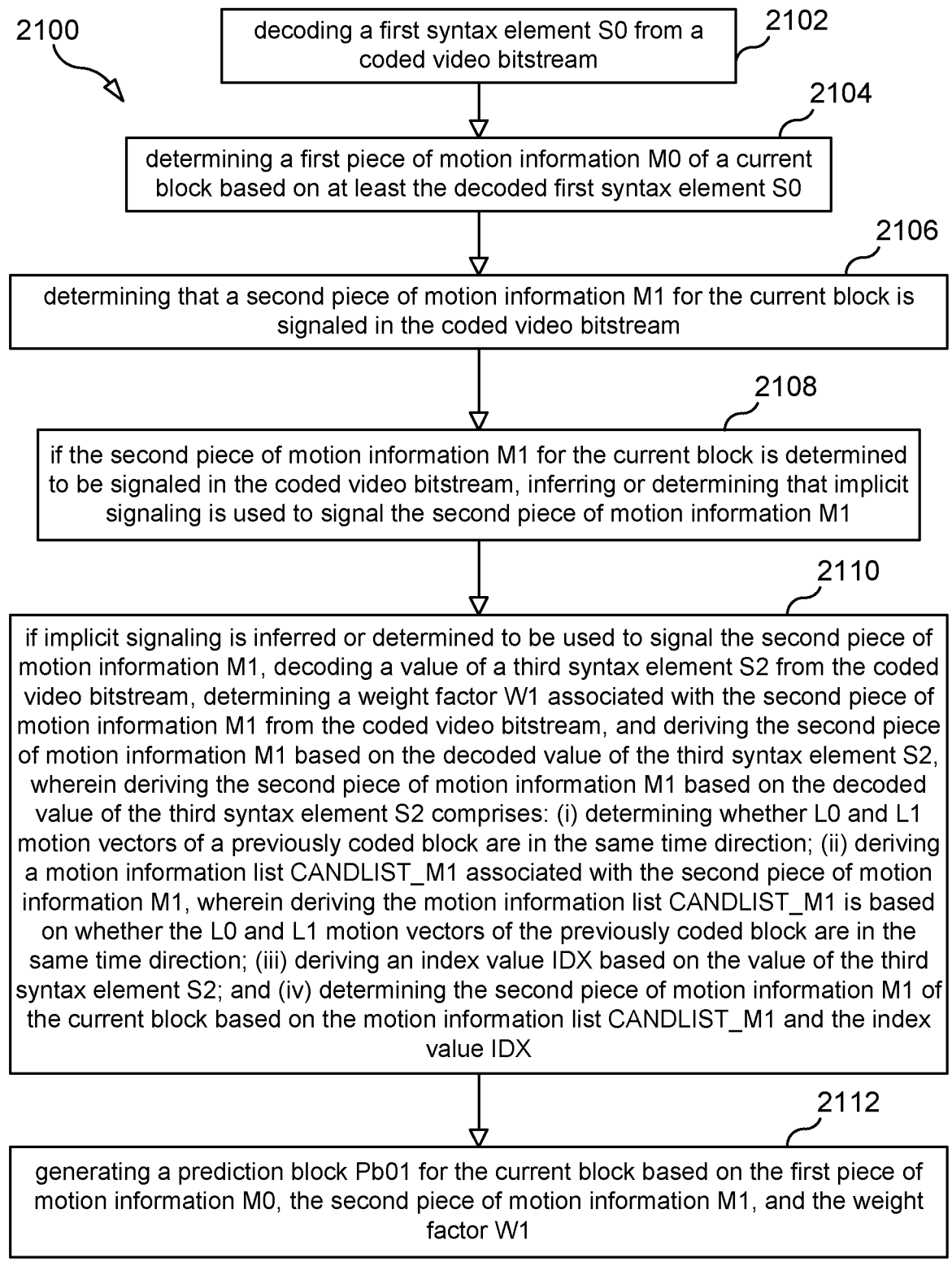
FIG. 21 is a flow chart illustrating a process according to some aspects.

FIG. 21 illustrates a process 2100 according to some aspects. In some aspects, the process 2100 may be for decoding a current block within a current picture inside a coded video bitstream. In some aspects, some or all of the steps of the process 2100 may be performed by a decoder 1004.

In some aspects, as shown in FIG. 21, the process 2100 may include a step 2102 in which the decoder 1004 decodes a first syntax element S0 from a coded video bitstream.

In some aspects, as shown in FIG. 21, the process 2100 may include a step 2104 in which the decoder 1004 determines a first piece of motion information M0 of the current block based on at least the decoded first syntax element S0.

In some aspects, as shown in FIG. 21, the process 2100 may include a step 2106 in which the decoder 1004 determines that a second piece of motion information M1 for the current block is signaled in the coded video bitstream.

In some aspects, as shown in FIG. 21, the process 2100 may include a step 2108 in which the decoder 1004, if the second piece of motion information M1 for the current block is determined to be signaled in the coded video bitstream, infers or determines that implicit signaling is used to signal the second piece of motion information M1.

In some aspects, as shown in FIG. 21, the process 2100 may include a step 2110 in which the decoder 1004, if implicit signaling is inferred or determined to be used to signal the second piece of motion information M1, decodes a value of a third syntax element S2 from the coded video bitstream, determines a weight factor W1 associated with the second piece of motion information M1 from the coded video bitstream, and derives the second piece of motion information M1 based on the decoded value of the third syntax element S2. Deriving the second piece of motion information M1 based on the decoded value of the third syntax element S2 may include: (i) determining whether L0 and L1 motion vectors of a previously coded block are in the same time direction; (ii) deriving a motion information list CANDLIST_M1 associated with the second piece of motion information M1; (iii) deriving an index value IDX based on the value of the third syntax element S2; and (iv) determining the second piece of motion information M1 or the current block based on the motion information list CANDLIST_M1 and the index value IDX. In some aspects, deriving the motion information list CANDLIST_M1 may be based on whether the L0 and L1 motion vectors of the previously coded block are in the same time direction.

In some aspects, the motion information list CANDLIST_M1 derived in step 2110 may include only one entry derived from an L0 or L1 motion vector of a first previously coded block BLK_A before an entry derived from a motion vector of a second previously coded block BLK_B if the L0 and L1 motion vectors of the first previously coded block BLK_A are determined to be in the same time direction, and the motion information list CANDLIST_M1 may include both a first entry derived from an L0 motion vector of the first previously coded block BLK_A and a second entry derived from the L1 motion vector of the first previously coded block BLK_A before an entry derived from an L0 or L1 motion vector of a second previously coded block BLK_B if the L0 and L1 motion vectors of the first previously coded block BLK_A are determined to not be in the same time direction.

In some aspects, determining whether the L0 and L1 motion vectors of the previously coded block are in the same time direction in step 2110 may include: (i) determining the time direction of the L0 motion vector of the previously coded block; (ii) determining the time direction of the L1 motion vector of the previously coded block; and (iii) determining whether the time directions of the L0 and L1 motion vectors of the previously coded block are the same. In some aspects, determining the time direction of the L0 motion vector of the previously coded block may include comparing a picture order count (POC) value of an L0 picture of the previously coded block with a POC value of the current picture (e.g., time_dir_L0=sign(POC_L0−POC_curr) where POC_L0 is the POC of the L0 picture of the previously coded block, POC_curr is the POC of the current picture, and sign(x) returns 1 if x>0 and −1 if x<0), and determining the time direction of the L1 motion vector of the previously coded block may include comparing a POC value of an L1 picture of the previously coded block with the POC value of the current picture (e.g., time_dir_L1=sign(POC_L1−POC_curr) where POC_L1 is the POC of the L0 picture of the previously coded block).

In some aspects, as shown in FIG. 21, the process 2100 may include a step 2112 in which the decoder 1004 generates a prediction block Pb01 for the current block based on the first piece of motion information M0, the second piece of motion information M1, and the weight factor W1.

Figure 22:
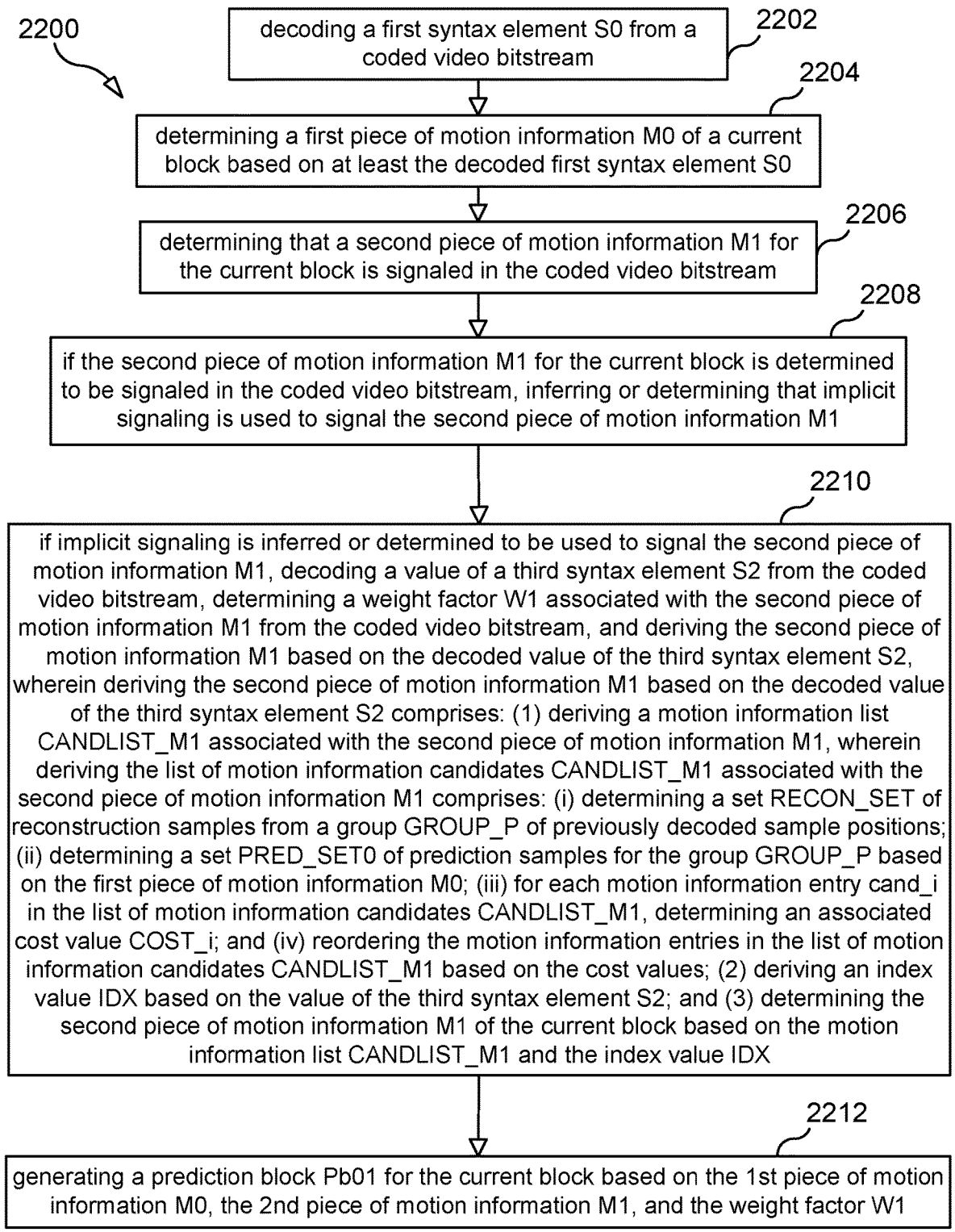
FIG. 22 is a flow chart illustrating a process according to some aspects.

FIG. 22 illustrates a process 2200 according to some aspects. In some aspects, the process 2200 may be for decoding a current block within a current picture inside a coded video bitstream. In some aspects, some or all of the steps of the process 2200 may be performed by a decoder 1004.

In some aspects, as shown in FIG. 22, the process 2200 may include a step 2202 in which the decoder 1004 decodes a first syntax element S0 from a coded video bitstream.

In some aspects, as shown in FIG. 22, the process 2200 may include a step 2204 in which the decoder 1004 determines a first piece of motion information M0 of the current block based on at least the decoded first syntax element S0.

In some aspects, as shown in FIG. 22, the process 2200 may include a step 2206 in which the decoder 1004 determines that a second piece of motion information M1 for the current block is signaled in the coded video bitstream.

In some aspects, as shown in FIG. 22, the process 2200 may include a step 2208 in which the decoder 1004, if the second piece of motion information M1 for the current block is determined to be signaled in the coded video bitstream, infers or determines that implicit signaling is used to signal the second piece of motion information M1.

In some aspects, as shown in FIG. 22, the process 2200 may include a step 2210 in which the decoder 1004, if implicit signaling is inferred or determined to be used to signal the second piece of motion information M1, decodes a value of a third syntax element S2 from the coded video bitstream, determines a weight factor W1 associated with the second piece of motion information M1 from the coded video bitstream, and derives the second piece of motion information M1 based on the decoded value of the third syntax element S2. In some aspects, deriving the second piece of motion information M1 based on the decoded value of the third syntax element S2 may include deriving a motion information list CANDLIST_M1 associated with the second piece of motion information M1. In some aspects, deriving the list of motion information candidates CANDLIST_M1 associated with the second piece of motion information M1 may include: (i) determining a set RECON_SET of reconstruction samples from a group GROUP_P of previously decoded sample positions; (ii) determining a set PRED_SET0 of prediction samples for the group GROUP_P based on the first piece of motion information M0; (iii) for each motion information candidates CANDLIST_M1, determining an associated cost value COST_i; and (iv) reordering the motion information entries in the list of motion information candidates CANDLIST_M1 based on the cost values. In some aspects, deriving the second piece of motion information M1 based on the decoded value of the third syntax element S2 may further include deriving an index value IDX based on the value of the third syntax element S2 and determining the second piece of motion information M1 of the current block based on the motion information list CANDLIST_M1 and the index value IDX.

In some aspects, determining the associated cost value COST_i for the motion information entry cand_i in step 2210 may include: (i) determining a set CANDPRED_i of prediction samples for the group GROUP_P based on the motion information cand_i; (ii) determining a set COMBI_i of prediction samples including prediction sample values that are a combination of the prediction sample set PRED_SET0 and the prediction sample set CANDPRED_i based on the weight W1; (iii) comparing the reconstruction set RECON_SET and the prediction sample set COMBI_i; and (iv) determining the cost value COST_i based on a comparison of the reconstruction set RECON_SET and the prediction set COMBI_i. In some aspects, reordering the motion information entries in the list of motion information candidates CANDLIST_M1 based on the cost values in step 2210 may include reordering the motion information entries in the list of motion information candidates CANDLIST_M1 to have ascending cost values.

In some aspects, the group GROUP_P of previously decoded sample positions may be sample positions in the current picture and/or one or more previously decoded pictures. In some aspects, as shown in FIGS. 14 and 15, the GROUP_P of previously decoded sample positions may be sample positions that are spatially neighboring to the current block. In some aspects, as shown in FIGS. 14 and 15, the GROUP_P of previously decoded sample positions may be sample positions that are above the current block and/or to the left of the current block. In some aspects, as shown in FIGS. 14 and 15, a width tpW_A of the sample positions of the GROUP_P of previously decoded sample positions that are above the current block in a horizontal direction may equal or be greater than a width curW of the current block, and a height tpH_L of the sample positions of the GROUP_P of previously decoded sample positions that are to the left of the current block in a vertical direction may equal or be greater than a height curH of the current block.

In some aspects, as shown in FIG. 16, determining the set PRED_SET0 of prediction samples for the group GROUP_P may include: (i) determining motion information of boundary subblocks of the current block based on the first piece of motion information M0; (ii) dividing the sample position group GROUP_P into subgroups that are each associated with motion information of a boundary subblock; and (iii) for each subgroup in GROUP_P, generating corresponding prediction samples for the subgroup based on the associated motion information of the boundary subblock. In some aspects, the determined set PRED_SET0 includes the prediction samples from all the subgroups.

In some aspects, determining an associated cost value COST_i for a motion information entry cand_i in the list of motion information candidates CANDLIST_M1 in step 2210 may include: (i) determining a set of alternative motion information ALTERMI_SET based on the entry cand_i; (ii) determining a cost value ALTERCOST_j for each alternative motion information AMI_j in the set ALTERMI_SET; (iii) determining the motion information entry cand_i to be the alternative motion information that has the smallest cost value within the alternative motion information set ALTERMI_SET; and (iv) determining the associated cost value COST_i of the entry cand_i as the smallest cost value within the set ALTERMI_SET. In some aspects, determining the cost value ALTERCOST_j for an alternative motion information AMI_j in the set ALTERMI_SET may include: (i) determining a set ALTERPRED_j of prediction samples for the sample position group GROUP_P based on the alternative motion information AMI_j; (ii) determining a set ALTERCOMBI_j of prediction samples that is a combination of the prediction sample set PRED_SET0 and ALTERPRED_j based on the weight W1; and (iii) determining the cost value ALTERCOST_j based on comparing the reconstruction set RECON_SET and the prediction set ALTERCOMBI_j.

In some aspects, determining the associated cost value COST_i for the motion information entry cand_i in step 2210 may include: (i) for each sample position in the group GROUP_P, determining a cost value Ci for the sample position and a cost weighting factor cWi for the sample position; and (ii) determining the cost value COST_i as a sum of Ci*cWi for the sample positions in the group GROUP_P. In some aspects, a cost weighting factor (e.g., cWi=2) determined for sample positions that are closer to a boundary of the current block may be higher than a cost weighting factor (e.g., cWi=1) determined for sample positions that are further away from a boundary of the current block.

In some aspects, as shown in FIG. 22, the process 2200 may include a step 2212 in which the decoder 1004 generates a prediction block Pb01 for the current block based on the first piece of motion information M0, the second piece of motion information M1, and the weight factor W1.

Figure 23:
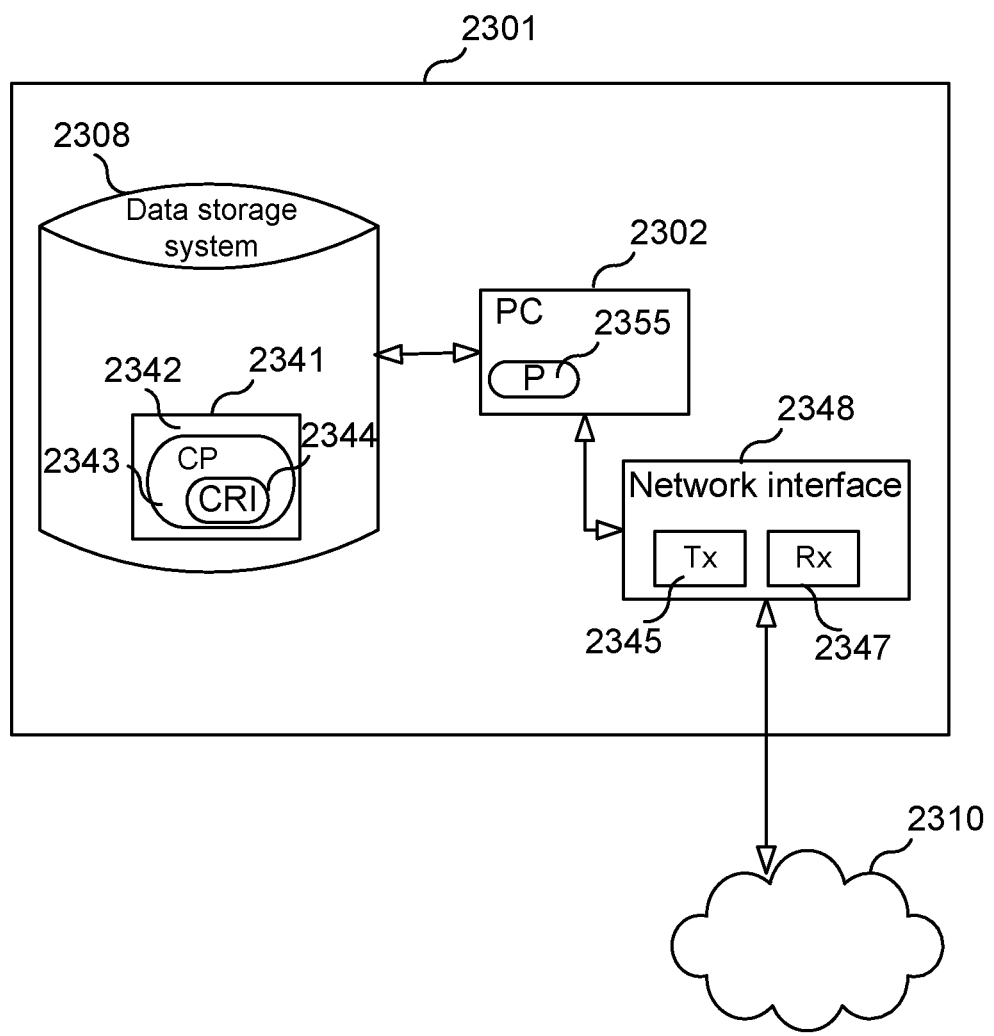
FIG. 23 is a block diagram of an apparatus according to some aspects.

FIG. 23 is a block diagram of an apparatus 2301 for implementing the encoder 1002 or the decoder 1004 according to some aspects. That is, apparatus 2301 can be adapted to perform the methods disclosed herein. In aspects where the apparatus 2301 implements the encoder 1002, the apparatus 2301 may be referred to as "encoding apparatus 2301," and, in aspects where the apparatus 2301 implements the decoder 1004, the apparatus 2301 may be referred to as a "decoding apparatus 2301." As shown in FIG. 23, the apparatus 2301 may comprise: processing circuitry (PC) 2302, which may include one or more processors (P) 2355 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 2301 may be a distributed computing apparatus); at least one network interface 2348 comprising a transmitter (Tx) 2345 and a receiver (Rx) 2347 for enabling apparatus 2301 to transmit data to and receive data from other nodes connected to a network 1010 (e.g., an Internet Protocol (IP) network) to which network interface 2348 is connected (directly or indirectly) (e.g., network interface 2348 may be wirelessly connected to the network 1010, in which case network interface 2348 is connected to an antenna arrangement); and/or a storage unit (a.k.a., "data storage system") 2308, which may include one or more non-volatile storage devices and/or one or more volatile storage devices. In aspects where PC 2302 includes a programmable processor, a computer program product (CPP) 2341 may be provided. In some aspects, the CPP 2341 may include a computer readable medium (CRM) 2342 storing a computer program (CP) 2343 comprising computer readable instructions (CRI) 2344. The CRM 2342 may be a non-transitory computer readable medium, such as, magnetic media (e.g., a hard disk), optical media, memory devices (e.g., random access memory, flash memory), and the like. In some aspects, the CRI 2344 of computer program 2343 is configured such that when executed by PC 2302, the CRI causes apparatus 2301 to perform steps described herein (e.g., steps described herein with reference to the flow charts of FIGS. 18-22). In some other aspects, the apparatus 2301 may be configured to perform steps described herein without the need for code. That is, for example, PC 2302 may consist merely of one or more ASICs. Hence, the features of the embodiments described herein may be implemented in hardware and/or software.

EMBODIMENTS

A1. A method (1800) for processing (e.g., decoding) a current block within a current picture, the method comprising:
  decoding a first syntax element S0 from a coded video bitstream;
  determining a first piece of motion information M0 of the current block based on at least the decoded first syntax element S0;
  determining that a second piece of motion information M1 for the current block is signaled in the coded video bitstream;
  if the second piece of motion information M1 for the current block is determined to be signaled in the coded video bitstream, determining whether a second syntax element S1 is present in the coded video bitstream;
  if the second syntax element S1 is determined to not be present in the coded video bitstream, inferring which one of implicit signaling and explicit signaling is used to signal the second piece of motion information M1;
  if the second syntax element S1 is determined to be present in the coded video bitstream, decoding a value for the second syntax element S1 and determining which one of implicit signaling and explicit signaling is used to signal the second piece of motion information M1 based on the decoded value of the second syntax element S1;
  if implicit signaling is inferred or determined to be used to signal the second piece of motion information M1, decoding a value of a third syntax element S2 from the coded video bitstream, determining a weight factor W1 associated with the second piece of motion information M1 from the coded video bitstream, and deriving the second piece of motion information M1 based on the decoded value of the third syntax element S2;
  if explicit signaling is inferred or determined to be used to signal the second piece of motion information M1, decoding a value of a fourth syntax element S3 from the coded video bitstream, determining the weight factor W1 associated with the second piece of motion information M1 from the coded video bitstream, and determining the second piece of motion information M1 based on the decoded value of the fourth syntax element S3; and
  generating a prediction block Pb01 for the current block based on the first piece of motion information M0, the second piece of motion information M1, and the weight factor W1.

A2. The method of embodiment A1, wherein the second syntax element S1 is a multi-hypothesis prediction (MHP) merge flag.
A3. The method of embodiment A1 or A2, wherein the third syntax element S2 is a motion information index.
A4. The method of any one of embodiments A1-A3, wherein determining whether the second syntax element S1 is present in the coded video bitstream comprises:
  determining a value V1 based on a fifth syntax element S4 in a parameter set P; and
  comparing the value V1 to a constant value C0 (e.g., 0, 1, or 2).
A5. The method of embodiment A4, wherein the parameter set P is a sequence parameter set (SPS), a picture parameter set (PPS), a slice header, or a picture header.
A6. The method of embodiment A4 or A5, wherein the second syntax element S1 is determined to be present in the coded video bitstream if the value V1 is greater than the constant value C0, and the second syntax element S1 is determined to be not present in the coded video bitstream if the value V1 is not greater than the constant value C0.
A7. The method of any one of embodiments A4-A6, wherein the value V1 indicates a maximum length of a motion information list CANDLIST_M1 associated with the second piece of motion information M1.
A8. The method of embodiments A7, wherein, if the value V1 indicates a maximum length of 0 for the motion information list CANDLIST_M1 associated with the second piece of motion information M1, the second syntax element S1 is determined to not be present in the coded video bitstream, and explicit signaling is inferred to be used to signal the second piece of motion information M1 associated with the second piece of motion information M1.
A9. The method of any one of embodiments A1-A8, wherein determining the second piece of motion information M1 based on the value of the fourth syntax element S3 includes determining the value for one element (e.g., reference picture index) of the motion information M1 motion vector to be the value of the fourth syntax element S3.
A10. The method of any one of embodiments A1-A9, wherein deriving the second piece of motion information M1 based on the decoded value of the third syntax element S2 comprises:
  deriving a motion information list CANDLIST_M1 associated with the second piece of motion information M1;
  deriving an index value IDX based on the value of the third syntax element S2; and
  determining the second piece of motion information M1 of the current block based on the motion information list CANDLIST_M1 and the index value IDX.
A11. The method of embodiment A10, wherein at least one motion information entry in the motion information list CANDLIST_M1 associated with the second piece of motion information M1 is derived based on the first piece of motion information M0 of the current block.
A12. The method of embodiment A10 or A11, further comprising determining whether the current picture is a low delay picture, wherein deriving the motion information list CANDLIST_M1 is based on whether the current picture is determined to be a low delay picture.
A13. The method of embodiment A12, wherein the motion information list CANDLIST_M1 includes only one entry derived from an L0 or L1 motion vector of a first previously coded block BLK_A before an entry derived from a motion vector of a second previously coded block BLK_B if the current picture is determined to be a low delay picture, and the motion information list CANDLIST_M1 includes both a first entry derived from an L0 motion vector of the first previously coded block BLK_A and a second entry derived from the L1 motion vector of the first previously coded block BLK_A before an entry derived from an L0 or L1 motion vector of a second previously coded block BLK_B if the current picture is determined to not be a low delay picture.

A14. The method of embodiment A10 or A11, further comprising determining whether L0 and L1 motion vectors of a previously coded block are in the same time direction, wherein deriving the motion information list CANDLIST_M1 is based on whether the L0 and L1 motion vectors of the previously coded block are in the same time direction.

A15. The method of embodiment A14, wherein the motion information list CANDLIST_M1 includes only one entry derived from an L0 or L1 motion vector of a first previously coded block BLK_A before an entry derived from a motion vector of a second previously coded block BLK_B if the L0 and L1 motion vectors of the previously coded block are determined to be in the same time direction, and the motion information list CANDLIST_M1 includes both a first entry derived from an L0 motion vector of the first previously coded block BLK_A and a second entry derived from the L1 motion vector of the first previously coded block BLK_A before an entry derived from an L0 or L1 motion vector of a second previously coded block BLK_B if the L0 and L1 motion vectors of the first previously coded block BLK_A are determined to not be in the same time direction.

A16. The method of embodiment A14 or A15, wherein determining whether the L0 and L1 motion vectors of the previously coded block are in the same time direction comprises:
    determining the time direction of the L0 motion vector of the previously coded block;
    determining the time direction of the L1 motion vector of the previously coded block; and
    determining whether the time directions of the L0 and L1 motion vectors of the previously coded block are the same.

A17. The method of embodiment A16, wherein determining the time direction of the L0 motion vector of the previously coded block comprises comparing a picture order count (POC) value of an L0 picture of the previously coded block with a POC value of the current picture, and determining the time direction of the L1 motion vector of the previously coded block comprises comparing a POC value of an L1 picture of the previously coded block with the POC value of the current picture.

A18. The method of any one of embodiments A10-A17, wherein deriving the list of motion information candidates CANDLIST_M1 associated with the second piece of motion information M1 comprises:
    determining a set RECON_SET of reconstruction samples from a group GROUP_P of previously decoded sample positions;
    determining a set PRED_SET0 of prediction samples for the group GROUP_P based on the first piece of motion information M0;
    for each motion information entry cand_i in the list of motion information candidates CANDLIST_M1, determining an associated cost value COST_i; and
    reordering the motion information entries in the list of motion information candidates CANDLIST_M1 based on the cost values.

A19. The method of embodiment A18, determining the associated cost value COST_i for the motion information entry cand_i comprises:
    determining a set CANDPRED_i of prediction samples for the group GROUP_P based on the motion information cand_i;
    determining a set COMBI_i of prediction samples including prediction sample values that are a combination of the prediction sample set PRED_SET0 and the prediction sample set CANDPRED_i based on the weight W1;
    comparing the reconstruction set RECON_SET and the prediction sample set COMBI_i; and
    determining the cost value COST_i based on a comparison of the reconstruction set RECON_SET and the prediction set COMBI_i.

A20. The method of embodiment A18 or A19, wherein reordering the motion information entries in the list of motion information candidates CANDLIST_M1 based on the cost values comprises reordering the motion information entries in the list of motion information candidates CANDLIST_M1 to have ascending cost values.

A21. The method of any one of embodiments A18-A20, wherein the group GROUP_P of previously decoded sample positions are sample positions in the current picture and/or one or more previously decoded pictures.

A22. The method of any one of embodiments A18-A21, wherein the GROUP_P of previously decoded sample positions are sample positions that are spatially neighboring to the current block.

A23. The method of any one of embodiments A18-A22, wherein the GROUP_P of previously decoded sample positions are sample positions that are above the current block and/or to the left of the current block.

A24. The method of embodiment A23, wherein a width tpW_A of the sample positions of the GROUP_P of previously decoded sample positions that are above the current block in a horizontal direction equals or is greater than a width curW of the current block, and a height tpH_L of the sample positions of the GROUP_P of previously decoded sample positions that are to the left of the current block in a vertical direction equals or is greater than a height curH of the current block.

A25. The method of any one of embodiments A18-A24, wherein determining the set PRED_SET0 of prediction samples for the group GROUP_P comprises:
    determining motion information of boundary subblocks of the current block based on the first piece of motion information M0;
    dividing the sample position group GROUP_P into subgroups that are each associated with motion information of a boundary subblock; and
    for each subgroup in GROUP_P, generating corresponding prediction samples for the subgroup based on the associated motion information of the boundary subblock, wherein the determined set PRED_SET0 includes the prediction samples from all the subgroups.

A26. The method of any one of embodiments A18-A25, wherein determining an associated cost value COST_i for a motion information entry cand_i in the list of motion information candidates CANDLIST_M1 comprises:
    determining a set of alternative motion information ALTERMI_SET based on the entry cand_i;
    determining a cost value ALTERCOST_j for each alternative motion information AMI_j in the set ALTERMI_SET;

determining the motion information entry cand_i to be the alternative motion information that has the smallest cost value within the alternative motion information set ALTERMI_SET; and determining the associated cost value COST_i of the entry cand_i as the smallest cost value within the set ALTERMI_SET.

A27. The method of embodiment A26, wherein determining the cost value ALTERCOST_j for an alternative motion information AMI_j in the set ALTERMI_SET comprises:

determining a set ALTERPRED_j of prediction samples for the sample position group GROUP_P based on the alternative motion information AMI_j;

determining a set ALTERCOMBI_j of prediction samples that is a combination of the prediction sample set PRED_SET0 and ALTERPRED_j based on the weight W1; and determining the cost value ALTERCOST_j based on comparing the reconstruction set RECON_SET and the prediction set ALTERCOMBI_j.

A28. The method of any one of embodiments A18-A27, wherein determining the associated cost value COST_i for the motion information entry cand_i comprises:

for each sample position in the group GROUP_P, determining a cost value Ci for the sample position and a cost weighting factor cWi for the sample position; and determining the cost value COST_i as a sum of Ci*cWi for the sample positions in the group GROUP_P.

A29. The method of embodiment A28, wherein a cost weighting factor (e.g., cWi=2) determined for sample positions that are closer to a boundary of the current block is higher than a cost weighting factor (e.g., cWi=1) determined for sample positions that are further away from a boundary of the current block.

A30. The method of any one of embodiments A1-A29, wherein generating the prediction block Pb01 for the current block comprises:

generating a first prediction block P0 for the current block based on the first piece of motion information M0;

generating a second prediction block P1 for the current block based on the second piece of motion information M1; and generating the prediction block Pb01 as a weighted combination of the first and second prediction blocks P0 and P1 based on the weight factor W1.

A31. The method of embodiment A30, wherein generating the second prediction block P1 for the current block based on the second piece of motion information M1 comprises:

refining the second piece of motion information M1 based on motion estimation such that the refined second piece of motion information M1 generates a prediction block for the current block that minimizes a difference with the first prediction block P0 for the current block; and using the refined second piece of motion information M1 to generate the second prediction block P1 for the current block.

A32. The method of any one of embodiments A10-A31, wherein deriving the motion information list CANDLIST_M1 associated with the second piece of motion information M1 comprises:

for each motion information entry cand_i in the motion information list CANDLIST_M1, finding a refined motion information refinedCand_i based on motion estimation that generates a prediction block that minimizes a difference with the first prediction block P0 for the current block; and determining the motion information entry cand_i to be the refined motion information refinedCand_i.

B1. A decoder (1004) configured to:

decode a first syntax element S0 of a current block within a current picture from a coded video bitstream;

determine a first piece of motion information M0 of the current block based on at least the decoded first syntax element S0;

determine that a second piece of motion information M1 for the current block is signaled in the coded video bitstream;

if the second piece of motion information M1 for the current block is determined to be signaled in the coded video bitstream, determine whether a second syntax element S1 is present in the coded video bitstream;

if the second syntax element S1 is determined to not be present in the coded video bitstream, infer which one of implicit signaling and explicit signaling is used to signal the second piece of motion information M1;

if the second syntax element S1 is determined to be present in the coded video bitstream, decode a value for the second syntax element S1 and determine which one of implicit signaling and explicit signaling is used to signal the second piece of motion information M1 based on the decoded value of the second syntax element S1;

if implicit signaling is inferred or determined to be used to signal the second piece of motion information M1, decode a value of a third syntax element S2 from the coded video bitstream, determine a weight factor W1 associated with the second piece of motion information M1 from the coded video bitstream, and derive the second piece of motion information M1 based on the decoded value of the third syntax element S2;

if explicit signaling is inferred or determined to be used to signal the second piece of motion information M1, decode a value of a fourth syntax element S3 from the coded video bitstream, determine the weight factor W1 associated with the second piece of motion information M1 from the coded video bitstream, and determine the second piece of motion information M1 based on the decoded value of the fourth syntax element S3; and generate a prediction block Pb01 for the current block based on the first piece of motion information M0, the second piece of motion information M1, and the weight factor W1.

C1. A method (1900) for processing (e.g., decoding) a current block within a current picture, the method comprising:

decoding a first syntax element S0 from a coded video bitstream;

determining a first piece of motion information M0 of the current block based on at least the decoded first syntax element S0;

determining that a second piece of motion information M1 for the current block is signaled in the coded video bitstream;

if the second piece of motion information M1 for the current block is determined to be signaled in the coded video bitstream, determining that a second syntax element S1 is not present in the coded video bitstream;

if the second syntax element S1 is determined to not be present in the coded video bitstream, inferring that explicit signaling is used to signal the second piece of motion information M1;

if explicit signaling is inferred to be used to signal the second piece of motion information M1, decoding a value of a fourth syntax element S3 from the coded video bitstream, determining the weight factor W1 associated with the second piece of motion information M1 from the coded video bitstream, and determining the second piece of motion information M1 based on the decoded value of the fourth syntax element S3; and generating a prediction block Pb01 for the current block based on the first piece of motion information M0, the second piece of motion information M1, and the weight factor W1.

C2. The method of embodiment C1, wherein the second syntax element S1 is a multi-hypothesis prediction (MHP) merge flag.

C3. The method of embodiment C1 or C2, wherein determining that the second syntax element S1 is not present in the coded video bitstream comprises:

determining a value V1 based on a fifth syntax element S4 in a parameter set P; and comparing the value V1 to a constant value C0 (e.g., 0, 1, or 2).

C4. The method of embodiment C3, wherein the parameter set P is a sequence parameter set (SPS), a picture parameter set (PPS), a slice header, or a picture header.

C5. The method of embodiment C3 or C4, wherein the second syntax element S1 is determined to be not present in the coded video bitstream if the value V1 is not greater than the constant value C0.

C6. The method of any one of embodiments C3-C5, wherein the value V1 indicates a maximum length of a motion information list CANDLIST_M1 associated with the second piece of motion information M1.

C7. The method of embodiments C6, wherein the value V1 indicates a maximum length of 0 for the motion information list CANDLIST_M1 associated with the second piece of motion information M1.

C8. The method of any one of embodiments C1-C7, wherein determining the second piece of motion information M1 based on the value of the fourth syntax element S3 includes determining the value for one element (e.g., reference picture index) of the motion information M1 motion vector to be the value of the fourth syntax element S3.

D1. A decoder (1004) configured to:

decode a first syntax element S0 of a current block within a current picture from a coded video bitstream;

determine a first piece of motion information M0 of the current block based on at least the decoded first syntax element S0;

determine that a second piece of motion information M1 for the current block is signaled in the coded video bitstream;

if the second piece of motion information M1 for the current block is determined to be signaled in the coded video bitstream, determine that a second syntax element S1 is not present in the coded video bitstream;

if the second syntax element S1 is determined to not be present in the coded video bitstream, infer that explicit signaling is used to signal the second piece of motion information M1;

if explicit signaling is inferred to be used to signal the second piece of motion information M1, decode a value of a fourth syntax element S3 from the coded video bitstream, determine the weight factor W1 associated with the second piece of motion information M1 from the coded video bitstream, and determine the second piece of motion information M1 based on the decoded value of the fourth syntax element S3; and generate a prediction block Pb01 for the current block based on the first piece of motion information M0, the second piece of motion information M1, and the weight factor W1.

E1. A method (2000) for processing (e.g., decoding) a current block within a current picture, the method comprising:

decoding a first syntax element S0 from a coded video bitstream;

determining a first piece of motion information M0 of the current block based on at least the decoded first syntax element S0;

determining that a second piece of motion information M1 for the current block is signaled in the coded video bitstream;

if the second piece of motion information M1 for the current block is determined to be signaled in the coded video bitstream, inferring or determining that implicit signaling is used to signal the second piece of motion information M1;

if implicit signaling is inferred or determined to be used to signal the second piece of motion information M1, decoding a value of a third syntax element S2 from the coded video bitstream, determining a weight factor W1 associated with the second piece of motion information M1 from the coded video bitstream, and deriving the second piece of motion information M1 based on the decoded value of the third syntax element S2, wherein deriving the second piece of motion information M1 based on the decoded value of the third syntax element S2 comprises:

determining whether the current picture is a low delay picture;

deriving a motion information list CANDLIST_M1 associated with the second piece of motion information M1, wherein deriving the motion information list CANDLIST_M1 is based on whether the current picture is determined to be a low delay picture;

deriving an index value IDX based on the value of the third syntax element S2; and determining the second piece of motion information M1 of the current block based on the motion information list CANDLIST_M1 and the index value IDX; and generating a prediction block Pb01 for the current block based on the first piece of motion information M0, the second piece of motion information M1, and the weight factor W1.

E2. The method of embodiment E1, wherein the motion information list CANDLIST_M1 includes only one entry derived from an L0 or L1 motion vector of a first previously coded block BLK_A before an entry derived from a motion vector of a second previously coded block BLK_B if the current picture is determined to be a low delay picture, and the motion information list CANDLIST_M1 includes both a first entry derived from an L0 motion vector of the first previously coded block BLK_A and a second entry derived from the L1 motion vector of the first previously coded block BLK_A before an entry derived from an L0 or L1 motion vector of a second previously coded block BLK_B if the current picture is determined to not be a low delay picture.

F1. A decoder (1004) configured to:

decode a first syntax element S0 of a current block within a current picture from a coded video bitstream;

determine a first piece of motion information M0 of the current block based on at least the decoded first syntax element S0;

determine that a second piece of motion information M1 for the current block is signaled in the coded video bitstream;

if the second piece of motion information M1 for the current block is determined to be signaled in the coded video bitstream, infer or determine that implicit signaling is used to signal the second piece of motion information M1;

if implicit signaling is inferred or determined to be used to signal the second piece of motion information M1, decode a value of a third syntax element S2 from the coded video bitstream, determine a weight factor W1 associated with the second piece of motion information M1 from the coded video bitstream, and derive the second piece of motion information M1 based on the decoded value of the third syntax element S2, wherein deriving the second piece of motion information M1 based on the decoded value of the third syntax element S2 comprises:

determining whether the current picture is a low delay picture;

deriving a motion information list CANDLIST_M1 associated with the second piece of motion information M1, wherein deriving the motion information list CANDLIST_M1 is based on whether the current picture is determined to be a low delay picture;

deriving an index value IDX based on the value of the third syntax element S2; and determining the second piece of motion information M1 of the current block based on the motion information list CANDLIST_M1 and the index value IDX; and generate a prediction block Pb01 for the current block based on the first piece of motion information M0, the second piece of motion information M1, and the weight factor W1.

G1. A method (2100) for processing (e.g., decoding) a current block within a current picture, the method comprising:

decoding a first syntax element S0 from a coded video bitstream;

determining a first piece of motion information M0 of the current block based on at least the decoded first syntax element S0;

determining that a second piece of motion information M1 for the current block is signaled in the coded video bitstream;

if the second piece of motion information M1 for the current block is determined to be signaled in the coded video bitstream, inferring or determining that implicit signaling is used to signal the second piece of motion information M1;

if implicit signaling is inferred or determined to be used to signal the second piece of motion information M1, decoding a value of a third syntax element S2 from the coded video bitstream, determining a weight factor W1 associated with the second piece of motion information M1 from the coded video bitstream, and deriving the second piece of motion information M1 based on the decoded value of the third syntax element S2, wherein deriving the second piece of motion information M1 based on the decoded value of the third syntax element S2 comprises:

determining whether L0 and L1 motion vectors of a previously coded block are in the same time direction;

deriving a motion information list CANDLIST_M1 associated with the second piece of motion information M1, wherein deriving the motion information list CANDLIST_M1 is based on whether the L0 and L1 motion vectors of the previously coded block are in the same time direction;

deriving an index value IDX based on the value of the third syntax element S2; and determining the second piece of motion information M1 of the current block based on the motion information list CANDLIST_M1 and the index value IDX; and generating a prediction block Pb01 for the current block based on the first piece of motion information M0, the second piece of motion information M1, and the weight factor W1.

G2. The method of embodiment G1, wherein the motion information list CANDLIST_M1 includes only one entry derived from an L0 or L1 motion vector of a first previously coded block BLK_A before an entry derived from a motion vector of a second previously coded block BLK_B if the L0 and L1 motion vectors of the first previously coded block BLK_A are determined to be in the same time direction, and the motion information list CANDLIST_M1 includes both a first entry derived from an L0 motion vector of the first previously coded block BLK_A and a second entry derived from the L1 motion vector of the first previously coded block BLK_A before an entry derived from an L0 or L1 motion vector of a second previously coded block BLK_B if the L0 and L1 motion vectors of the first previously coded block BLK_A are determined to not be in the same time direction.

G3. The method of embodiment G1 or G2, wherein determining whether the L0 and L1 motion vectors of the previously coded block are in the same time direction comprises:

determining the time direction of the L0 motion vector of the previously coded block;

determining the time direction of the L1 motion vector of the previously coded block; and determining whether the time directions of the L0 and L1 motion vectors of the previously coded block are the same.

G4. The method of embodiment G3, wherein determining the time direction of the L0 motion vector of the previously coded block comprises comparing a picture order count (POC) value of an L0 picture of the previously coded block with a POC value of the current picture, and determining the time direction of the L1 motion vector of the previously coded block comprises comparing a POC value of an L1 picture of the previously coded block with the POC value of the current picture.

H1. A decoder (1004) configured to:

decode a first syntax element S0 of a current block within a current picture from a coded video bitstream;

determine a first piece of motion information M0 of the current block based on at least the decoded first syntax element S0;

determine that a second piece of motion information M1 for the current block is signaled in the coded video bitstream;

if the second piece of motion information M1 for the current block is determined to be signaled in the coded video bitstream, infer or determine that implicit signaling is used to signal the second piece of motion information M1;

if implicit signaling is inferred or determined to be used to signal the second piece of motion information M1, decode a value of a third syntax element S2 from the coded video bitstream, determine a weight factor W1 associated with the second piece of motion information M1 from the coded video bitstream, and derive the second piece of motion information M1 based on the decoded value of the third syntax element S2, wherein deriving the second piece of motion information M1 based on the decoded value of the third syntax element S2 comprises:

determining whether L0 and L1 motion vectors of a previously coded block are in the same time direction;

deriving a motion information list CANDLIST_M1 associated with the second piece of motion information M1, wherein deriving the motion information list CANDLIST_M1 is based on whether the L0 and L1 motion vectors of the previously coded block are in the same time direction;

deriving an index value IDX based on the value of the third syntax element S2; and determining the second piece of motion information M1 of the current block based on the motion information list CANDLIST_M1 and the index value IDX; and generate a prediction block Pb01 for the current block based on the first piece of motion information M0, the second piece of motion information M1, and the weight factor W1.

I1. A method (2200) for processing (e.g., decoding) a current block within a current picture, the method comprising:

decoding a first syntax element S0 from a coded video bitstream;

determining a first piece of motion information M0 of the current block based on at least the decoded first syntax element S0;

determining that a second piece of motion information M1 for the current block is signaled in the coded video bitstream;

if the second piece of motion information M1 for the current block is determined to be signaled in the coded video bitstream, inferring or determining that implicit signaling is used to signal the second piece of motion information M1;

if implicit signaling is inferred or determined to be used to signal the second piece of motion information M1, decoding a value of a third syntax element S2 from the coded video bitstream, determining a weight factor W1 associated with the second piece of motion information M1 from the coded video bitstream, and deriving the second piece of motion information M1 based on the decoded value of the third syntax element S2 comprises:

deriving a motion information list CANDLIST_M1 associated with the second piece of motion information M1, wherein deriving the list of motion information candidates CANDLIST_M1 associated with the second piece of motion information M1 comprises:

determining a set RECON_SET of reconstruction samples from a group GROUP_P of previously decoded sample positions;

determining a set PRED_SET0 of prediction samples for the group GROUP_P based on the first piece of motion information M0;

for each motion information entry cand_i in the list of motion information candidates CANDLIST_M1, determining an associated cost value COST_i; and reordering the motion information entries in the list of motion information candidates CANDLIST_M1 based on the cost values;

deriving an index value IDX based on the value of the third syntax element S2; and determining the second piece of motion information M1 of the current block based on the motion information list CANDLIST_M1 and the index value IDX; and generating a prediction block Pb01 for the current block based on the first piece of motion information M0, the second piece of motion information M1, and the weight factor W1.

I2. The method of embodiment I1, determining the associated cost value COST_i for the motion information entry cand_i comprises:

determining a set CANDPRED_i of prediction samples for the group GROUP_P based on the motion information cand_i;

determining a set COMBI_i of prediction samples including prediction sample values that are a combination of the prediction sample set PRED_SET0 and the prediction sample set CANDPRED_i based on the weight W1;

comparing the reconstruction set RECON_SET and the prediction sample set COMBI_i; and determining the cost value COST_i based on a comparison of the reconstruction set RECON_SET and the prediction set COMBI_i.

I3. The method of embodiment I1 or I2, wherein reordering the motion information entries in the list of motion information candidates CANDLIST_M1 based on the cost values comprises reordering the motion information entries in the list of motion information candidates CANDLIST_M1 to have ascending cost values.

I4. The method of any one of embodiments I1-I3, wherein the group GROUP_P of previously decoded sample positions are sample positions in the current picture and/or one or more previously decoded pictures.

I5. The method of any one of embodiments I1-I4, wherein the GROUP_P of previously decoded sample positions are sample positions that are spatially neighboring to the current block.

I6. The method of any one of embodiments I1-I5, wherein the GROUP_P of previously decoded sample positions are sample positions that are above the current block and/or to the left of the current block.

I7. The method of embodiment I6, wherein a width tpW_A of the sample positions of the GROUP_P of previously decoded sample positions that are above the current block in a horizontal direction equals or is greater than a width curW of the current block, and a height tpH_L of the sample positions of the GROUP_P of previously decoded sample positions that are to the left of the current block in a vertical direction equals or is greater than a height curH of the current block.

I8. The method of any one of embodiments I1-I7, wherein determining the set PRED_SET0 of prediction samples for the group GROUP_P comprises:
- determining motion information of boundary subblocks of the current block based on the first piece of motion information M0;
- dividing the sample position group GROUP_P into subgroups that are each associated with motion information of a boundary subblock; and
- for each subgroup in GROUP_P, generating corresponding prediction samples for the subgroup based on the associated motion information of the boundary subblock, wherein the determined set PRED_SET0 includes the prediction samples from all the subgroups.

I9. The method of any one of embodiments I1-I8, wherein determining an associated cost value COST_i for a motion information entry cand_i in the list of motion information candidates CANDLIST_M1 comprises:
- determining a set of alternative motion information ALTERMI_SET based on the entry cand_i;
- determining a cost value ALTERCOST_j for each alternative motion information AMI_j in the set ALTERMI_SET;
- determining the motion information entry cand_i to be the alternative motion information that has the smallest cost value within the alternative motion information set ALTERMI_SET; and
- determining the associated cost value COST_i of the entry cand_i as the smallest cost value within the set ALTERMI_SET.

I10. The method of embodiment I9, wherein determining the cost value ALTERCOST_j for an alternative motion information AMI_j in the set ALTERMI_SET comprises:
- determining a set ALTERPRED_j of prediction samples for the sample position group GROUP_P based on the alternative motion information AMI_j;
- determining a set ALTERCOMBI_j of prediction samples that is a combination of the prediction sample set PRED_SET0 and ALTERPRED_j based on the weight W1; and
- determining the cost value ALTERCOST_j based on comparing the reconstruction set RECON_SET and the prediction set ALTERCOMBI_j.

I11. The method of any one of embodiments I1-I10, wherein determining the associated cost value COST_i for the motion information entry cand_i comprises:
- for each sample position in the group GROUP_P, determining a cost value Ci for the sample position and a cost weighting factor cWi for the sample position; and
- determining the cost value COST_i as a sum of Ci*cWi for the sample positions in the group GROUP_P.

I12. The method of embodiment I11, wherein a cost weighting factor (e.g., cWi=2) determined for sample positions that are closer to a boundary of the current block is higher than a cost weighting factor (e.g., cWi=1) determined for sample positions that are further away from a boundary of the current block.

J1. A decoder (1004) configured to:
- decode a first syntax element S0 of a current block within a current picture from a coded video bitstream;
- determine a first piece of motion information M0 of the current block based on at least the decoded first syntax element S0;
- determine that a second piece of motion information M1 for the current block is signaled in the coded video bitstream;
- if the second piece of motion information M1 for the current block is determined to be signaled in the coded video bitstream, infer or determine that implicit signaling is used to signal the second piece of motion information M1;
- if implicit signaling is inferred or determined to be used to signal the second piece of motion information M1, decode a value of a third syntax element S2 from the coded video bitstream, determine a weight factor W1 associated with the second piece of motion information M1 from the coded video bitstream, and derive the second piece of motion information M1 based on the decoded value of the third syntax element S2, wherein deriving the second piece of motion information M1 based on the decoded value of the third syntax element S2 comprises:
  - deriving a motion information list CANDLIST_M1 associated with the second piece of motion information M1, wherein deriving the list of motion information candidates CANDLIST_M1 associated with the second piece of motion information M1 comprises:
    - determining a set RECON_SET of reconstruction samples from a group GROUP_P of previously decoded sample positions;
    - determining a set PRED_SET0 of prediction samples for the group GROUP_P based on the first piece of motion information M0;
    - for each motion information entry cand_i in the list of motion information candidates CANDLIST_M1, determining an associated cost value COST_i; and
    - reordering the motion information entries in the list of motion information candidates CANDLIST_M1 based on the cost values;
  - deriving an index value IDX based on the value of the third syntax element S2; and
  - determining the second piece of motion information M1 of the current block based on the motion information list CANDLIST_M1 and the index value IDX; and
- generate a prediction block Pb01 for the current block based on the first piece of motion information M0, the second piece of motion information M1, and the weight factor W1.

K1. A computer program comprising instructions for adapting a apparatus (1004, 2301) to perform the method of any one of embodiments A1-A31, C1-C8, E1, E2, G1-G4, and I1-I12.

L1. A carrier containing the computer program of embodiment K1, wherein the carrier is one of an electronic signal, optical signal, radio signal, or compute readable storage medium.

M1. An apparatus (1004, 2301), the apparatus comprising:
- processing circuitry (2302); and
- a memory (2342), said memory containing instructions (1744) executable by said processing circuitry, whereby said apparatus is operative to perform the method of any one of the embodiments A1-A31, C1-C8, E1, E2, G1-G4, and I1-I12.

N1. An apparatus (1004, 2301) adapted to perform the method of any one of embodiments A1-A31, C1-C8, E1, E2, G1-G4, and I1-I12.

O1. Any combination of the embodiments set forth above.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for processing a current block within a current picture, the method comprising:
    decoding a first syntax element S0 from a coded video bitstream;
    determining a first piece of motion information M0 of the current block based on at least the decoded first syntax element S0;
    determining that a second piece of motion information M1 for the current block is signaled in the coded video bitstream;
    if the second piece of motion information M1 for the current block is determined to be signaled in the coded video bitstream, determining whether a second syntax element S1 is present in the coded video bitstream;
    if the second syntax element S1 is determined to not be present in the coded video bitstream, inferring which one of implicit signaling and explicit signaling is used to signal the second piece of motion information M1;
    if the second syntax element S1 is determined to be present in the coded video bitstream, decoding a value for the second syntax element S1 and determining which one of implicit signaling and explicit signaling is used to signal the second piece of motion information M1 based on the decoded value of the second syntax element S1;
    if implicit signaling is inferred or determined to be used to signal the second piece of motion information M1, decoding a value of a third syntax element S2 from the coded video bitstream, determining a weight factor W1 associated with the second piece of motion information M1 from the coded video bitstream, and deriving the second piece of motion information M1 based on the decoded value of the third syntax element S2;
    if explicit signaling is inferred or determined to be used to signal the second piece of motion information M1, decoding a value of a fourth syntax element S3 from the coded video bitstream, determining the weight factor W1 associated with the second piece of motion information M1 from the coded video bitstream, and determining the second piece of motion information M1 based on the decoded value of the fourth syntax element S3; and
    generating a prediction block Pb01 for the current block based on the first piece of motion information M0, the second piece of motion information M1, and the weight factor W1,
    wherein the second syntax element S1 is a multi-hypothesis prediction, MHP, merge flag and the third syntax element S2 is a motion information index.

2. The method of claim 1, wherein determining whether the second syntax element S1 is present in the coded video bitstream comprises:
    determining a value V1 based on a fifth syntax element S4 in a parameter set P; and
    comparing the value V1 to a constant value C0, wherein the second syntax element S1 is determined to be present in the coded video bitstream if the value V1 is greater than the constant value C0, and the second syntax element S1 is determined to be not present in the coded video bitstream if the value V1 is not greater than the constant value C0, wherein the value V1 indicates a maximum length of a motion information list CANDLIST_M1 associated with the second piece of motion information M1, wherein the parameter set P is a sequence parameter set (SPS), a picture parameter set (PPS), a slice header, or a picture header.

3. The method of claim 1, wherein, if the value V1 indicates a maximum length of 0 for the motion information list CANDLIST_M1 associated with the second piece of motion information M1, the second syntax element S1 is determined to not be present in the coded video bitstream, and explicit signaling is inferred to be used to signal the second piece of motion information M1 associated with the second piece of motion information M1.

4. The method of claim 1, wherein determining the second piece of motion information M1 based on the value of the fourth syntax element S3 includes determining the value for one element of the motion information M1 motion vector to be the value of the fourth syntax element S3.

5. The method of claim 1, wherein deriving the second piece of motion information M1 based on the decoded value of the third syntax element S2 comprises:
    deriving a motion information list CANDLIST_M1 associated with the second piece of motion information M1;
    deriving an index value IDX based on the value of the third syntax element S2; and
    determining the second piece of motion information M1 of the current block based on the motion information list CANDLIST_M1 and the index value IDX.

6. The method of claim 5, wherein at least one motion information entry in the motion information list CANDLIST_M1 associated with the second piece of motion information M1 is derived based on the first piece of motion information M0 of the current block.

7. The method of claim 5, further comprising determining whether the current picture is a low delay picture, wherein deriving the motion information list CANDLIST_M1 is based on whether the current picture is determined to be a low delay picture.

8. The method of claim 7, wherein the motion information list CANDLIST_M1 includes only one entry derived from an L0 or L1 motion vector of a first previously coded block BLK_A before an entry derived from a motion vector of a second previously coded block BLK_B if the current picture is determined to be a low delay picture, and the motion information list CANDLIST_M1 includes both a first entry derived from an L0 motion vector of the first previously coded block BLK_A and a second entry derived from the L1 motion vector of the first previously coded block BLK_A before an entry derived from an L0 or L1 motion vector of a second previously coded block BLK_B if the current picture is determined to not be a low delay picture.

9. The method of claim 5, further comprising determining whether L0 and L1 motion vectors of a previously coded block are in the same time direction, wherein deriving the motion information list CANDLIST_M1 is based on whether the L0 and L1 motion vectors of the previously coded block are in the same time direction.

10. The method of claim 9, wherein the motion information list CANDLIST_M1 includes only one entry derived from an L0 or L1 motion vector of a first previously coded block BLK_A before an entry derived from a motion vector of a second previously coded block BLK_B if the L0 and L1 motion vectors of the previously coded block are determined to be in the same time direction, and the motion information list CANDLIST_M1 includes both a first entry derived from an L0 motion vector of the first previously coded block BLK_A and a second entry derived from the L1 motion vector of the first previously coded block BLK_A before an entry derived from an L0 or L1 motion vector of a second previously coded block BLK_B if the L0 and L1 motion vectors of the first previously coded block BLK_A are determined to not be in the same time direction.

11. The method of claim 5, wherein deriving the list of motion information candidates CANDLIST_M1 associated with the second piece of motion information M1 comprises:
  determining a set RECON_SET of reconstruction samples from a group GROUP_P of previously decoded sample positions;
  determining a set PRED_SET0 of prediction samples for the group GROUP_P based on the first piece of motion information M0;
  for each motion information entry cand_i in the list of motion information candidates CANDLIST_M1, determining an associated cost value COST_i; and
  reordering the motion information entries in the list of motion information candidates CANDLIST_M1 based on the cost values.

12. The method of claim 11, determining the associated cost value COST_i for the motion information entry cand_i comprises:
  determining a set CANDPRED_i of prediction samples for the group GROUP_P based on the motion information cand_i;
  determining a set COMBI_i of prediction samples including prediction sample values that are a combination of the prediction sample set PRED_SET0 and the prediction sample set CANDPRED_i based on the weight W1;
  comparing the reconstruction set RECON_SET and the prediction sample set COMBI_i; and
  determining the cost value COST_i based on a comparison of the reconstruction set RECON_SET and the prediction set COMBI_i.

13. The method of claim 11, wherein reordering the motion information entries in the list of motion information candidates CANDLIST_M1 based on the cost values comprises reordering the motion information entries in the list of motion information candidates CANDLIST_M1 to have ascending cost values.

14. The method of claim 11, wherein the group GROUP_P of previously decoded sample positions are sample positions that are above and/or to the left of the current block in the current picture and/or one or more previously decoded pictures.

15. The method of e claim 11, wherein determining the set PRED_SET0 of prediction samples for the group GROUP_P comprises:
  determining motion information of boundary subblocks of the current block based on the first piece of motion information M0;
  dividing the sample position group GROUP_P into subgroups that are each associated with motion information of a boundary subblock; and
  for each subgroup in GROUP_P, generating corresponding prediction samples for the subgroup based on the associated motion information of the boundary subblock, wherein the determined set PRED_SET0 includes the prediction samples from all the subgroups.

16. The method of claim 11, wherein determining an associated cost value COST_i for a motion information entry cand_i in the list of motion information candidates CANDLIST_M1 comprises:
  determining a set of alternative motion information ALTERMI_SET based on the entry cand_i;
  determining a cost value ALTERCOST_j for each alternative motion information AMI_j in the set ALTERMI_SET;
  determining the motion information entry cand_i to be the alternative motion information that has the smallest cost value within the alternative motion information set ALTERMI_SET; and
  determining the associated cost value COST_i of the entry cand_i as the smallest cost value within the set ALTERMI_SET.

17. The method of claim 11, wherein determining the associated cost value COST_i for the motion information entry cand_i comprises:
  for each sample position in the group GROUP_P, determining a cost value Ci for the sample position and a cost weighting factor cWi for the sample position; and
  determining the cost value COST_i as a sum of Ci*cWi for the sample positions in the group GROUP_P,
  wherein a cost weighting factor determined for sample positions that are closer to a boundary of the current block is higher than a cost weighting factor determined for sample positions that are further away from a boundary of the current block.

18. The method of claim 1, wherein generating the prediction block Pb01 for the current block comprises:
  generating a first prediction block P0 for the current block based on the first piece of motion information M0;
  generating a second prediction block P1 for the current block based on the second piece of motion information M1; and
  generating the prediction block Pb01 as a weighted combination of the first and second prediction blocks P0 and P1 based on the weight factor W1,
  wherein generating the second prediction block P1 for the current block based on the second piece of motion information M1 comprises:
    refining the second piece of motion information M1 based on motion estimation such that the refined second piece of motion information M1 generates a prediction block for the current block that minimizes a difference with the first prediction block P0 for the current block; and
    using the refined second piece of motion information M1 to generate the second prediction block P1 for the current block.

19. A decoder configured to perform the method according to claim 1.

20. An apparatus, the apparatus comprising:
  processing circuitry; and
  a memory, said memory containing instructions executable by said processing circuitry, whereby said apparatus is operative to perform the method of claim 1.

* * * * *